US008073724B2

(12) United States Patent
Harthcryde et al.

(10) Patent No.: US 8,073,724 B2
(45) Date of Patent: Dec. 6, 2011

(54) SYSTEMS PROGRAM PRODUCT, AND METHODS FOR ORGANIZATION REALIGNMENT

(75) Inventors: George Harthcryde, Addison, TX (US); Rowan Teh, Frisco, TX (US); Mubarak A. Hoty, Dammam (SA)

(73) Assignee: Saudi Arabian Oil Company (SA)

( * ) Notice: Subject to any disclaimer, the term of this patent is extended or adjusted under 35 U.S.C. 154(b) by 1372 days.

(21) Appl. No.: 11/605,915

(22) Filed: Nov. 29, 2006

(65) Prior Publication Data
US 2007/0198317 A1 Aug. 23, 2007

Related U.S. Application Data

(60) Provisional application No. 60/741,683, filed on Dec. 2, 2005.

(51) Int. Cl.
*G05B 19/418* (2006.01)
*G06Q 10/00* (2006.01)
(52) U.S. Cl. .................. 705/7.14; 705/7.13; 705/7.17
(58) Field of Classification Search .............. 705/7–12
See application file for complete search history.

(56) References Cited

U.S. PATENT DOCUMENTS

| 6,006,193 | A   | * | 12/1999 | Gibson et al. .................. 705/8 |
| 6,157,808 | A   | * | 12/2000 | Hollingsworth .............. 434/350 |
| 6,857,877 | B1  | * | 2/2005  | Watanabe ..................... 434/219 |
| 2002/0019765 | A1 | * | 2/2002 | Mann et al. ..................... 705/11 |
| 2002/0052773 | A1 | * | 5/2002 | Kraemer et al. ................. 705/9 |
| 2002/0055870 | A1 | * | 5/2002 | Thomas ......................... 705/10 |
| 2002/0077884 | A1 | * | 6/2002 | Sketch .......................... 705/12 |
| 2002/0128895 | A1 | * | 9/2002 | Broderick et al. .............. 705/9 |
| 2002/0184085 | A1 | * | 12/2002 | Lindia et al. .................... 705/11 |
| 2003/0083891 | A1 | * | 5/2003 | Lang et al. ...................... 705/1 |
| 2003/0083923 | A1 | * | 5/2003 | Guicciardi et al. .............. 705/9 |
| 2003/0101091 | A1 | * | 5/2003 | Levin et al. ..................... 705/11 |
| 2003/0115094 | A1 | * | 6/2003 | Ammerman et al. ........... 705/11 |
| 2003/0139953 | A1 | * | 7/2003 | Guenther et al. ................ 705/7 |
| 2003/0191680 | A1 | * | 10/2003 | Dewar ............................ 705/8 |
| 2003/0229529 | A1 | * | 12/2003 | Mui et al. ....................... 705/8 |
| 2004/0162742 | A1 | * | 8/2004 | Stoker et al. .................... 705/7 |
| 2004/0215503 | A1 | * | 10/2004 | Allpress et al. ................ 705/11 |
| 2004/0254806 | A1 | * | 12/2004 | Schwerin-Wenzel et al. .... 705/1 |

(Continued)

OTHER PUBLICATIONS

Price et al., article "Balancing Roles and Responsibilities in Six Sigma," iSix Sigma LLC, CTQ Media LLC, 2000-2006, found at http:/finance.isixsigma.com/library/content/c040211a.asp.

*Primary Examiner* — Kambiz Abdi
*Assistant Examiner* — Stephanie M Ziegle
(74) *Attorney, Agent, or Firm* — Bracewell & Giuliani LLP

(57) ABSTRACT

A system to realign an organization structure, program product, and associated methods are provided. The system includes an organization realignment program server, a database accessible to the organization realignment program server, a plurality of process development team member computers, a plurality of process development representative computers, and an organization realignment program product stored in the memory of the organization realignment program server to facilitate reorganization program development through online access to the plurality of data records. The organization realignment program product can provide organization analysis web pages to capture data used to analyze and define functions, activities, tasks, and roles, forming a new organization structure, and can provide resource determination web pages to determine a qualified supply of resources available to the new organization structure to thereby determine a skills gap and a resource gap between resources demanded by the new organization structure and the qualified supply of resources.

25 Claims, 52 Drawing Sheets

U.S. PATENT DOCUMENTS

| | | |
|---|---|---|
| 2004/0267595 A1* | 12/2004 | Woodings et al. ............... 705/9 |
| 2005/0137925 A1* | 6/2005 | Lakritz et al. .................. 705/8 |
| 2005/0159968 A1* | 7/2005 | Cozzolino ...................... 705/1 |
| 2005/0197873 A1* | 9/2005 | Little ............................. 705/7 |
| 2005/0222893 A1* | 10/2005 | Kasravi et al. ................. 705/10 |
| 2005/0251438 A1* | 11/2005 | Tseng et al. ................... 705/10 |
| 2006/0053046 A1* | 3/2006 | Bonnstetter et al. ............ 705/11 |
| 2006/0229896 A1* | 10/2006 | Rosen et al. ................... 705/1 |
| 2006/0287906 A1* | 12/2006 | McGillin ........................ 705/9 |
| 2009/0234697 A1* | 9/2009 | Taguchi ......................... 705/9 |

* cited by examiner

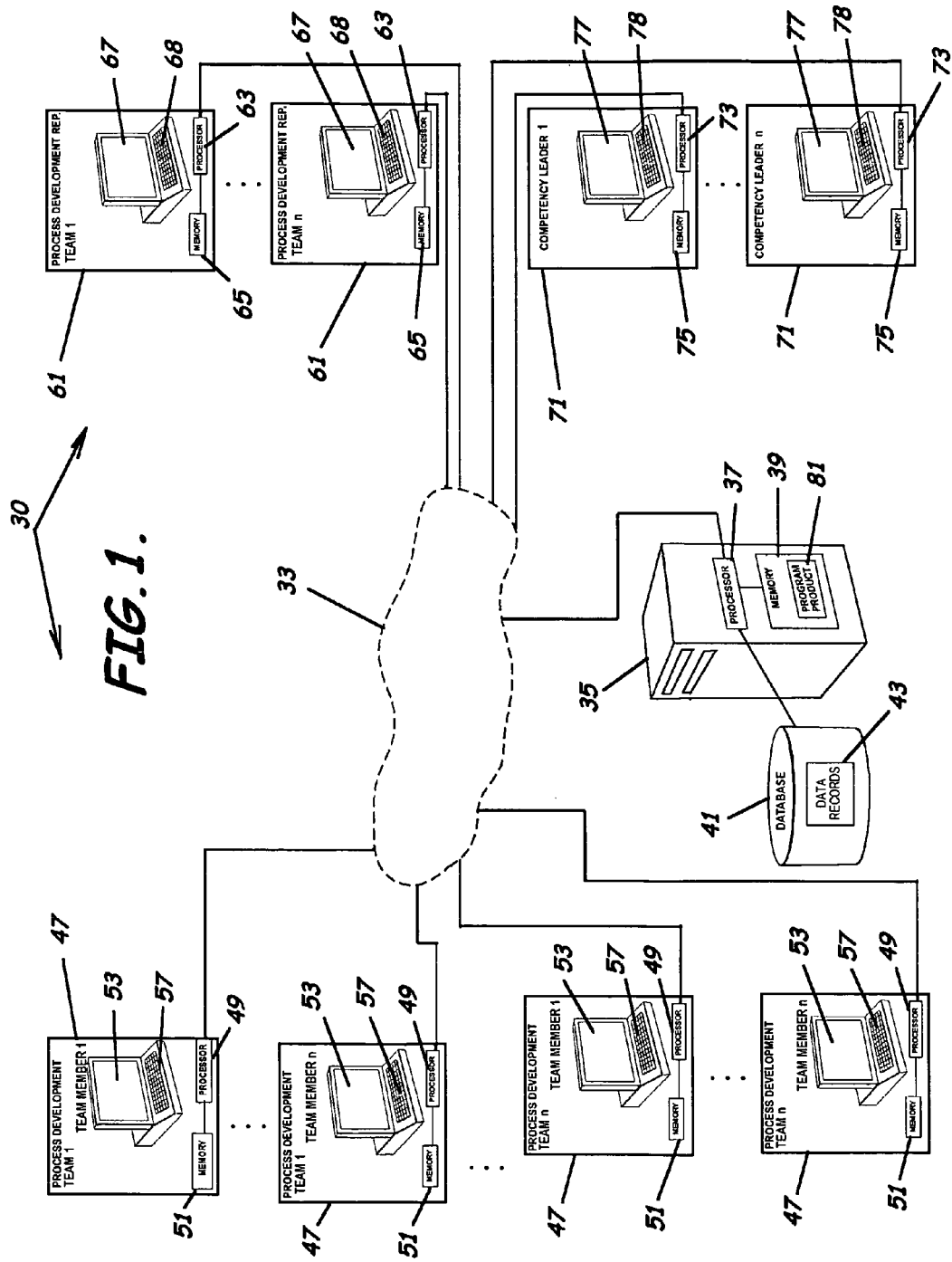

| The description of this activity is: Create and Implement a Transition Plan |
|---|
| Develop and implement a series of activities and tasks that transitions an organization's systems and enables its people to support the mission and objectives of an organization's new Charter on time, on budget. |

| Trigger (purpose for performing activity): | The process begins with: |
|---|---|
| An organization requires re-alignment | A request for this service is received by Management |

| The process ends with: |
|---|
| Approved project-specific Transition Plan and Timeline are posted to the appropriate Documentum Folder |

| Input to process: | Supplier of input: |
|---|---|
| A formal request for re-alignment | Management |

| Output of process: | Customer of output: |
|---|---|
| Approved project-specific Transition Plan and Timeline | The organization's stakeholders (i.e., SCC Management, personnel/end users, External Customer) |

| Tasks / Roles | C1 | C2 | C3 | C4 | C5 | C6 | C7 |
|---|---|---|---|---|---|---|---|
| Develop, refine and monitor Transition Plan | C | R,A | R | C | I | | |
| Define major functions and activities | | | | R,A | | | |
| Enter functions and activities online | | A | | | | R | R |
| Modify and schedule Activity Analysis workshop 1 | C | A | R | C | | | |
| Conduct Activity Analysis workshop 1 | | | R,A | | | | |
| Develop Activity Analysis | | A | I | I | R | | |
| Enter activities into activity using web input forms | | A | I | | R | | |
| Perform quality check on Activity Analysis | C | A | R | | | | |
| Modify and schedule Task Lists and Roles workshop 2 | C | A | R | | | | |
| Conduct Task Lists and Roles workshop 2 | | | R,A | | | | |
| Develop initial roles list | C | A | R | C | C | | |
| Enter roles online | | A | R | | | R | R |
| Develop Task Lists with Roles using RACI concept | | A | I | I | R | | |
| Enter task lists and roles using web input forms | | A | I | | R | | |
| Perform quality check on Task Lists with Roles | C | A | R | | | | |
| Modify and schedule Resource Availability and Role Manhours workshop 3 | C | A | R | | | | |
| Conduct Resource Availability and Role Manhours workshop 3 | | | R,A | | | | |
| Develop standardized roles | C | A | R | I | | | |
| Update roles online | | A | R | | | R | R |
| Enter Role Manhours using web input forms | | A | I | | R | | |
| Collate Resource Availability data | | A | R | I | | | |
| Perform quality check on Resource Availability and Role Manhours | C | A | R | | | | |
| Modify and schedule Role Competencies and Activity Frequency workshop 4 | C | A | R | | | | |
| Conduct Role Competencies and Activity Frequency workshop 4 | | | R,A | | | | |
| Develop Role Competencies using LUGI/KSB concepts | | A | I | I | R | | |
| Enter Role Competencies and Activity Frequencies using web input forms | | A | I | | R | | |
| Perform Role LUGI self-evaluations | | A | I | I | R | | |
| Perform quality check on Role Competencies and Activity Frequencies | C | A | R | | | | |
| Modify and schedule Lessons Learned workshop 5 | C | A | R | | | | |
| Conduct Lessons Learned workshop 5 | | | R,A | | | | |
| Document lessons learned | | | R,A | I | | | |
| Develop Demand, Supply, Skills Gap Estimates | | A | R | C | C | | |
| Develop Organization Team Structure | | A | R | C | | | |
| Transition people to job roles | | A | R | C | C | | |
| Perform Recruitment Process | | A | R | C | | | |
| Develop activity level process maps | | | R,A | | | | |

Legend: Role and Responsibility Codes:
A = Accountable (the person who "owns" the action, must see to it that it is done). Only ONE person can be accountable.
R = Responsible (the person or persons who do the work). Several people can do the work.
C = Consult (the person or persons who must be involved in an action or decision before the action is taken or the decision made).
I = Inform (the person or persons who need to be notified after the action or decision).

FIG. 3.

| | |
|---|---|
| TRAINING MATERIALS MANAGER | — 81 |
| FUNCTIONS FORMER | — 83 |
| ACTIVITY ANALYSIS SUGGESTION FORMER | — 85 |
| ACTIVITY ANALYSIS SUGGESTION ENTRY ALERT MANAGER | — 97 |
| ACTIVITY ANALYSIS SUGGESTION VIEWER | — 105 |
| FINAL ANALYSIS COMMENT MANAGER | — 125 |
| AUTHORIZATION PROFILE MANAGER | — 127 |
| FINALIZED ACTIVITY ANALYSIS FORMER | — 135 |
| FINALIZED ACTIVITY ANALYSIS ENTRY ALERT MANAGER | — 143 |
| TASK FORMER | — 159 |
| ROLE TASK FORMER | — 181 |
| TASK AND ROLE ENTRY ALERT MANAGER | — 193 |
| ROLE TASK VIEWER | — 213 |
| | — 215 |
| COMMENT MANAGER | — 217 |
| ROLE COMPETENCIES SUGGESTION FORMER | — 241 |
| COMPETENCY ANALYSIS SUGGESTION ENTRY ALERT MANAGER | — 271 |
| ROLE COMPETENCY FORMER | — 293 |
| ROLE COMPETENCY REPORT FORMER | — 303 |
| RESOURCE COMMITMENT MANAGER | — 321 |
| QUALIFIED RESOURCE SUPPLY DETERMINER | — 331 |
| ASSIGNABLE HOURS DETERMINER | — 341 |
| DEMAND ESTIMATE DETERMINER | — 351 |
| SKILLS GAP ANALYSIS TEMPLATE FORMER | — 371 |
| TRAINING MATERIALS MANAGER | — 381 |
| TRANSITION PLAN MANAGER | — 383 |
| PROJECT MANAGER | — 385 |
| PROJECT INVENTORY MANAGER | — 387 |

| FUNCTION: Organizationl/Business Change Management ||||||||||
|---|---|---|---|---|---|---|---|---|---|
| ACTIVITY | TASK NAME | ROLE NAME | | | | | | | |
| Administer CM Issue Resolution | Complete web form and schedule meeting | TCM Management | 4 | 2 | 1 | | C | | |
| | | BCD Team Lead | 8 | 4 | 2 | A | C | | |
| | Attend meeting to determine strategy | BCD Team Lead | 16 | 8 | 4 | | | | |
| | | TCM Management | 4 | 2 | 1 | A | | | |
| | Attend meeting to resolve issues | BCD Team Lead | 12 | 8 | 4 | A | C | | |
| | | TCM Management | 8 | 4 | 2 | | | | |
| | Schedule meetings with Project Manager, Change Manager, Proponent and SCC | BCD Team Lead | 10 | 8 | 6 | A | | | |
| | | TCM Management | | | | | C | | |
| | | SCC Project Manager | | | | | C | | |
| | | Project Change Coordinator (proponent) | | | | | C | | |
| | | SCC Management | | | | | C | | |
| | Attend meetings to resolve Issue or Item | BCD Team Lead | 12 | 8 | 4 | A | | | |
| | | SCC Project Manager | 4 | 2 | 1 | | | | |
| | | Project Change Coordinator (proponent) | 4 | 2 | 1 | | | | |
| | | TCM Management | 4 | 2 | 1 | | | | |
| | | SCC Management | 4 | 2 | 1 | | | | |
| | Develop Communication & Change Management Plan | BCD Team Lead | 20 | 15 | 10 | A | C | | |
| | | TCM Management | | | | | C | | |
| | | SCC Project Manager | | | | | C | | |
| | | Project Change Coordinator (proponent) | | | | | C | | |
| | Update webform weekly | BCD Team Lead | 2 | 1 | 0.5 | A | | | |
| | | TCM Management | | | | | | | |
| | Post documents in Documentum | BCD Team Lead | 2 | 1 | 0.5 | A | | | |
| | | TCM Management | | | | | | | |

*FIG. 21.*

| Qualified Resource Supply | No. Supply | Name1 Interested? | Name1 Stage | Name2 Interested? | Name2 Stage | Name3 Interested? | Name3 Stage | Name4 Interested? | Name4 Stage |
|---|---|---|---|---|---|---|---|---|---|
| Role A | 2 | Yes | S2 | No | S2 | No | S2 | Yes | S1 |
| Role B | 3 | No | S1 | Yes | S1 | Yes | S1 | Yes | S1 |
| Role C | 2 | No | S1 | Yes | S1 | Yes | S1 | No | S3 |
| Role D | 0 | No | S2 | No | S3 | No | S3 | Yes | S2 |
| Role E | 4 | Yes | S1 | Yes | S1 | Yes | S1 | Yes | S1 |
| Role F | 4 | Yes | S1 | No | S3 | No | S3 | Yes | S3 |
| Role G | 0 | No | S3 | No | S2 | Yes | S4 | No | S4 |
| Role H | 2 | Yes | S2 | No | S1 | No | S1 | No | S1 |
| Role I | 0 | No | S1 | No | S1 | No | S1 | No | S1 |

| Groups | Qualified Supply |
|---|---|
| [Insert Name of Group] | [Enter number of people per group] |
| [Insert role names] | |
| [Insert role names] | |
| [Insert role names] | |
| [Insert Name of Group] | [Enter number of people per group] |
| [Insert role names] | |
| [Insert role names] | |
| [Insert role names] | |
| [Insert Name of Group] | [Enter number of people per group] |
| [Insert role names] | |
| [Insert role names] | |
| [Insert role names] | |
| [Insert Name of Group] | [Enter number of people per group] |
| [Insert role names] | |
| [Insert role names] | |
| [Insert role names] | |
| Total Supply | [Enter sum of qualified supply] |

| | ANYONE<br>All Organization Contributors | PLUS<br>Project or Initiative Lead | PLUS<br>Competency Lead | PLUS<br>Group Lead | Management Process Owner |
|---|---|---|---|---|---|
| GENERAL (G) ACTIVITIES | | | | | |
| Check email, receive calls, general non-project research (webreading), non-business interruptions, serendipitous learning, "Unplanned Activities"<br>UoM: Day<br>Mandays | 1.5<br>240<br>45 | | | | 3<br>.0<br>240<br>90 |
| Prepare for/Attend Weekly Meeting<br>UoM: Weekly<br>Workload: Annual Mandays | 2.0<br>52<br>13 | | | | 2.0<br>52<br>13 |
| Update Highlights, Reporting<br>UoM: Weekly<br>Workload: Annual Mandays | 1.0<br>52<br>6.5 | | | | |
| Review/Edit Highlights, Reporting<br>UoM: Weekly<br>Workload: Annual Mandays | | 2.0<br>52<br>13 | 1.0<br>52<br>6.5 | 1.0<br>52<br>6.5 | 2.0<br>52<br>13 |
| Prepare for/Attend Competency Meeting/Workshop<br>UoM: Bi-Weekly<br>Workload: Annual Mandays | 2.0<br>26<br>6.5 | | | | 2.0<br>26<br>6.5 |
| Prepare/conduct Competency Meeting/Workshop<br>UoM: Bi-Weekly<br>Workload: Annual Mandays | | | 4.0<br>26<br>13 | | 4.0<br>26<br>13 |
| Prepare for/Attend Group (Direct Reports) Meeting/Workshop<br>UoM: Bi-Weekly<br>Workload: Annual Mandays | 2.0<br>26<br>6.5 | | | | 2.0<br>26<br>6.5 |
| Prepare/conduct Group (Direct Reports) Meeting/Workshop<br>UoM: Bi-Weekly<br>Workload: Annual Mandays | | | | 4.0<br>26<br>13 | 4.0<br>26<br>13 |
| Prepare for/Attend Initiative Review Meeting<br>UoM: Bi-Weekly<br>Workload: Annual Mandays | | | 4.0<br>26<br>13 | 4.0<br>26<br>13 | 4.0<br>26<br>13 |
| Prepare/conduct PMP Meeting<br>UoM: Quarterly<br>Workload: Annual Mandays | 2.0<br>4<br>1 | | | | 2.0<br>4<br>30 |
| | ANYONE<br>All Organization Contributors | PLUS<br>Project or Initiative Lead | PLUS<br>Competency Lead | PLUS<br>Group Lead | Management Process Owner |
| ROLE BASED: NOT RELATED TO PROJECTS OR INITIATIVES | | | | | |
| Workload: Annual Mandays | 78.5 | 13 | 19.5 | 19.5 | 198<br>42 |
| ASSIGNABLE DAYS PER YEAR (Specialist) | 161.5 | | | | 2nd UoM Staff SE=30L |
| Assignment as Team Lead | | 148.5 | | | |
| Assignment as Team Lead PLUS Competency OR Group Lead | | | 129 | | |
| Assignment as Team Lead PLUS Competency PLUS Group Lead | | | | 110 | |
| Average Assignable HOURS per DAY (Specialist) | 5.4 | | | | |
| Assignment as Team Lead | | 5.0 | | | |
| Assignment as Team Lead PLUS Competency OR Group Lead | | | 4.3 | | |
| Assignment as Team Lead PLUS Competency PLUS Group Lead | | | | 3.7 | |

| Topic | Team | Duration | Desired Outcome |
|---|---|---|---|
| Presentation | Transition Team | 15 mins | • Everyone understands transition background |
| Transition Project Timeline | Transition Team | 45 mins | • Establish major milestones for the transition<br>• Communicate involvement of people in completing tasks and deadlines |
| Break | | 10 mins | Break |
| Example exercise | Transition Team/ All Team Members | 50 mins | • Run one activity through process of analysis and defining tasks |
| Process development teams exercise | Transition Team/ All Team Members | 20 mins | • Identify team members and leads for each function<br>• Perform analysis of one activity in each function |
| Wrap-up and feedback time | Transition Team/All Team Members | 10 mins | • Agree on assignments and next steps.<br>• Provide feedback, ideas, concerns, suggestions on all aspects of plan. |

FIG. 38.

Activity Analysis 'Live' Exercise Template

These steps can be used to guide the facilitator in a live activity analysis exercise.

Purpose of exercise:
To demonstrate steps involved in analyzing an activity and listing tasks.

Function:
[Enter a division-specific function as an example]

Activity:
[Enter a division-specific activity as an example]

Facilitator Actions:

1. Hand-out activity analysis form
2. Each person fills-in activity analysis form to describe the activity of [enter example activity]
3. Form working groups (3 or 4)
4. Compare and revise activity analysis results to produce final version
5. Each group presents their analysis to rest of team
6. Select one group's analysis results to determine list of tasks
7. Each person drafts list of tasks
8. In groups, compare and revise lists to produce final list of tasks
9. Each group present their list of tasks to rest of team

*FIG. 39.*

Process Development Team Exercise Template

Facilitator Actions:

1. Hand-out master list of functions/activities to everyone
2. Number 1 to N on whiteboard depending on the number of functions defined
3. Distribute post it notes to each person and request each person write his/her name on them
4. Request each person to self-select the functions s/he wants to be involved in by
5. placing the post it notes on the board next to the function number
6. Balance group numbers by moving names between functions
7. Request teams to sit together and identify representatives
8. Record process development team members and representatives
9. Request teams to work together to perform an activity analysis of one activity under their functions and present to team

FIG. 40.

| Action Item | Person Responsible | Due-Date (COB) | |
|---|---|---|---|
| Each member drafts analysis results per activity in their function and submits to Process Development Representatives | All team members | DD-MM-YY | 431 |
| Schedule and conduct meeting with process development team members | Process Development Representatives | DD-MM-YY | 433 |
| In Process Development teams, compare, revise to produce final analysis results | All team members | DD-MM-YY | 435 |
| Each member drafts list of tasks under each activity | All team members | DD-MM-YY | 437 |
| Schedule and conduct meeting with process development team members | Process Development Representatives | DD-MM-YY | 439 |
| In Process Development teams, compare, revise to produce final task lists for each activity | All team members | DD-MM-YY | 441 |
| Process Development Representatives posts final descriptions and task list to web using online form<br>Web auto-notifies all members to review<br>No comment = Agreement | Process Development Representatives | DD-MM-YY | 443 |
| Comment on final activity analysis results and tasks list to Process Development Representatives | All team members | DD-MM-YY | 445 |
| Finalize all descriptions by reviewing and incorporating/rejecting comments | Process Development Representatives | DD-MM-YY | 447 |
| Fill-in and submit resource allocation online form | All team members | DD-MM-YY | 449 |
| In Process Development teams, draft project plans for each function | All team members | DD-MM-YY | 451 |

*FIG. 41.*

| Topic | Team | Duration | Desired Outcome |
|---|---|---|---|
| Presentation | Transition Team | 15 mins | • Everyone understands where we are up to and what we have to do next. |
| Tasks and Roles Exercise | Transition Team/All Team Members | 30 mins | • Establish how to develop task lists and roles for an activity. |
| Demonstrate Online Web Form | Transition Team | 10 mins | • Understand how to navigate on line web form. |
| Questions and Answers | All Team Members | 5 mins | |

*FIG. 43.*

Task and Roles 'Live' Exercise Template

This template can be used for a live tasks and roles exercise.

Without Tasks and Roles

Function: [Specify an example function in your organization]

| The description of this activity is: [Specify an activity within the example function] |
|---|
| (Provide a description for the activity) |

| Trigger: (purpose for performing activity): | The process begins with: |
|---|---|
| (State the trigger for the activity) | [State the step that begins the activity] |

| The process ends with: |
|---|
| (State the step that ends the activity) |

| Input to process: | Supplier of input: |
|---|---|
| (State the inputs to the process) | [List the suppliers of the input for the activity] |
| Output of process: | Customer of output: |
| (State the output of the process for the activity) | [List the customers of the output for the activity] |

| Tasks - Roles | | TCM Lead | SCC Project Managers | Project Change Coordinators | TCM Staff | Assign TCM Person |
|---|---|---|---|---|---|---|
| (Leave these fields blank for participant input) | | | | | | |
| | | | | | | |
| | | | | | | |
| | | | | | | |
| | | | | | | |

Legend: Role and Responsibility Codes:
A = Accountable (the person who 'owns' the action, must see to it that it is done). Only ONE person can be accountable.
R = Responsible (the person or persons who do the work). Several people can do the work.
C = Consult (the person or persons who must be involved in an action or decision *before* the action is taken or the decision made).
I = Inform (the person or persons who need to be notified *after* the action or decision).

*FIG. 44.*

| Topic | Team | Duration | Desired Outcome |
|---|---|---|---|
| Presentation | Transition Team | 25 mins | • To date<br>• This Workshop |
| Presentation | Transition Team | 10 mins | • The future |
| Workshop Activity | All Team Members | 40 mins | • Tasks; R=Man-Hours |
| Wrap-up and feedback time | Transition Team/All Team Members | 15 mins | • Agree on assignments and next steps.<br>• Provide feedback, ideas, concerns, suggestions on all aspects of plan. |

FIG. 46.

Resource Availability and Role Man-hours 'Live' Exercise Template

These steps can be used to guide facilitator in a live role man-hours exercise.

Example exercise
1. Form working groups (3 or 4)
   Determine the roles that are as yet not standardized
1. Confirm that the tasks are as expected [add in any extra that may be missing]
2. Look at the Role that is RESPONSIBLE and determine the MANHOURS that the task would take
1. Consolidate information to one
2. Hand back consolidated information to Transition Team

*FIG. 47.*

| Topic | Team | Duration | Desired Outcomes |
|---|---|---|---|
| Presentation | Transition Team | 30 mins | • Everyone understands where we are up to and what we have to do next. |
| Activity Frequency | Transition Team/All Team Members | 30 mins | • Frequencies for every activity |
| LUGI/KSB Exercise | Transition Team/ All Team Members | 30 mins | • Establish how to define a role competency using LUGI/KSB concepts. |
| Next Milestones | Transition Team | 15 mins | • Identify the next milestones |
| Questions and Answers | All Team Members | 15 mins | |

FIG.49.

Activity Frequency / Complexity
Example Activity: [Use an example activity from your Division]

| Frequency | Difficult | Normal | Easy |
|---|---|---|---|
| 20 | 3 | 7 | 10 |

*FIG. 50.*

| Example Activity Frequencies ||||||
|---|---|---|---|---|---|
| FUNCTION | ACTIVITY | Freq | D | N | E |
| Organizational/ Business Change Management | Administer CM Issue Resolution | 20 | 3 | 10 | 7 |
| | Maintain CM Methodology | 4 | 1 | 2 | 1 |
| | Workshop (Generic template informed by specific content) | 1 | 1 | 0 | 0 |

*FIG. 51.*

LUGI/KSB Table

For the role: [Use an example role from your Division]
The example below is that of a Change Management Competency Lead

| | Stage 1 LEARN | Stage 2 USE/APPLY | Stage 3 GUIDE/EDUCATE | Stage 4 INNOVATE/SHAPE |
|---|---|---|---|---|
| Knowledge | PROVE understanding of general Change Management principles | PROVE understanding of the organization ASAP Methodology's principal deliverables and how they relate to each other | PROVE understanding of how to guide another person in acquiring general knowledge of Change Management principles, the organization ASAP Methodology's principal deliverables, and how they relate to each other | PROVE understanding of the CM Methodology, how it is revised, and recommend significant improvements |
| Skills | DEMONSTRATE proficiency in the use of appropriate MS Office Suite application/s | DEMONSTRATE understanding of the organization ASAP Methodology's principal deliverables and how they relate to each other *by modifying a CM Deliverable from its Generic Template* | DEMONSTRATE understanding of how to educate another person to acquire general knowledge of Change Management principles, the organization ASAP Methodology's principal deliverables, and how they relate to each other *by guiding another person in modifying a specified CM Deliverable from its Generic Template* | DEMONSTRATE understanding of the CM Methodology and how it is revised, *by obtaining approval to incorporate a significant improvement into the CM Methodology* |
| Behaviors | | EXHIBIT conduct that enables others to Learn the Knowledge and Skills detailed above | EXHIBIT conduct that enables others to Apply the Knowledge and Skills detailed above | EXHIBIT conduct that enables others to Guide and Innovate |

*FIG. 52.*

Role Competencies and Activity Frequency Workshop 'Live' Exercise Template

LUGI/KSB Table

Role: [State an example role to analyze]

| | Stage 1 LEARN | Stage 2 USE/APPLY | Stage 3 GUIDE/EDUCATE | Stage 4 INNOVATE/SHAPE |
|---|---|---|---|---|
| Knowledge | PROVE understanding of general [insert text] | PROVE understanding [insert text] and how they relate to each other | PROVE understanding of how it is revised, and recommend significant improvements to the [insert text] | PROVE understanding of [insert text], how it is revised, and reccomend significant improvements to the [insert text] |
| Skills | DEMONSTRATE proficiency in the use of [insert text] | DEMONSTRATE understanding [insert text] and how they relate to each other by [insert text] | DEMOSTRATE understanding of and how it is revised, by [insert text] | DEMONSTRATE understanding of [insert text] and how it is revised,by [insert text] |
| Behaviors | | EXHIBIT conduct that enables others to Learn the Knowledge and Skills detailed above by [insert text] | EXHIBIT conduct that enables others to Guide and Innovate by [insert text] | EXHIBIT conduct that enables others to Guide and Innovate by [insert text] |

| Topic | Team | Duration | Desired Outcomes |
|---|---|---|---|
| Presentation | Transition Team | 15 mins | • Recap all actions and deliverables |
| Lessons Learned | Transition Team/All Team Members | 30 mins | • Identify what could have been performed better |
| Wrap-up and feedback time | Transition Team/ All Team Members | 15 mins | |

SYSTEMS PROGRAM PRODUCT, AND METHODS FOR ORGANIZATION REALIGNMENT

RELATED APPLICATIONS

This application claims priority to and the benefit of U.S. Provisional Application No. 60/741,683, titled "Systems, Program Product, and Methods for Organization Realignment," filed on Dec. 2, 2005, incorporated herein by reference in its entirety.

BACKGROUND OF THE INVENTION

1. Field of the Invention

The present invention relates generally to organizational structure change, in particular to organizational realignment, and more specifically to systems, program products, and methods to realign an organization structure.

2. Description of the Related Art

Mergers and acquisitions, realignments, downsizings, joint ventures, and other forms of major changes affecting an organization structure are becoming commonplace. Major corporations and other business entities are continuously improving and realigning to industry trends and customer needs, and thus, require such flexibility in today's competitive markets in order to prosper. This realignment often requires reorganization of various departments within the organization or even wholesale reorganization of the entire organization structure. One such recent impetus for change in established entities is the desire to change individual departments from functioning as cost centers which generally follow a mentality of cutting costs in order to improve efficiency and which tend to stifle innovation, to that of functioning as profit centers which improve efficiency through both cost cutting and through increasing revenues through innovation and through providing additional services.

During reorganization, the entity generally must still maintain various controls and business policies and procedures to preserve the integrity of the entity and preserve the entity's business image and reputation. In order to realign an organization, typically managers have needed to define the various organization elements including functions, activities that support the functions, tasks necessarily to accomplish the activity, roles of the various personnel involved in accomplishing the tasks, and their respective competencies. Changes resulting from such reorganization can present new challenges and demands for the entire organization from the highest levels to the lowest level personnel. Thus, recognized by the Applicant is the need for a system and methodology of implementing such organization realignment which can minimize the impact on the organization's personnel.

In order to transition to the new organization structure, adjustments must be made that can capitalize on the strengths of the organization's personnel. Supervisors and managers, however, often spend a substantial amount of time personally organizing, managing, and evaluating such changes only to have little to no support from those who must implement the changes. Most of personnel prefer established routines, feeling secure, stable, and familiar with their past responsibilities. Change, however, naturally results in a certain level of uncertainty as to the status in the organization, the role each organization member is expected to play, and what other changes might follow. If change is not handled well, the results can include demoralization of the organization's personnel, an increase in turnover, a decrease in cooperation and teamwork, and increased levels of anxiety which can lead to an increase in stress, followed by an increase in absenteeism, illness, and mistakes. It is human nature that organization members that tend to resist such change will have negative feelings. Thus, recognized by the Applicant is the need for a system and methodology of implementing such organization realignment which can involve the organization's affected personnel in the change process and thus, encourage ownership, by allowing them to participate in defining the various organizational elements of the new organization structure while still maintaining management control of all final decisions, assignments, and definitions. Also recognized is the need for a system and methodology of implementing such organization realignment which allows affected organization personnel to evaluate their respective strengths and weaknesses against the various roles necessary to complete various tasks supporting the organization activities and functions of the new organization structure.

One methodology referred to as responsibility (RACI) charting was introduced by Xerox in the 1960s to be used as a participative tool to allow team members to better understand what is expected, to prevent oversight, and to designate appropriate responsibility and authority to accomplish necessary tasks. The RACI chart or model allows for key individuals to clarify their roles and responsibilities in relation to various functions and activities pre-defined by responsible organization managers. The chart allows such key individuals to assign themselves as either responsible, accountable, consulted, or informed with respect to the various activities. Another methodology uses a competency table to allow for defining such key individuals according to their competency levels, i.e., categorizes such competency levels as either: learning, using, guiding, or innovating. A further methodology segments competency into knowledge, skills, and behavior. Each of these respective methodologies individually have certain deficiencies. Thus, recognized by the Applicant is the need for a system that can include and can combine the various tools to overcome such individual deficiencies. More specifically, recognized is the need for a system and methodology that can capture information on an organization's functions and activities; that can link together as a best practices means of linking roles, tasks and skills; and that is integrated to provide a comprehensive model for capturing the information necessary for realigning an organization from the top level information on functions and activities through the lower-level information on tasks, roles, knowledge and, and skills.

SUMMARY OF THE INVENTION

In view of the foregoing, embodiments of the present invention advantageously provide a new, comprehensive, and user-friendly system and methodology including steps for defining organization elements including functions, activities, tasks, roles, and role competencies in an organization. Embodiments of the present invention provide a solution for how to realign an organization while minimizing the impact on the organization's personnel. Advantageously, embodiments of the present invention include a system that provides a proven and structured methodology with supporting tools and templates to realign an organization structure to a new management direction. Embodiments of the system allow for building on future functions and activities defined by a management team and can identify the tasks, roles, interactions, competencies, and staff levels required by the new organization structure using the activities provided by a management team as a starting point. Advantageously, the time duration between milestones can be less for departments or divisions that later follow such process as organization specific templates would be already developed and designed. Embodiments of the present invention can describe data requirements from three perspectives: demand, supply, and competence.

Advantageously, embodiments of the present invention provide a system, program product, and related methods to realign an organization structure to new business goals and to assign individuals based on competencies and interests, which can to capture data and calculate workload requirements during organization realignment. For example, according to an embodiment of the present invention, a system to realign an organization structure includes a computer network, at least one computer accessible to the computer network to define an organization realignment program server, a database accessible to the processor of the organization realignment program server and having a plurality of data records relating to functions, activities supporting the functions, tasks required to complete the activities, and roles to perform the tasks. The system also includes a plurality of process development team member computers each positioned remote from the organization realignment program server and accessible to the computer network and having a processor, memory coupled to the processor, a display in communication with the processor to display data records using an associated process development team member web browser, and a user interface in communication with the processor to provide an associated process development team member with online access to the data records over the computer network to facilitate reorganization program development. The system can also include a plurality of process development representative computers and/or competency lead computers positioned remote from the organization realignment program server and accessible to the computer network and having a processor, memory coupled to the processor, a display in communication with the processor to display data records using an associated web browser stored in the memory, and a user interface in communication with the processor to provide online access to the plurality of data records over the computer network. That is, the process development representative or representatives can view and edit activity and role data and the competency lead or leads can view and edit competency valuation data.

The system can also include an organization realignment program product stored in the memory of the organization realignment program server to facilitate reorganization program development through online access to the plurality of data records. The organization realignment program product can include a functions former positioned to provide data to display an online functions and activities template form having a plurality of input fields and to receive user input data indicating for each of a plurality of functions a name of the respective function and a name of each of a plurality of corresponding activities under each respective one of the plurality of functions. The program product can also include an activity analysis suggestion former positioned to provide data to display an online activity analysis suggestion template form having a plurality of activity analysis attribute input fields and to receive user input data indicating activity analysis attributes to thereby assemble activity analysis suggestion data separately for each of the plurality of activities under each respective one of the plurality of functions. The program product can also include a finalized activity analysis former positioned to provide data to display an online finalized activity analysis template form having a plurality of activity attributes input fields and positioned to receive user input data indicating finalized activity attributes to thereby assemble finalized activity analysis data separately for each selected one of the plurality of activities under each respective one of the plurality of functions.

The organization realignment program product can also include a task former positioned to provide data to display an online task template form having a task input field and positioned to receive through the task input field user input data indicating a task description to thereby assemble a task list separately for each selected one of the plurality of activities under each respective one of the plurality of functions, and can include a role task former positioned to provide data to display an online role template form having a role responsibility level input field and positioned to receive role responsibility level input field user input data indicating a role interaction required to complete each task defining a role responsibility level to thereby separately assign at least one role to each task on the task list for each selected one of the plurality of activities under each respective one of the plurality of functions.

The organization realignment program product can also include a role competency suggestion former positioned to provide data to display an online role competency suggestion template form having a plurality of role competency attribute input fields and positioned to receive through the role competency attribute input fields user input data indicating role competency attributes to thereby assemble role competency suggestion data separately for each selected one of a plurality of roles associated with the plurality of activities under each respective one of the plurality of functions. The program product can also include a role competency former positioned to provide data to display an online role competency template form having a plurality of role competency input fields and positioned to receive through the role competency input fields user input data indicating role competency attributes to thereby assemble finalized role competency data to develop an online role competency self-evaluation template form separately for each selected one of the plurality of roles associated with the plurality of activities under each respective one of the plurality of functions. Included also is a role competency report former positioned to compile role competency self-evaluation results data responsive to at least one role competency self-evaluation and to provide data to display an online role competency report form having a plurality of role competency output fields indicating qualification for and interest in each of the plurality of roles by each of a plurality of organization members to thereby display a qualified resource supply for each of the plurality of roles to support assignment of the organization members to the plurality of roles.

The organization realignment program product can also include a qualified resource supply determiner positioned to determine a qualified supply of resources responsive to the role competency self-evaluation of each of the plurality of organization members and to provide data to display a web page form indicating the qualified supply of resources. Also included is a demand estimate determiner positioned to compile a demand estimate for each of the plurality of roles and to provide data to display a demand estimate report form indicating a number of resources required per day for each of the plurality of roles to perform assigned tasks within activities of each of the plurality of functions, and a skills gap analysis template former positioned to cause display of skills gap analysis results data responsive to role identification data, demand estimate data, and qualified supply data to thereby enhance organization transition planning. The demand estimate determination can be made, responsive to an estimated number of hours or other unit of time required of each role to perform assigned tasks within activities of each of the plurality of functions and responsive to the determined average number of assignable hours per day for each of the plurality of roles, to determine an estimated number of days required for each role to perform assigned tasks within each activity under each one of the plurality of functions to thereby determine the demand estimate defining a number of resources required for each role to perform activities of each one of the plurality of functions.

Embodiments of the present invention also include methods of realigning an organization structure. For example, according to an embodiment of the present invention, a method of realigning an organization structure can include the steps of determining a need to realign an existing organization structure to a new organization structure, defining a plurality of major functions of the new organization structure, and providing a plurality of organization realignment workshops each including an agenda, a presentation, a learning-in-action exercise, and post-workshop individual and team assignments to exploit newly acquired knowledge and skills, to thereby communicate information to selected organization members defining process development team members and involve the process development team members in performing tasks, to avert anxiety associated with organization change resulting from the realignment, and to encourage learning, promote a sense of ownership, and encourage full involvement in realigning to the new organization structure. The workshops can include an activity analysis workshop to provide the process development team members tools to formulate activities supporting each the functions, a tasks and roles workshop to provide the process development team members tools to formulate tasks and roles for each of the activities, a resource availability and role man-hours workshop to provide the process development team members tools to estimate a hands-on workload effort for the roles and to estimate the total workload requirement for the new organization structure, and a role competency and activity frequency workshop to provide the process development team members tools to determine an estimated frequency of each of the activities and to define competency levels required for each of the roles. The method can also include developing individual transition plans to transition organization members out of current obligations and into the new roles needed to perform the newly identified tasks. A lessens learn workshop can also be included to enhance procedures necessary to repeat the process or to implement the process on, for example, a different organization division.

According to an embodiment of the present invention, a method of realigning an organization structure can include the steps of determining a need to realign an existing organization structure to a new organization structure, developing an organization transition plan to realign the existing organization structure to the new organization structure, defining or otherwise describing a plurality of major functions of the new organization structure, identifying at least one activity for each of the plurality of major functions of the new organization structure, providing an activity analysis workshop exercise to train each of a plurality of selected organization members defining a respective plurality of process development team members to analyze each activity and, responsive to the respective activity analysis, formulating tasks to thereby support each activity. According to an embodiment of the present invention, a plurality of process development teams can be formed from the plurality of process development team members to analyze each of the plurality of activities, and responsive to the activity analysis, the process development team members can formulate at least one task supporting at least one activity of each of the plurality of functions.

According to an embodiment of the present invention, a method of realigning an organization structure can include the steps of providing a suggested activity analysis input web page form to each of a plurality of process development team members to enter a suggested analysis for each of a plurality of activities of an assigned function, and providing a finalize activity analysis input web page form to each of a plurality of process development team representatives to enter a finalized analysis for each of the plurality of activities of the assigned function. The suggested activity analysis input web page form can have a plurality of input fields providing for entry of a description of a plurality of activity attributes and responsive to process development team member input can receive a suggested activity description. The finalize activity analysis input web page form can have a plurality of input fields providing for entry of a description of a plurality of activity attributes responsive to process development team representative input and responsive to review of the suggested activity analysis provided by each of the plurality of process development team members to thereby receive a finalized activity description. The method can also include storing each finalized activity analysis in a database accessible to an online communication network responsive to posting each respective finalized activity analysis to thereby allow multi-party access to each finalized activity analysis, and alerting online each of a preselected plurality of organization members of the posting of each respective finalized activity analysis responsive to the posting of each respective finalized activity analysis to thereby solicit comment from each of the preselected plurality of organization members.

According to an embodiment of the present invention, a method of realigning an organization structure can include the steps of defining a plurality of activities to support major functions of a new organization structure, providing a task and roles workshop to train each of a plurality of selected organization members defining a respective plurality of process development team members to thereby formulate tasks and roles for each of the plurality of activities supporting the major functions of the new organization structure to enable identification of competencies and skill sets required to successfully complete each of the plurality of activities, developing and sequentially listing by each of the plurality of process development team members a plurality of tasks individually determined to be required to accomplish each respective one of the plurality of activities for each respective major function, and determining by each of the plurality of process development team members at least one role required to perform each one of the plurality of tasks determined to be required to accomplish each respective one of the plurality of activities for each respective major function.

According to an embodiment of the present invention, a method of realigning an organization structure can include the step of defining a plurality of activities to support major functions of a new organization structure, providing a suggested task analysis input web page form to each one of a plurality of process development team members to enter a plurality of tasks and to assign roles for each of a plurality of activities associated with an assigned one of a plurality of major functions. The suggested task analysis input web page form can have an input field providing for entry of each task associated with a selected one of the plurality of activities and an input field to associate at least one role thereto and, responsive to process development team member input, can receive a plurality of tasks and associated roles defining a suggested task list required to perform the selected activity. The method can also include the steps of performing process development team meetings by each of a plurality of process development teams to combine, streamline, or revise each respective task list, and providing a finalized task analysis input web page form to each of a plurality of process development team representatives to enter a plurality of tasks and to assign roles for each one of the plurality of activities. The finalized task analysis input web page form can have an input field providing for entry of each task associated with a selected one of the plurality of activities and an input field to associate at least one role thereto responsive to process development representative input to thereby receive the finalized task list of the respective selected activity. The method can further include the steps of storing each finalized list of tasks in a database accessible to an online communication network responsive to posting each respective finalized list of tasks to thereby allow multi-party access to each finalized task list, and notifying online each of a preselected plurality of affected organization members of the posting of each respective finalized task list responsive to the posting of each respective finalized task list to thereby solicit comment from each of the preselected plurality of affected organization members.

According to an embodiment of the present invention, a method of realigning an organization structure can include the steps of defining a plurality of activities to support major functions of a new organization structure, developing a listing of a plurality of tasks and associated roles to accomplish for each of the plurality of activities, providing a resource availability and role man-hours workshop to train each of a plurality of selected organization members defining a respective plurality of process development team members to thereby prepare the plurality of process development team members to use the listing of tasks and roles to determine resource availability and required role competencies for each of the plurality of roles, and estimating a hands-on time requirement required to complete each of the plurality of tasks by each respective associated responsible role responsive to individual and collective experience of the plurality of process development team members to thereby estimate a total workload requirement for the new organization structure.

According to an embodiment of the present invention, a method of realigning an organization structure can include the steps of defining a plurality of activities to support a plurality of major functions of a new organization structure, developing a listing of a plurality of tasks and associated roles to accomplish for each of the plurality of activities, determining demand on each one of the plurality of roles within each one of the plurality of functions, providing a demand estimate template to thereby display demand for each one of the plurality of roles within each one of the plurality of functions, determining aggregate demand for each of the plurality of roles, and providing a demand aggregation template to thereby display aggregate demand for each one of the plurality of roles, to thereby enhance resource development management.

According to an embodiment of the present invention, a method of realigning an organization structure can include the steps of defining a plurality of activities to support major functions of a new organization structure, developing a listing of a plurality of tasks and associated roles to accomplish for each of the plurality of activities, and providing a role competency and activity frequency workshop to train each of a plurality of selected organization members defining a respective plurality of process development team members to thereby determine an estimated frequency of each of the plurality of activities and to thereby define skill sets required for each of the plurality of roles. The method can also include analyzing each of the plurality of activities to determine an estimated frequency to which each of the plurality of activities is accomplished over a preselected time period, and analyzing each of the plurality of roles to thereby define competency for each respective role.

According to an embodiment of the present invention, a method of realigning an organization structure can include the steps of defining a plurality of activities to support major functions of a new organization structure, developing a listing of a plurality of tasks and associated roles to accomplish for each of the plurality of activities, and determining a total demand on each role based on associated tasks each role is responsible for performing across associated functions to thereby define an aggregate resource demand. The aggregate demand further can be determined by identifying a sum of products of time duration to perform each associated task and an aggregate frequency of the respective task. The method also includes the steps of determining a number of qualified personnel having a required competency available to fulfill each one of the plurality of roles to thereby determine a qualified resource supply, and determining a skills gap in transitioning to the new organization structure defined as a difference between aggregate resource demand and qualified resource supply.

According to an embodiment of the present invention, a method of realigning an organization structure can include the steps of determining a need to realign an existing organization structure to a new organization structure, developing an organization transition plan to realign the existing organization structure to the new organization structure, defining a plurality of major functions of the new organization structure, identifying at least one activity for each of the plurality of major functions of the new organization structure, developing a listing of a plurality of tasks and associated roles to accomplish for each of the plurality of activities, estimating time durations for each of a plurality of task-role combinations, identifying an estimated frequency and complexity of the each of the plurality of activities to thereby determine resource demand for the new organization structure, describing or otherwise defining competency for each of the plurality of roles, determining a number of qualified personnel having a required competency available to fulfill each one of the plurality of roles to thereby determine a qualified resource supply available to the new organization structure, and determining a skills gap in transitioning to the new organization structure defined as a difference between aggregate resource demand and qualified resource supply.

Embodiments of the present invention also include a computer readable medium that is readable by a computer to realign an organization structure. For example, according to an embodiment of the present invention, a computer readable medium can include a set of instructions that, when executed by a computer, cause the computer to perform the operation of providing a plurality of organization analysis web pages associated with an organization realignment web site to thereby provide a repository for data developed by a plurality of organization members defining process development team members to capture data used to analyze and define functions, activities, tasks, and roles, forming a new organization structure and to provide access to the data by organization member participants during transition between an old organization structure to the new organization structure to encourage learning, promote a sense of ownership, and encourage full involvement in realigning the organization structure. The instructions can also include those to perform the operations of providing a plurality of resource determination web pages associated with an organization realignment web site to thereby determine a qualified supply of resources available to the new organization structure. The resource determination web pages can include at least one role competency self-evaluation web page form used to evaluate organization members competency in performing a plurality of roles identified to perform associated tasks supporting at least one of a plurality of activities under each respective one of a plurality of functions. The instructions to also include those to perform the operation of providing at least one requirements web page associated with an organization realignment web site to determine a skills gap and a resource gap between resources demanded by the new organization structure and the qualified supply of resources.

According to an embodiment of the present invention, a computer readable medium can include a set of instructions that, when executed by a computer, cause the computer to perform the operation of providing to an organization member defining a process development team member a suggested activity analysis input web page form associated with a selected one a plurality of activities of a selected one of a plurality of functions to separately enter a suggested activity analysis for each selected one of the plurality of activities to thereby assemble activity analysis suggestion data for each of the plurality of activities under the selected one of the plurality of functions. Advantageously, the suggested activity analysis input web page form can have a plurality of activity analysis attribute input fields adapted to receive user input data indicating a description of a corresponding plurality of activity attributes for a selected one of the plurality of activities responsive to process development team member input. The instructions can also include those to perform the operation of alerting online one of a plurality of organization members associated with the selected one of the plurality of functions defining a process development representative of a posting of a respective activity analysis suggestion for the selected one of the plurality of activities responsive to activity analysis suggestion form submission for the selected one of the plurality of activities.

According to an embodiment of the present invention, a computer readable medium can include a set of instructions that, when executed by a computer, cause the computer to perform the operation of providing to an organization member defining a process development representative a finalize activity analysis input web page form associated with each of a selected one of a plurality of activities of a selected one of a plurality of functions to separately enter a finalized activity analysis for each selected one of the plurality of activities to thereby post a finalized activity analysis for each of the plurality of activities under the selected one of the plurality of functions. Advantageously, the finalize activity analysis input web page form can have a plurality of input fields adapted to receive user input data indicating a description of a corresponding plurality of activity attributes for a selected one of the plurality of activities responsive to a plurality of suggested activity analysis by each of a corresponding plurality of organization members defining process development team members and responsive to process development representative input. The instructions can also include those to perform the operation of storing each finalized activity analysis in a database accessible to an online communication network responsive to posting each respective finalized activity analysis to thereby allow multi-party access to each finalized activity analysis, and perform the operation of alerting online each of a preselected plurality of organization members of the posting of each respective finalized activity analysis responsive to the posting of each respective finalized activity analysis to thereby solicit comment from each of the preselected plurality of organization members.

According to an embodiment of the present invention, a computer readable medium can include a set of instructions that, when executed by a computer, cause the computer to perform the operation of providing to each one of a plurality of organization members defining a corresponding plurality of process development team members a suggested task analysis input web page form associated with a selected one of a plurality of activities of a selected one of a plurality of functions to separately enter one or more tasks for each selected one of the plurality of activities and to assign roles thereto. The suggested task analysis input web page form can have an input field providing for iterative entry of a plurality of tasks associated with a selected activity defining a suggested task list required to perform the selected activity and an input field to associate at least one role thereto and responsive to process development team member input can receive one or more tasks and associated roles. The instructions can also include those to perform the operation of storing each suggested task list in a database accessible to an online communication network responsive to posting each respective suggested task list to thereby allow access to each suggested task entered by one of the plurality of process development team members by the other of the plurality of process development team members, and perform the operation of alerting online the process development representative of a posting of a suggested task list for the selected one of the plurality of activities to thereby notify the process development representative that a new suggested task list analysis for the selected one of the plurality of activities has been posted.

According to an embodiment of the present invention, a computer readable medium can include a set of instructions that, when executed by a computer, cause the computer to perform the operation of providing to an organization member defining a process development representative a finalized task analysis input web page form associated with a selected one of a plurality of activities of a selected one of a plurality of functions to separately enter a plurality of tasks and to assign roles for each selected one of the plurality of activities to thereby receive the finalized task list for each of the plurality of activities under the selected one of the plurality of functions. The finalized task analysis input web page form can have an input field providing for entry of each task associated with a selected one of the plurality of activities and an input field to associate at least one role thereto responsive to process development representative input. The instructions can also include those to perform the operations of storing each finalized list of tasks in a database accessible to an online communication network responsive to posting each respective finalized list of tasks to thereby allow multi-party access to each finalized task list, storing each role for each associated task for the selected activity in the database to thereby allow multi-party access to each role, and alerting online each of a preselected plurality of organization members of the posting of each finalized task list responsive to the posting of each respective finalized task list to thereby solicit comment from each of the preselected plurality of organization members. The instructions can also include those to perform the operations of associating one or more roles with each of the plurality of tasks for each one of the plurality of activities, providing a role responsibility level input web page form having an input field providing for entry of a required responsibility level associated with each task and role combination, and assigning each task and role combination a required responsibility level with the role responsibility level indicating a role interaction required to complete each task.

According to an embodiment of the present invention, a computer readable medium can include a set of instructions that, when executed by a computer, cause the computer to perform the operations of providing an online role competency suggestion template form separately associated with a separate one of a plurality of roles and having a plurality of role competency attribute input fields adapted to receive user input data indicating role competency attributes to thereby assemble role competency suggestion data for each selected one of the plurality of roles associated with the plurality of activities under each respective one of a plurality of functions, and providing an online role competency template form having a plurality of role competency input fields adapted to receive user input data indicating role competency attributes to thereby assemble finalized role competency data to develop an online role competency self-evaluation form for each selected one of the plurality of roles associated with the plurality of activities under each respective one of the plurality of functions. The instructions can also include those to perform the operations of compiling the role competency self-evaluation results data responsive to at least one role competency self-evaluation, and providing an online role competency self-evaluation results report indicating results of the self-evaluation. Advantageously, the online role competency report can have a plurality of role competency output fields indicating qualification for and interest in each of the plurality of roles by each of a plurality of organization members to thereby display a qualified resource supply for each of the plurality of roles to support assignment of organization members to the plurality of roles.

According to an embodiment of the present invention, a computer readable medium can include a set of instructions that, when executed by a computer, cause the computer to perform the operations of receiving a plurality of activities to support major functions of a new organization structure responsive to user input, receiving a listing of a plurality of tasks and associated roles to accomplish for each of the plurality of activities responsive to user input, calculating a sum of products of a time duration to perform each associated task and an aggregate frequency of the respective task to determine a total demand on each role based on associated tasks each role is responsible for performing across associated functions defining an aggregate resource demand, determining a number of qualified personnel having a required competency level and availability to fulfill each one of the plurality of roles to thereby determine a qualified resource supply, and determining a skills gap in transitioning to the new organization structure responsive to role identification, aggregate resource demand, and qualified resource supply, to thereby enhance organization transition planning.

Embodiments of the present invention can also include a computer memory element containing, stored in signal bearing media, a database containing data in computer readable format. For example, according to an embodiments present invention, the database can include data indicating a plurality of functions for a new organization structure, data indicating a separate plurality of activities associated with and supporting each one of the plurality of functions of the new organization structure, data indicating a separate listing of a plurality of tasks and associated roles for each one of the plurality of activities, data indicating a total demand on each role based on associated tasks each role is responsible for performing across associated functions defining an aggregate resource demand, data indicating a number of qualified personnel having a required competency level and available to fulfill each one of the plurality of roles indicating a qualified resource supply, and data indicating a skills gap in transitioning to the new organization structure. The database can also include data indicating a required responsibility level for each task and role combination, and data indicating time duration for each of a plurality of categories of complexities for each task and role combination. The database can also include data indicating a separate plurality of role competency attributes for each of the plurality of roles, and data indicating user interest and each of the plurality of roles by each of a plurality of organization members.

Advantageously, embodiments of the present invention provide an organization with a solution for defining how it can realign an organization to a new management direction while promoting high involvement among employees to reduce resistance to change, using pre-defined templates (workshop presentations, workshop agendas, workshop hand-outs/exercises), and procedures for greater efficiency, auto-notification upon entry of functions, activities, tasks and roles in the web-based information system. Embodiments of the system provide a reduction in employee resistance to change and the time it takes to transition people to new roles, a reduction in time using pre-defined templates and procedures as opposed to organizations starting from scratch, an avoidance of costs associated with internal campaigning and employee training as employees are highly involved in during the course of implementation, an avoidance of costs associated with having separate systems for workload planning and documentation of organizational functions, and the benefit from employees learning-in action.

Advantageously, embodiments of the present invention can use a systematic means of capturing the required data generated by the transition process including use of a centralized on-line web site to enter and access information generated during the transition and use of tools (i.e., forms, templates, workshops) to support the transition process. Embodiments of the system also incorporate a methodology for developing individual transition plans to improve individual personal development opportunity and can link to a set computer center performance management program. Advantageously, realignment of an organization is dealt with in a structured manner while uniquely combining a number of industry-standard tools which when used in combination allow for an unconventional analysis of the organization according to its functions, activities, tasks, roles, and competencies. Advantageously, the system can also use a number of industry-standard tools for identifying role competencies and for identifying relevant parties in tasks and processes, which when combined together and with the use of supporting templates and workshops form a systematic means of realigning an organization structure to new business goals and assigning individuals based on their competencies and interests which overcome deficiencies in using such tools individually. For example, a modified learn, use, guide, innovate (LUGI) type matrix can be used for identifying role competencies, and a modified responsible, accountable, consult, inform (RACI) type table can be used for identifying relevant parties in tasks and processes. Organization members are highly involved in the organization realignment through participating in defining the various organizational elements of the organization and can perform a self-evaluation of themselves against the various roles necessary to complete various tasks supporting the organization activities and functions, which can enhance participant creativity and innovativeness.

Advantageously, embodiments of the present invention provide a business transformation service having increased transparency that can maximize opportunities for individual and organizational learning and promote involvement in the change, thus encouraging ownership. To this end, embodiments of the present invention can provide a series of workshops conducted using pre-defined templates and procedures provided by knowledgeable human resources (skilled consultants) which are utilized to coach and counsel employees in the reorganization process. Advantageously, embodiments the present invention also provide a lessons learned workshop for receiving feedback from users in order to provide additional tailoring to meet the needs of the individual organization and to improve the reorganization process as a whole. Also advantageously, an online system can be provided to receive input from the organization personal, which can be scaled to meet the needs of to any organization. Advantageously, to obtain the benefits of transparency in a learning organization (i.e., knowledge transfer, self-disciplined, innovation, and prudent risk-taking), the communication and interaction efforts of embodiments of the system account for variations in the organization members learning styles, levels of experience and learning rates, understanding, listening skills, ability to apply what is learned, and unique insight, realizing that normally only reusable and learnable processes add value to the organization. As identified above, organization members have different preferred learning styles. As such, advantageously the system and methods can ensure key messages are communicated through multiple avenues, through different vehicles, and by properly selected messengers to increase the likelihood of understanding. Organization members can also have varying levels of experience and may learn had a different pace. As such, advantageously, the systems and methods can provide for active coaching during group and individual data development. Organization members may not, as intended, have heard or understood information conveyed. As such, advantageously, the systems and methods can provide for assessing the success of communication efforts regularly by frequently "checking back" with participants. Adult learning has been found to be vastly enhanced by experiential opportunity. As such, advantageously the systems and methods can promote hands-on practice and the quick use of newly acquired skills. Organization members can have differing views, opinions, and ideas aimed at improving practices. As such, advantageously, the systems and methods can provide for soliciting feedback formally and informally and promote comment by, and individual accountability of, the participants. Also, advantageously, pervasive through the systems and methods is the recognition that to achieve such advantages requires active, visible, and focused management sponsorship.

Advantageously, embodiments of the present invention provide an online website to capture and report out necessary information as it is being developed and provide transparent access to organization realignment participants throughout the transition. The online Web technology can provide a central repository for information developed by each process development team and can encourage interested personnel who are not members of the process development team to "comment" on contributions using a familiar technical environment. Advantageously, the webpage forms ensure information is presented uniformly for all functions, activities, tasks, roles, and competencies. Also advantageously, according to embodiments of the present invention, the website design provides essential flexibility with features including a pull-down list to which, for example, new roles can be added to be associated with an activity, RACI codes can be assigned, and LUGI-type self-assessments can be performed. Also advantageously, the website can incorporate automated online notification, e.g., e-mail, to accelerate online review of newly posted data and to ensure appropriate parties are automatically notified when certain updates are made to the site. Further, advantageously, authorization profiles can be provided to ensure only preselected representatives enter final versions while allowing other members to comment on such versions. Still further, advantageously, the website provides the ability of the process development team members to remotely monitor data input via the website, which results in prioritization and steering of follow-up activities.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 1 is a schematic block diagram of a system to realign an organization structure according to an embodiment of the present invention;

FIG. 3 is a schematic diagram of an exemplary transition plan identifying activities, task requirements, and roles according to an embodiment of the present invention;

FIG. 5 is a schematic block diagram of an organization realignment program product according to an embodiment of the present invention;

FIG. 9 is a screen view of a graphical user interface illustrating an exemplary activity analysis suggestion web page form according to an embodiment of the present invention;

FIG. 10 is a screen view of a graphical user interface illustrating an exemplary activity analysis suggestion web page form according to an embodiment of the present invention;

FIG. 13 is a screen view of a graphical user interface illustrating an exemplary "view all activity analysis suggestions" web page according to an embodiment of the present invention;

FIG. 16 is a screen view of a graphical user interface illustrating an exemplary finalized activity analysis web page form according to an embodiment of the present invention;

FIG. 21 is a screen view of a graphical user interface illustrating an exemplary role complexity and time durations report web page form according to an embodiment of the present invention;

FIG. 29 is a schematic diagram illustrating an exemplary role competency/qualified resource supply report form according to an embodiment of the present invention;

FIG. 30 is a schematic diagram illustrating an exemplary resource commitment template form according to an embodiment of the present invention;

FIG. 31 is a schematic diagram illustrating an exemplary qualified supply template form according to an embodiment of the present invention;

FIG. 32 is a schematic diagram illustrating an exemplary assignable man-hour determination according to an embodiment of the present invention;

FIG. 38 is a schematic diagram of table illustrating an activity analysis workshop agenda according to an embodiment of the present invention;

FIG. 39 is a schematic diagram illustrating an activity analysis workshop live exercise template form according to an embodiment of the present invention;

FIG. 40 is a schematic diagram illustrating an activity analysis workshop team exercise template according to an embodiment of the present invention;

FIG. 41 is a schematic diagram illustrating an activity analysis workshop team action items template according to an embodiment of the present invention;

FIG. 43 is a schematic diagram of table illustrating a task and roles workshop agenda according to an embodiment of the present invention;

FIG. 44 is a schematic diagram illustrating a task and roles workshop live exercise template form according to an embodiment of the present invention;

FIG. 46 is a schematic diagram of table illustrating a resource availability and role man-hours workshop agenda according to an embodiment of the present invention;

FIG. 47 is a schematic diagram illustrating a resource availability and role man-hours workshop live exercise template according to an embodiment of the present invention;

FIG. 49 is a schematic diagram of table illustrating a role competency and activity frequency workshop agenda according to an embodiment of the present invention;

FIG. 50 is a schematic diagram illustrating an activity frequency/complexity exercise template according to an embodiment of the present invention;

FIG. 51 is a schematic diagram illustrating an exemplary single-function activity frequency/complexity analysis table according to an embodiment of the present invention;

FIG. 52 is a schematic diagram illustrating an exemplary competency self-evaluation analysis table according to an embodiment of the present invention;

FIG. 53 is a schematic diagram illustrating a role competency and activity frequency workshop live exercise template according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. The prime notation, if used, indicates similar elements in alternative embodiments.

Figures 55, 56:
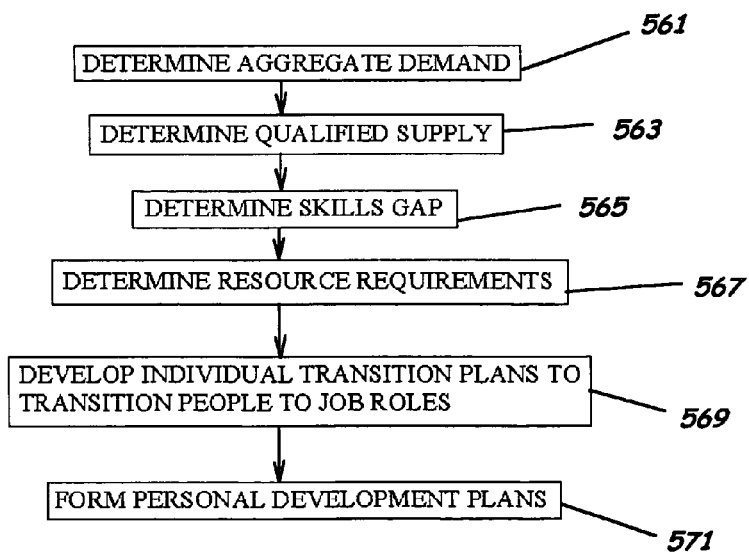
FIG. 55 is a schematic diagram of table illustrating a lessons learned workshop agenda according to an embodiment of the present invention.
FIG. 56 is a schematic block flow diagram of a method of realigning an organization structure according to an embodiment of the present invention.

As illustrated in FIGS. 1-56, embodiments of the present invention advantageously can provide a new, comprehensive, and user-friendly web/Internet-based system, program product, and methods that automate business functions and activities that occur during organization realignment and during organization realignment preparation, as well as provide various management functions that support organization realignment. As will be described in more detail below, major milestones or goals for developing a plan to transition/realign the organization according to embodiments of the present invention include developing a list of activities with descriptions; developing standard roles for the new organization structure; developing, e.g., web-based forms to capture data necessary to form the new organization structure; developing tasks and role descriptions; developing activity level process maps; conducting surveys; identifying resource availability; performing resource planning; finalizing transition team structure; and completing a transition plan by a selected completion date.

Figure 2A:
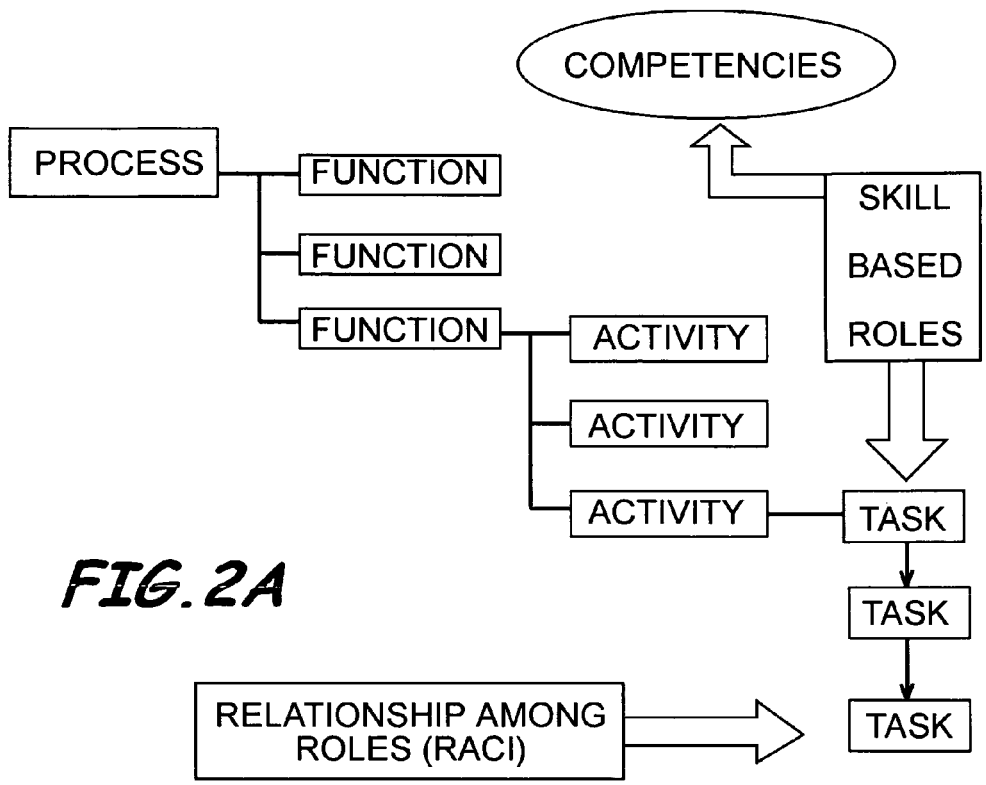
FIG. 2A is a schematic diagram of a process flow illustrating the relationship of processes, functions, activities, tasks, roles, skills, and competencies according to an embodiment of the present invention.
Figure 2B:
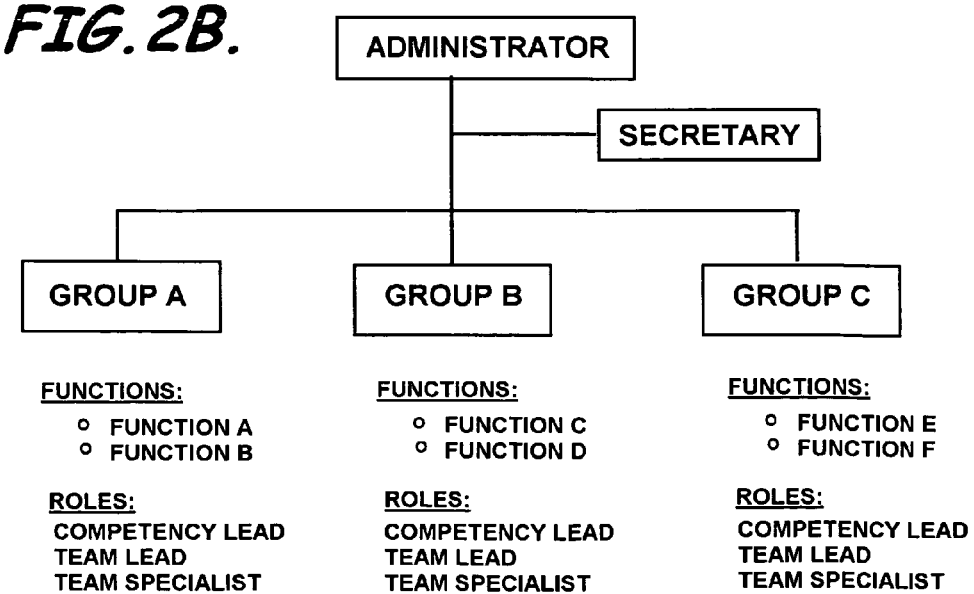
FIG. 2B is a schematic diagram of an organization team structure illustrating functions, activities, tasks and roles defined during the transition process according to an embodiment of the present invention.

FIG. 2A illustrates a process flow showing the relationship of processes, functions, activities, tasks, roles, skills, and competencies, an organization includes high-level processes that are made up of functions. Prior to executing an organizational transition plan, functions can be defined, e.g., by management, as expectation of the general scope of work performed. For each function, a number of activities are then identified. To identify roles, each activity can be drilled down to its respective tasks. At a task level, roles can then be identified and assigned. Once roles have been identified, defining skills and competencies can follow which can be then used to ultimately evaluate organization members. FIG. 2B shows an exemplary organization team structure illustrating functions, activities, tasks and roles defined during the transition process. Within each group, a number of roles support the tasks performed as listed under each group. It is important to note that a number of roles can cross different groups/disciplines.

Figure 4:
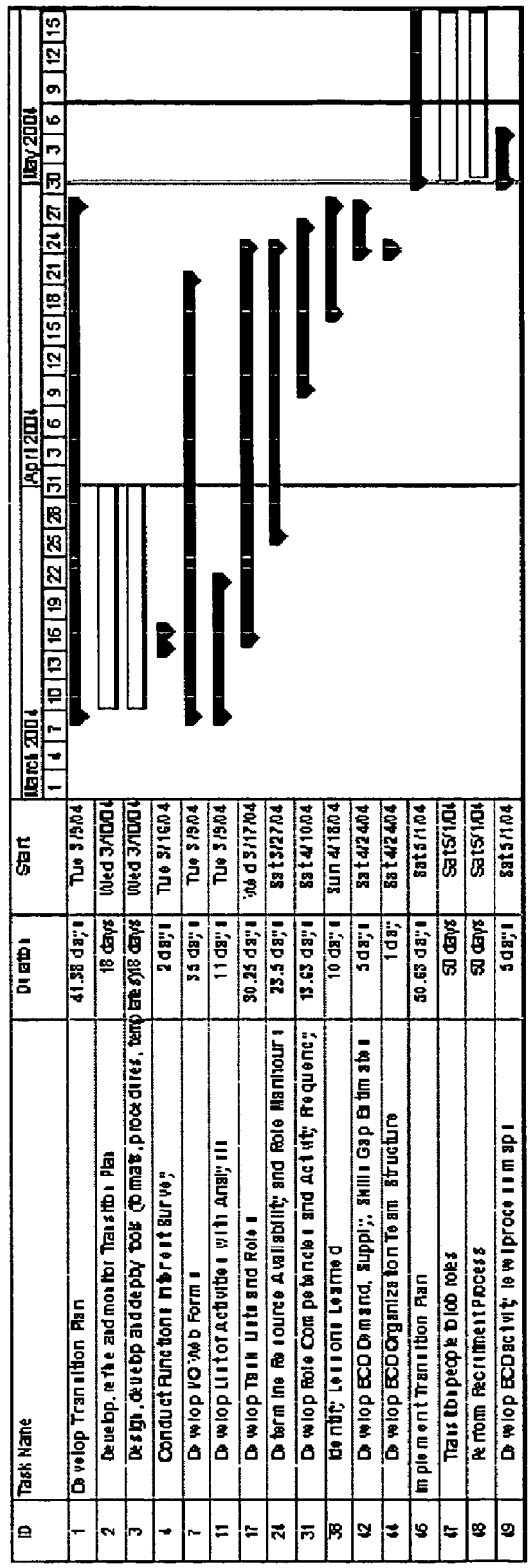
FIG. 4 is a schematic diagram of an exemplary transition plan illustrating subtasks necessary to perform tasks and an accomplishment timeframe according to an embodiment of the present invention.

As perhaps best shown in FIG. 3, a system 30 to realign an organization structure can include training organization members to develop the transition plan through use of deliverables such as that illustrated for performing the organization transformation which can identify an activity, the tasks required to complete the activity, and the roles necessary to perform the tasks. Advantageously, the system 30 also provide for deliverables such as, for example, the milestones timeline illustrated in FIG. 4 which can further illustrate subtasks necessary to perform tasks and an accomplishment timeframe.

Embodiments of a system 30 can provide an electronic forum that links concerned parties and individuals that are participating in an organization realignment or process. Advantageously, such system 30 can facilitate organization realignment through an online organization realignment website. For example, as perhaps best shown in FIG. 1, an embodiment of the system 30 to realign an organization structure can include a computer or computers hosting the online organization realignment program website accessible to a computer or other communication network 33 to define an organization realignment program server 35 having a processor 37 and memory 39 coupled to the processor 37. Note, the computer/server 35 represents a server or server cluster or server farm in the architecture and is not limited to any individual physical server. The server site may be deployed as a server farm or server cluster managed by a serving hosting provider. The number of servers and their architecture and configuration may be increased based on usage, demand and capacity requirements for the system 30.

A database 41 having a plurality of data records 43 relating to functions, activities supporting the functions, activities under the functions, tasks required to complete the activities, and roles to perform the tasks is positioned accessible to the processor 37 of the organization realignment program server 35 and can be considered functionally part of the memory 39 whether or not physically located within server housing. A plurality of process development team member computers 47 are generally positioned remote from the organization realignment program server 35 and accessible to the computer network 33. Each process development team member computer 47 has a processor 49, memory 51 coupled to the processor 49, a display 53 to display data records 43 using an associated process development team member computer web browser, and a user interface 57 to provide a corresponding process development team member with, for example, online web-based access to such data over the computer network 33.

The system 30 can also include a plurality of process development team representative computers 61. Each such computer 61 can have a processor 63, memory 65 coupled to the processor 63, a display 67 to display data using an associated web browser, and a user interface 68 to provide an associated process development team representative with online web/Internet-based access to the data records 43 to thereby view and edit organization realignment data to provide final versions of various organization transition deliverables. The system 30 can also include a plurality of competency lead representative computers 71. Each such computer 71 can have a processor 73, memory 75 coupled to the processor 73, a display 77 to display data using an associated web browser, and a user interface 78 to provide an associated competency lead representative with online web/Internet-based access to the data records 43, to thereby view and edit organization realignment data to thereby help formulate final versions of competency analysis data.

As shown in FIGS. 1 and 5, the system 30 can also include an organization realignment program product 81 stored in the memory 39 of the organization realignment program server 35 to facilitate reorganization program development over the computer network 33 through online access to the data records 43. The organization realignment program product 81 can be in the form of microcode, programs, routines, and symbolic languages that provide a specific set for sets of ordered operations that control the functioning of the hardware and direct its operation, as known and understood by those skilled in the art. The organization realignment program product 81, according to an embodiment of the present invention, need not reside in its entirety in volatile memory, but can be selectively loaded, as necessary, according to various methodologies as known and understood by those skilled in the art. The organization realignment program product 81 includes instructions that when executed by the organization realignment program server 35 and/or other network/networked computers cause such computers to perform various functions to plan and perform organization realignment functions including displaying various web page forms. The organization realignment program 81, for illustrative purposes, will be described according to the functional operations they perform.

Figure 6:
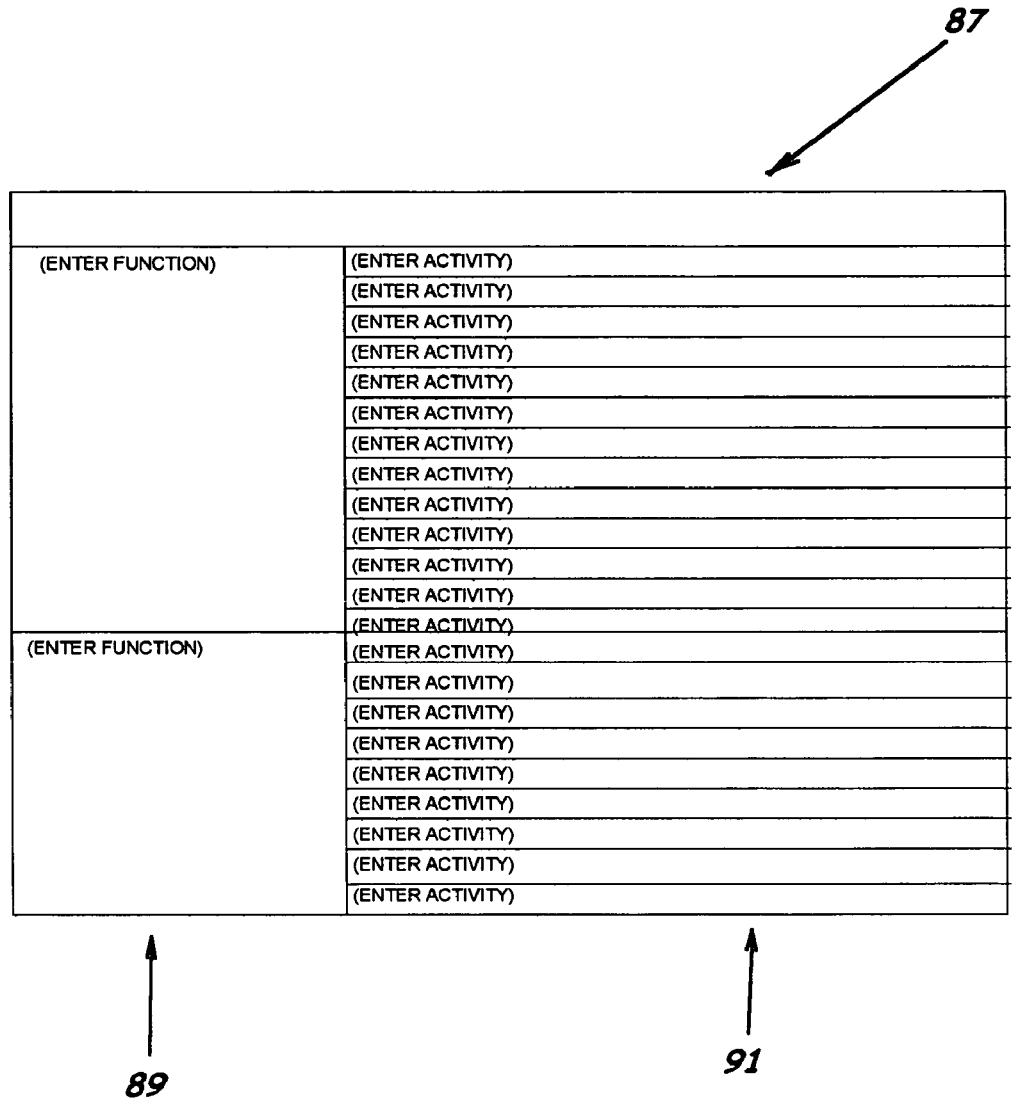
FIG. 6 is a schematic diagram of an exemplary online functions and activities template form according to an embodiment of the present invention.
Figure 7:
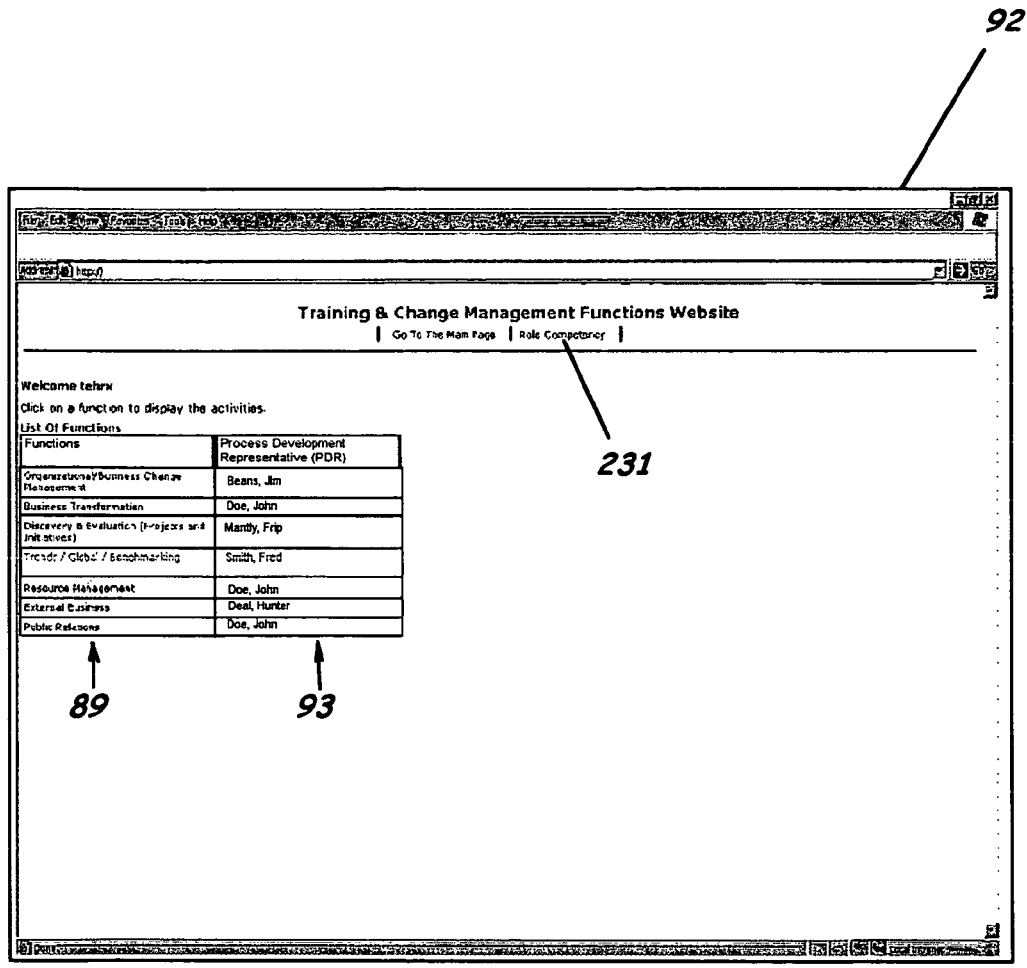
FIG. 7 is a screen view of a graphical user interface illustrating an exemplary functions web page according to an embodiment of the present invention.

For example, the organization realignment program product 81 can include a training materials manager 83 which can provide data to display a plurality of organization transition workshop briefing templates for each of a plurality of organization transition workshops, described later. A functions former 85 can provide data to display an online functions and activities template form 87 (FIG. 6) having multiple input fields and to receive user input data indicating for each separately entered function 89 (FIG. 7) a name of the respective function 89 and a name of each corresponding activity 91 (FIG. 8) under each function 89. Once the functions 89 and corresponding activities 91 are entered and preferably once a process development representative is assigned to each function 89 (described later), organization members can view the function and activity data using, for example, the functions web page 92 illustrated in FIG. 7 along with a name listing of an assigned/selected process development representative 93.

Figure 8:
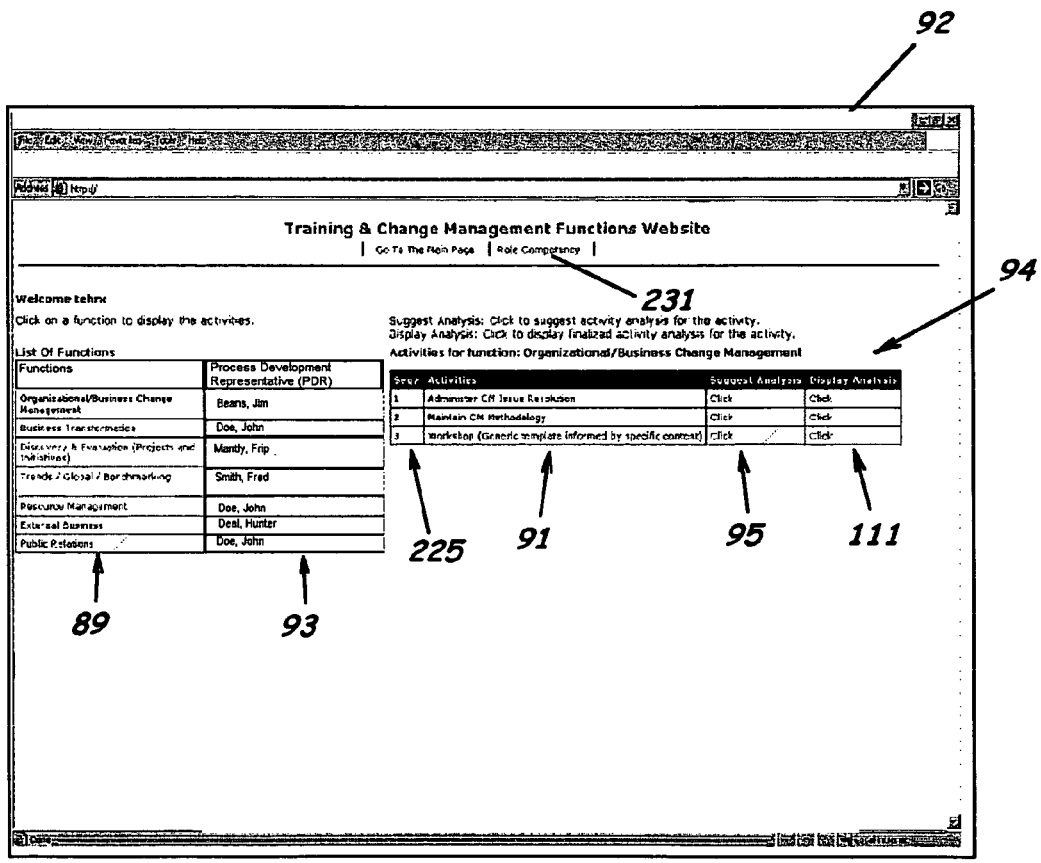
FIG. 8 is a screen view of a graphical user interface illustrating an exemplary functions web page according to an embodiment of the present invention.
Figure 9:
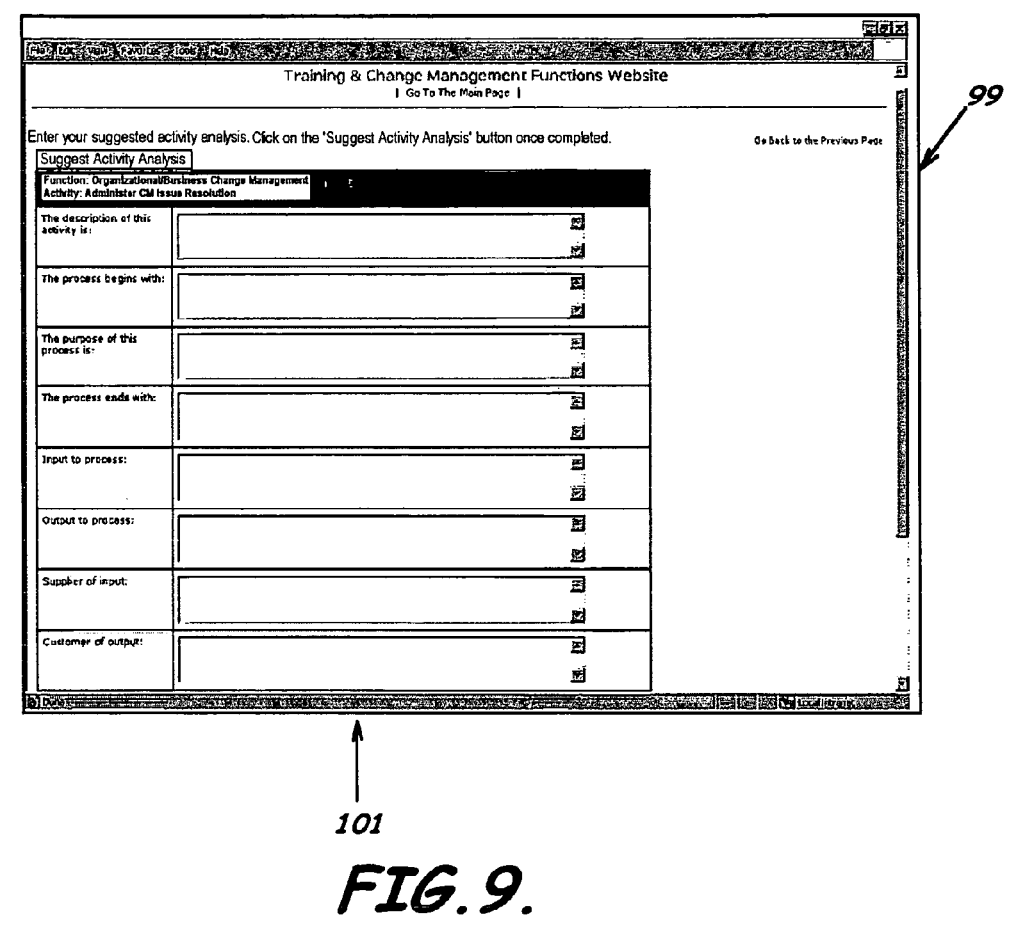
Figure 10:
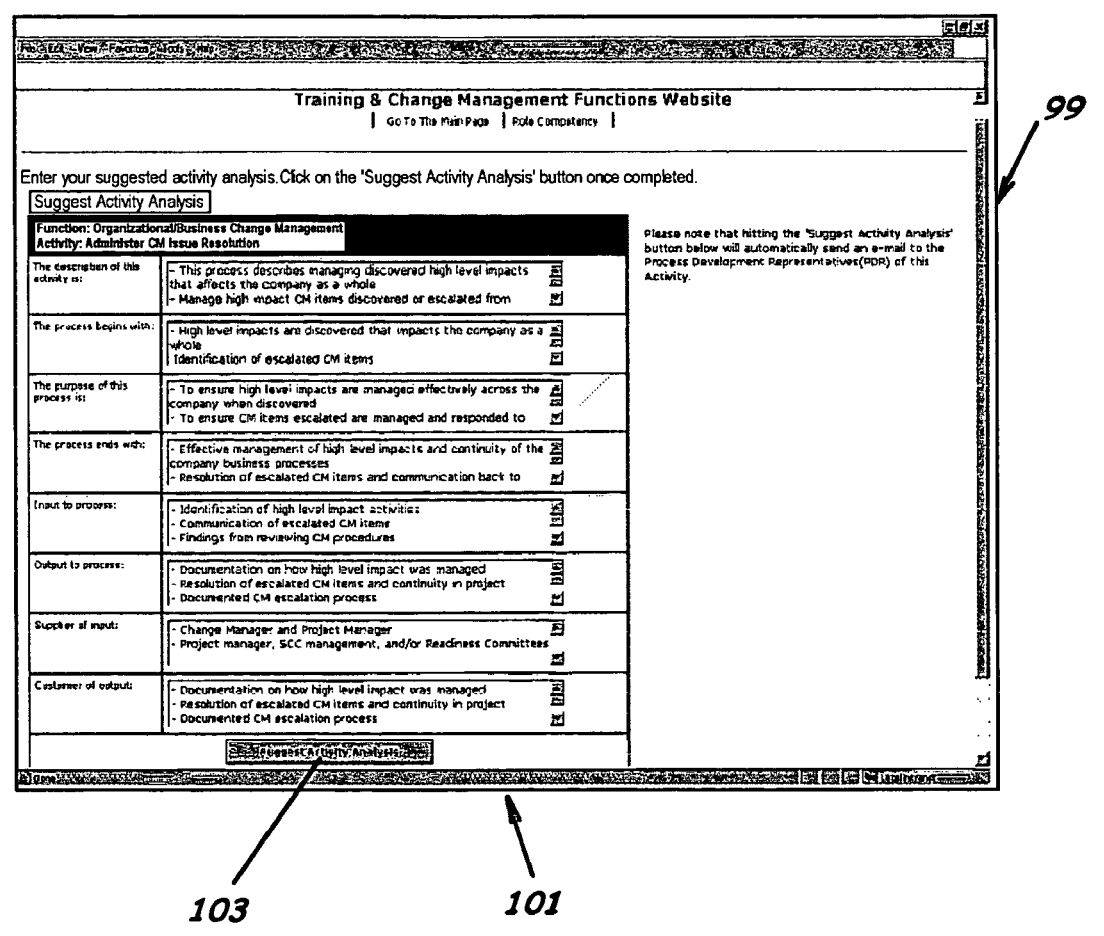

As shown in FIGS. 8-10, in response to selecting one of the functions 89 (FIG. 8), the assigned activities 91 can be displayed in a text output field table or section 94 or on a separate activities analysis web page. According to an embodiment of the present invention, by selecting an associated "suggest analysis" link 95, a user can launch or otherwise initiate an activity analysis suggestion former 97 (FIG. 5) which can provide data to display an online activity analysis suggestion template form 99 (FIGS. 9 and 10) having a activity analysis attribute input fields 101 to receive user input data indicating activity analysis attributes to thereby assemble activity analysis suggestion data separately for the selected activity 91. The input fields 101 can include a description of the activity, a trigger initiating the activity, a first activity process task that begins the activity 91, a last activity process task that ends the activity 91, at least one activity process input, at least one activity process output usually in the form of a deliverable, supplier of activity process input, and customer of activity process output.

Upon completion of entry of an activity analysis suggestion, the user, generally a process development team member or other organization member involved in the organization realignment, can select the suggest activity analysis button 103 (FIG. 9) to store the activity analysis suggestion in the database 41 (FIG. 1) and to launch, for example, an activity analysis suggestion entry alert manager 105 (FIG. 5) which can provide an online alert, e.g., e-mail, pop-up, or other electronic notification as known to those skilled in the art, notifying the process development representative associated with the selected function 89 of the respective activity analysis suggestion.

Figure 11:
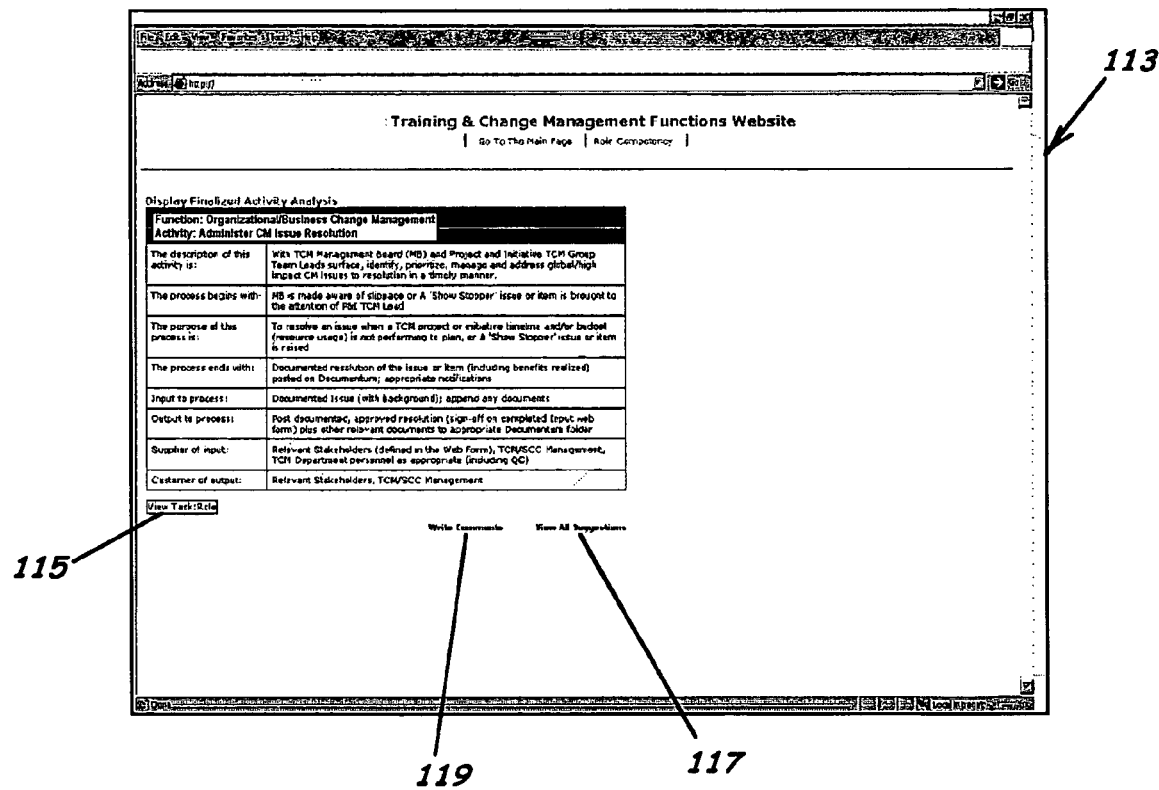
FIG. 11 is a screen view of a graphical user interface illustrating an exemplary activity analysis web page form according to an embodiment of the present invention.
Figure 13:
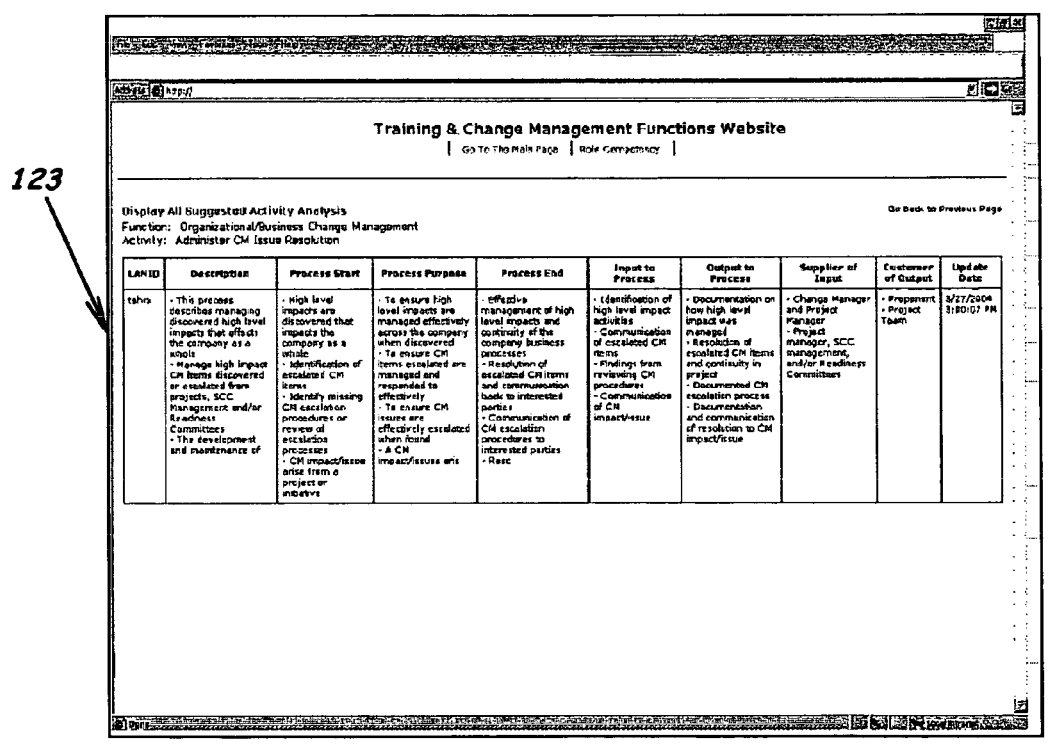
Figure 14:
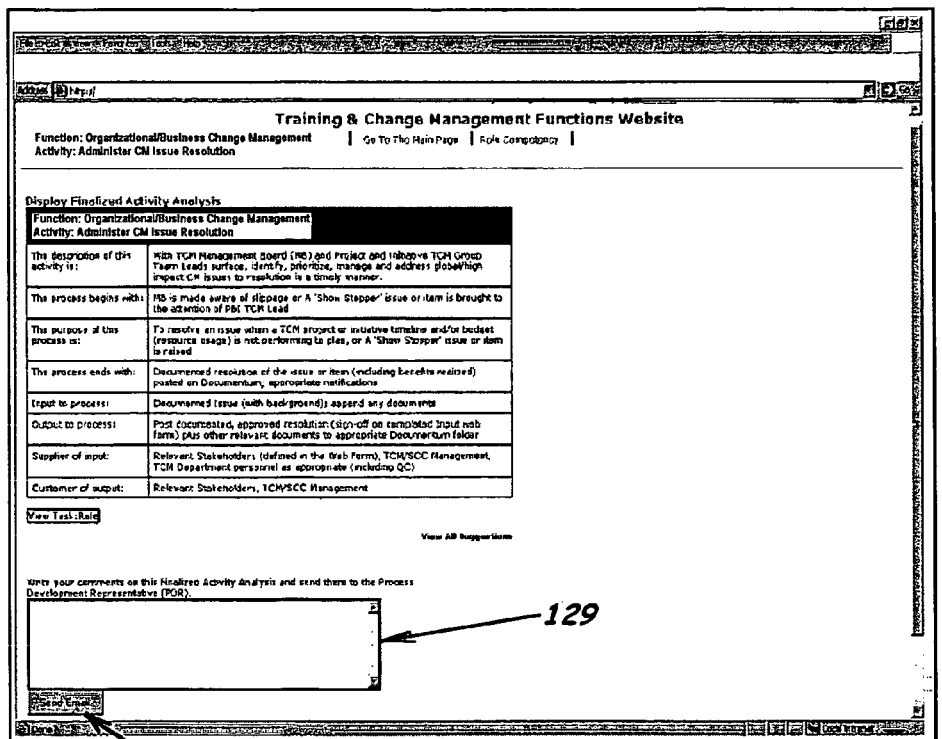
FIG. 14 is a screen view of a graphical user interface illustrating an exemplary "write comments" text entry field according to an embodiment of the present invention.

As shown in FIGS. 8 and 11, according to an embodiment of the present invention, by selecting an associated "display analysis" link 111 (FIG. 8) on the functions web page 92, a user can initiate display of a finalized activity analysis web page 113 (FIG. 11) including a final analysis provided by, for example, the associated process development representative, to thereby view finalized or otherwise agreed upon attributes of the selected activity 91 of the selected function 89. Advantageously, the finalized activity analysis web page 113 can include a view task:role link 115, a view all suggestions link 117, and a write comments link 119. The view task:role link 115, when selected by the user, can cause display of a task-role web page 121 (FIG. 12) which displays tasks, roles, and ratings (levels) assigned to the selected activity 91 of the selected function 89. The view all suggestions link 117, when selected by the user, can cause display of a view all suggestions web page 123 (FIG. 13). That is, according to an embodiment of the present invention, selection of the view all suggestions link 117 can launch an activity analysis suggestion viewer 125 (FIG. 5) to display all suggested activity analysis entered by other process development team members for the selected activity 91 of the selected function 89. The write comments link 119, when selected by the user, can launch a finalized activity analysis comments manager 127 (FIG. 5) which can cause display of a write comments web page (not shown) or write comments text entry field 129 (FIG. 14). According to an embodiment of the present invention, a finalized activity analysis comments manager 127 can allow the user to comment on the final analysis selection, and using, for example, a send button 131, can initiate sending the written comments to the process development representative associated with the selected activity 91 of the selected function 89 or other selected/preselected organization member.

According to an embodiment of the present invention, an authorization profile manager 135 (FIG. 5) is provided to limit access to one or more of the organization realignment web pages/web page forms responsive to a user's assigned authorization to prevent unauthorized access to sensitive organization data and to ensure organization document access requirements are complied with. That is, the authorization profile manager 135 can advantageously be established to limit final activity analysis to that of the assigned process development representatives or other preselected organization members while allowing various other organization members to view and comment on the final activity analysis, as described above.

Figure 15:
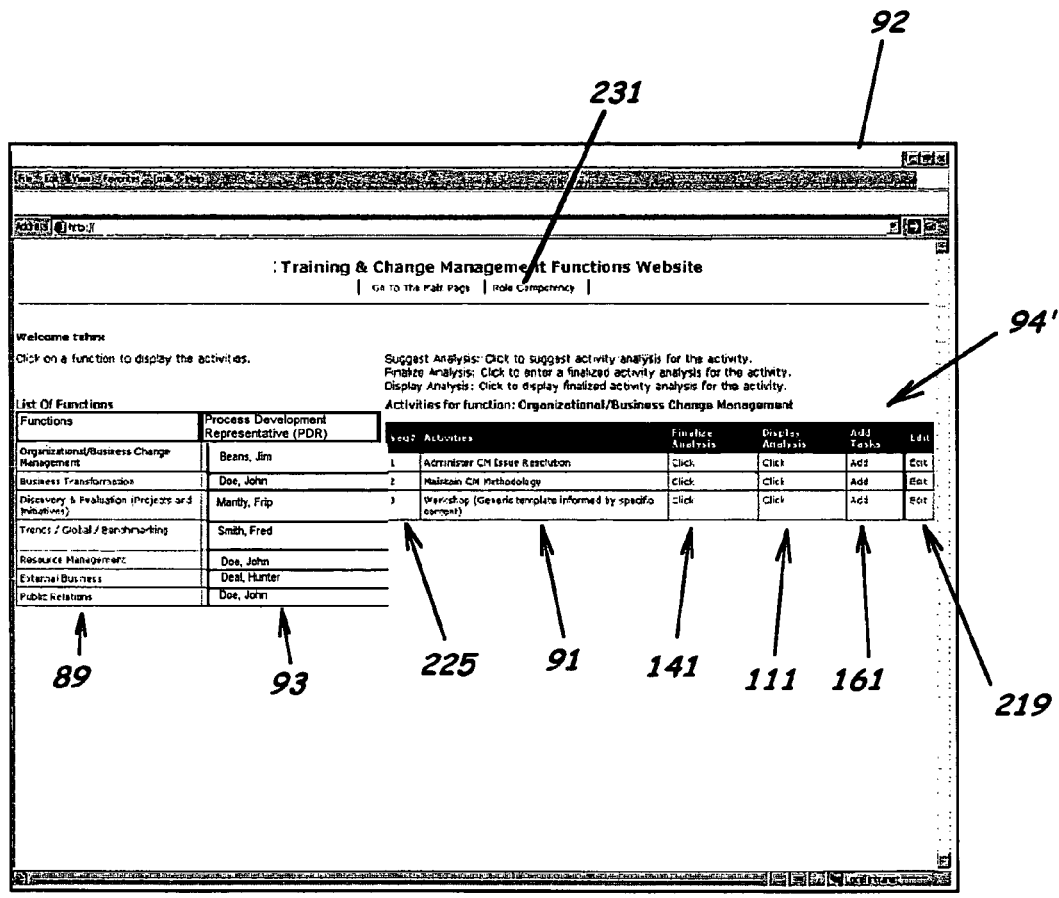
FIG. 15 is a screen view of a graphical user interface illustrating an exemplary functions web page according to an embodiment of the present invention.

As shown in FIG. 15, in response to selecting one of the functions 89 shown, for example, in the functions web page 92 (FIG. 7), assigned activities 91 can be displayed in a text output field table or section 94' or on a separate activities analysis web page having a process development representative unique set of links. That is, the process development representative can be provided additional functionality over that of other organization members provided accesses to the functions web page 92. By selecting an associated "finalize analysis" link 141, a user can launch a finalized activity analysis former 143 (FIG. 5) which can provide data to display an online finalized activity analysis template form 145 (FIG. 16) having finalized activity analysis attribute input fields 147 to receive user input data indicating activity analysis attributes selected by the process development representative associated with the selected activity 91 to thereby assemble finalized activity analysis data separately for the selected activity 91. The finalized activity analysis template form 145 can also include input fields 151 to enter activity frequencies for a plurality of preselected complexity categories including, for example, including the categories of difficult, normal, and easy. The frequency can be defined as the number of times in a year and activity will be performed. The category of difficult and provide a raw score or percentage of the frequency considered difficult or highly complex. The category of normal can provide a raw score or percentage of the frequency considered of medium complexity. The category of easy can provide a raw score or percentage of the frequency considered easy or of low complexity. The finalized activity analysis template form 145 can also include output fields 153 to display any previously entered numbers. Further, a submit button 155 can allow storage of the selected frequencies without posting the finalized activity analysis.

Upon completion of entry of the finalized activity analysis, the user can select the finalize activity analysis button 157 to store the finalized activity analysis in the database 41 and to launch, for example, a finalized activity analysis entry alert manager 159 (FIG. 5) which can provide an online alert, e.g., e-mail, notifying each preselected organization member, e.g., the process development team members, of the respective finalized activity in response to the form submission. By selecting an associated "display analysis" link 111 (FIG. 15) on the functions web page 92, the process development representative can display the finalized activity analysis web page 113 (see, e.g., FIG. 11) to thereby view the finalized analysis.

Figure 18:
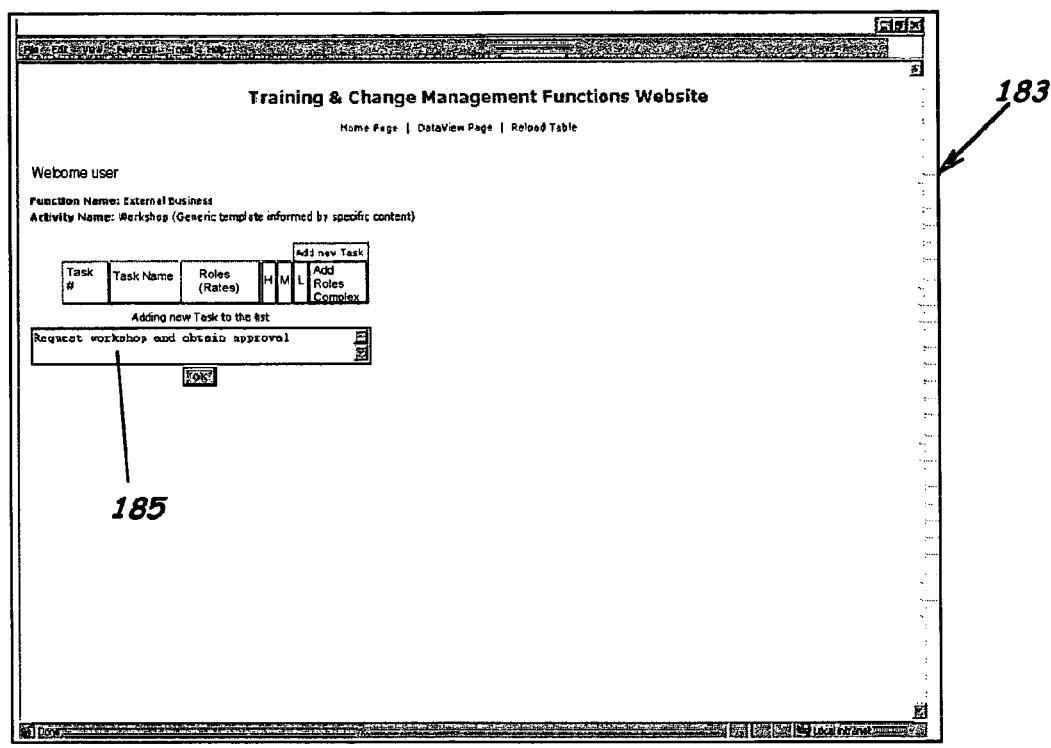
FIG. 18 is a screen view of a graphical user interface illustrating an exemplary task entry web page form according to an embodiment of the present invention.
Figure 19:
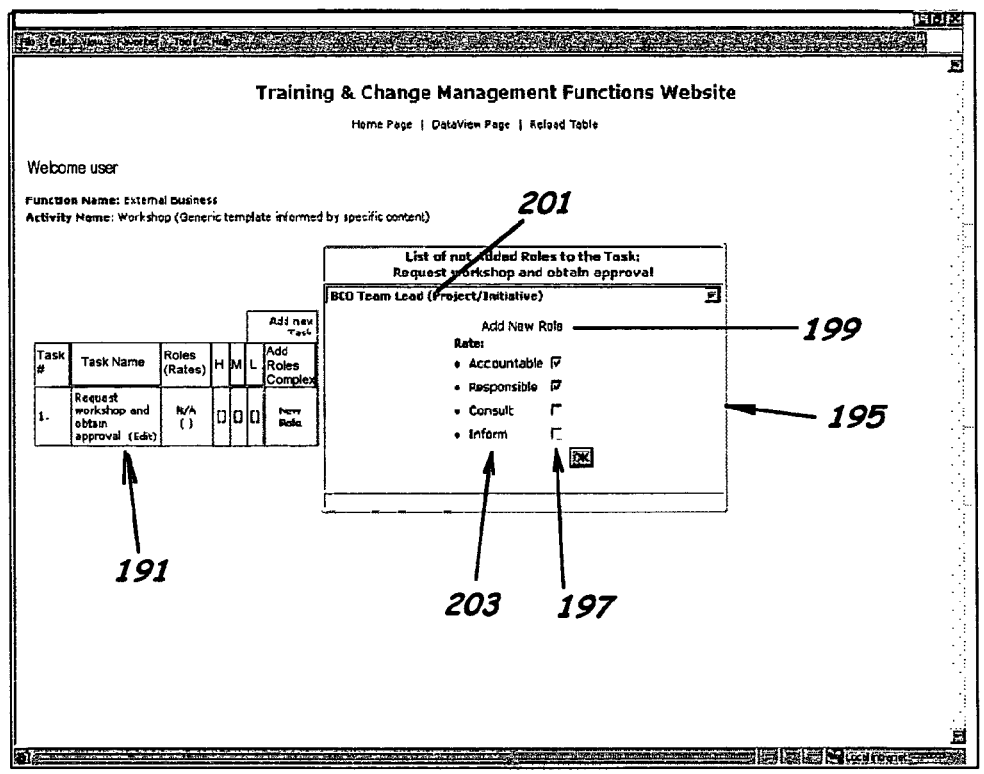
FIG. 19 is a screen view of a graphical user interface illustrating an exemplary role responsibility web page form according to an embodiment of the present invention.

According to an embodiment of the present invention, by selecting an associated "add tasks" link 161 on the functions web page 92 (FIG. 15), the associated process development representatives can initiate display of a task and role assignments web page 163 (FIG. 17) having a role task assignment table 164 which can include an add task link 165, new role link 167, edit complx link 169, delete link 171, reload table link 173, and dataview page link 175. The add new task link 165 can allow a user to launch a task former 181 (FIG. 5) to display an online task entry template form 183 (FIG. 18) having a task input field 185 and to receive user input data from the associated process development representative indicating a task description to thereby add a task 191 to the selected activity 91 to assemble a list of tasks 191 such as, for example, that shown in the task-role web page 121 (FIG. 12), to the task and role assignments web page 163 (FIG. 17), and/or to the role complexity and time durations report web page form 209 (FIG. 21). Similarly, the add new role link 167 can allow a user to launch a role task former 193 (FIG. 5) to display an online role responsibility template/web page form 195 (FIG. 19) having rate/responsibility level input fields 197, e.g., accountable, responsible, consult, and inform role rating input fields, and an add new role link 199 to associate a role 201, e.g., selectable from a drop-down menu, and a role rating or level 203 with a selected task 191 forming a role-task combination to receive user input data from the associated process development representative indicating a role interaction required to complete the selected task 191 of the selected activity 91.

Figure 17:
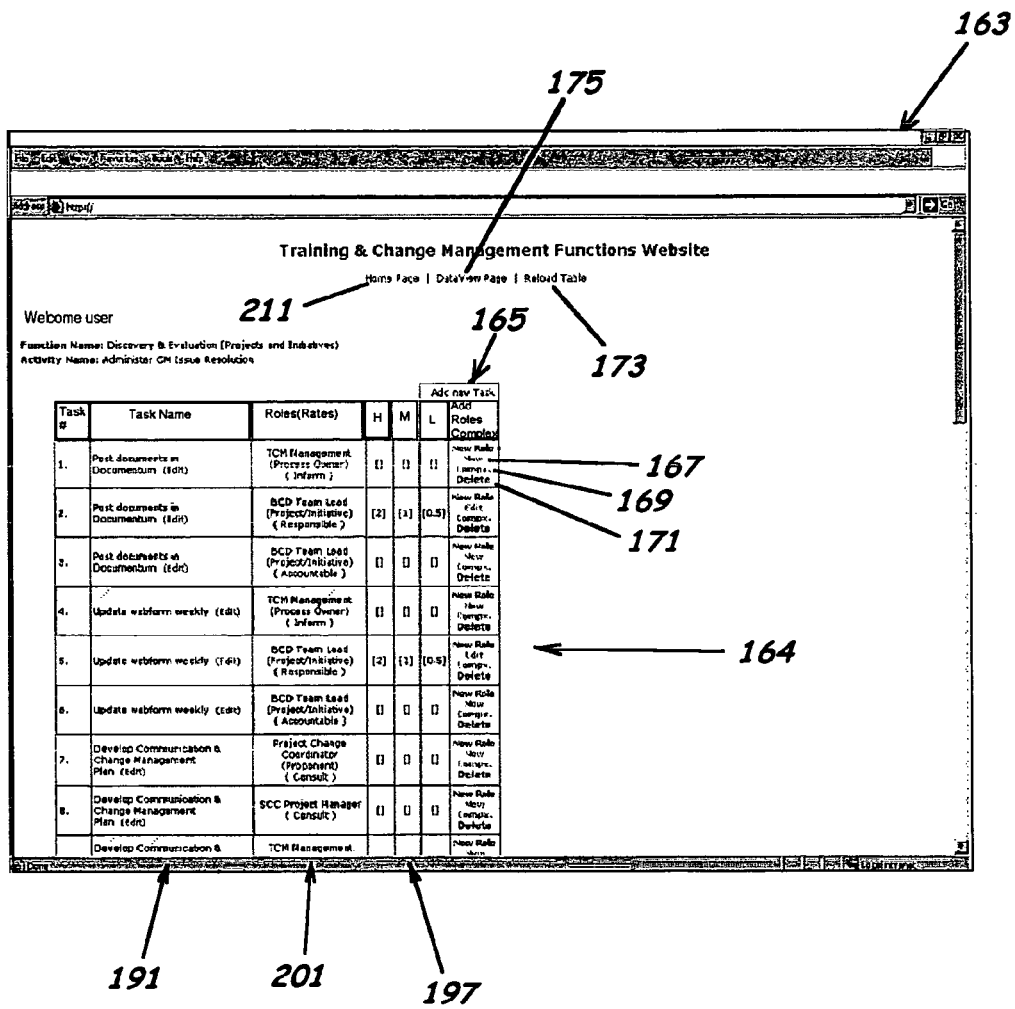
FIG. 17 is a screen view of a graphical user interface illustrating an exemplary task and role assignments web page form according to an embodiment of the present invention.
Figure 20:
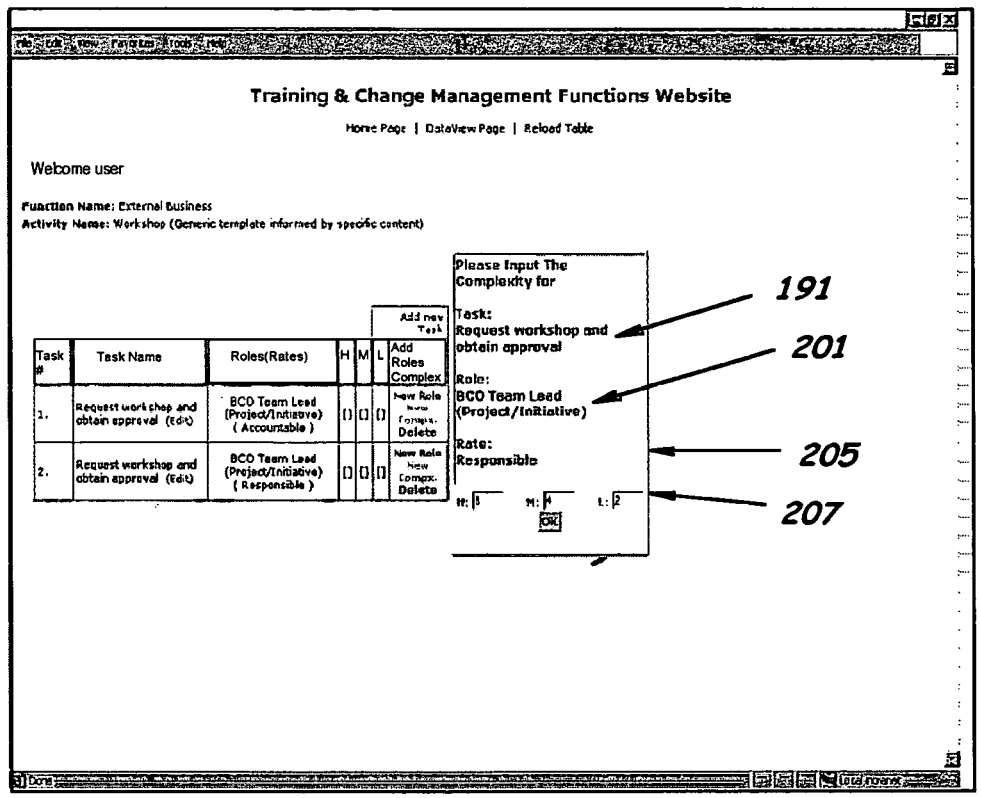
FIG. 20 is a screen view of a graphical user interface illustrating an exemplary role complexity and time durations web page form according to an embodiment of the present invention.

As shown in FIG. 17, through selection of the edit complx link 169, the role task former 193 (FIG. 5) can also cause the user computer to display a role complexity and time durations template form 205 (FIG. 20) having complexity input fields 207 which can allow the user to assign a time duration for each corresponding complexity category, e.g., high, medium, and low, to a preselected responsibility level. That is, for example, as illustrated in FIG. 20, the user can assign a time duration for high, medium, and low complexity scenarios for, e.g., the "responsible" role 201 of the selected task 191 of the selected activity 91. The delete link 171 can allow the user to delete a task and role combination. The reload table link 173 can allow the user to refresh/reload the role task assignment table 164 and to save the entered data. A dataview page link 175 is provided to allow the user to display a finalized task role combination deliverable for a selected activity 91 such as, for example, the table 209 illustrated in FIG. 21.

Further, according to an embodiment of the present invention, upon completion entering or editing table items, either through the reload table link 173, home page link 211 or other input field (not shown), the user can store the role assignment data in the database 41 and launch a task and role entry alert manager 213 (FIG. 5) to alert each preselected organization members, e.g., preferably everyone in the affected division, to review the respective finalized tasks and assigned roles. A viewer 215 (FIG. 5) can also be provided to display each of a plurality of task and role assignment suggestions posted by a process development team member to thereby enhance comment formulation. A comment manager 217 (FIG. 5) can cause display of an online comment form or template such as, for example, one similar to that shown FIG. 14 and to receive user input data indicating a comment on an agreed-upon version of the tasks 191 and assigned roles 201 and to provide online notification of the comment to the process development representative associated with the user selected activity 91.

Figure 22:
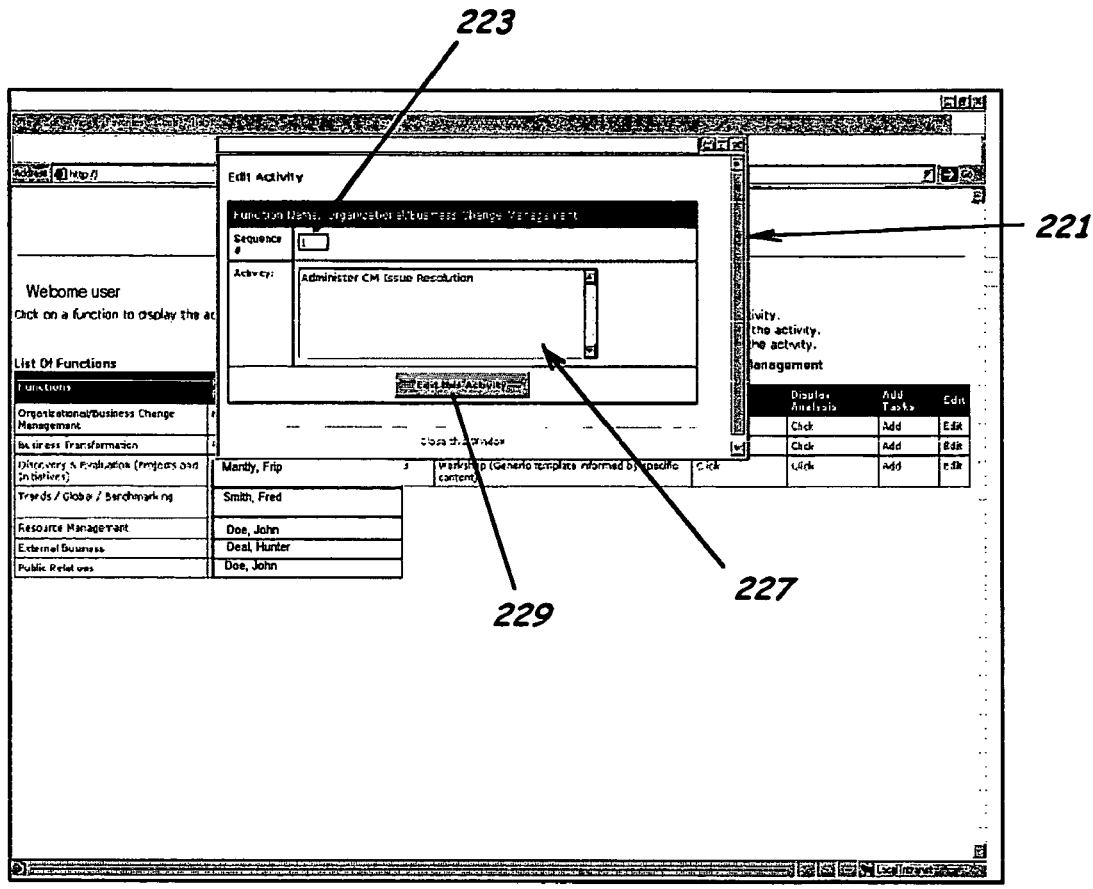
FIG. 22 is a screen view of a graphical user interface illustrating an exemplary edit activity web page form according to an embodiment of the present invention.

According to an embodiment of the present invention, by selecting an associated "edit activity" link 219 on the functions web page 92 (FIG. 15), the associated process development representatives can initiate display of an edit activity template form 221 (FIG. 22). The edit activity template form 221 can have a sequence number input field 223 to allow entry of a desired sequence number to change the activity sequence of that shown in the sequence number column 225 (FIG. 15), an activity input field 227 to edit the name of the selected activity 91, and an edit this activity button 229 to store the changes to the selected activity 91.

Figure 23:
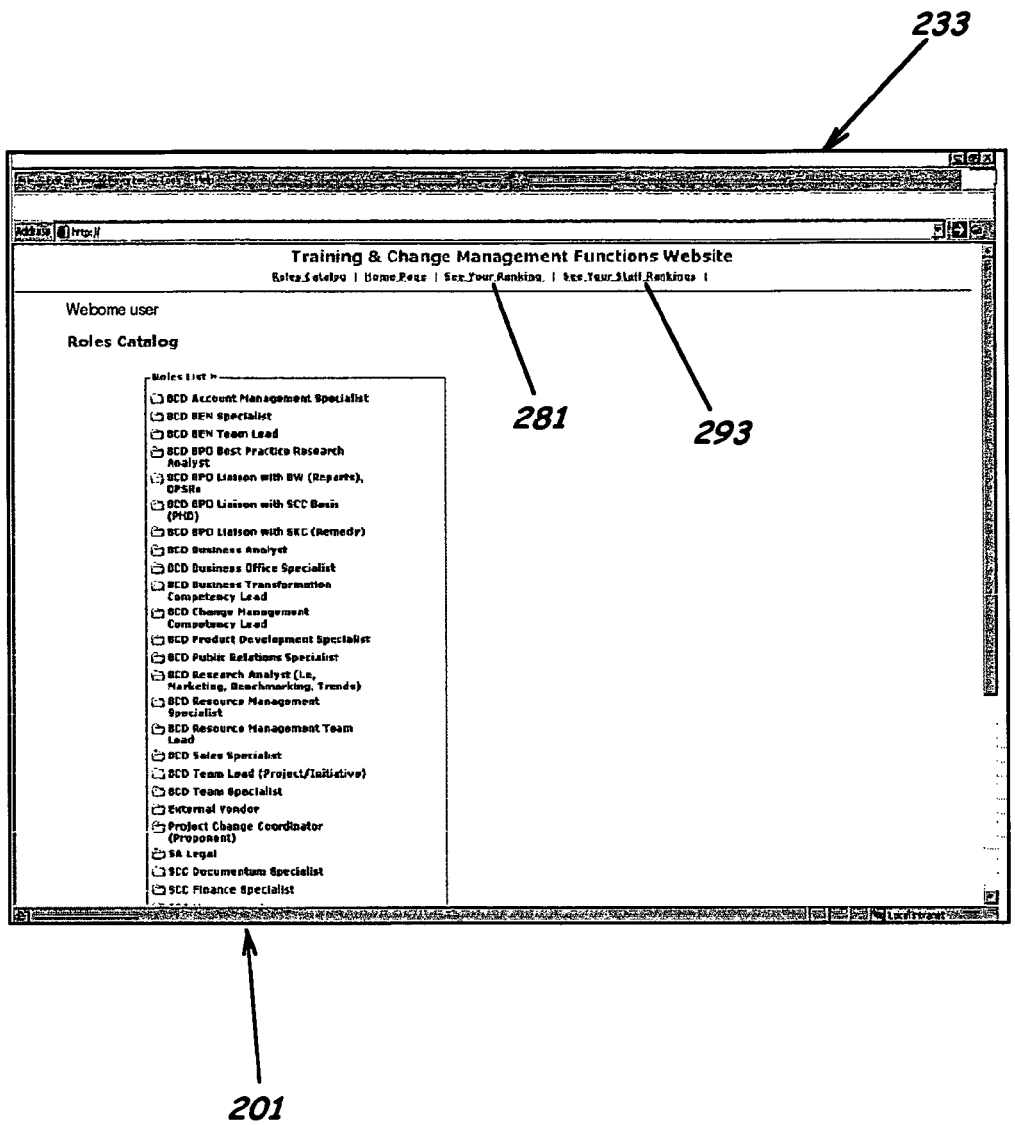
FIG. 23 is a screen view of a graphical user interface illustrating an exemplary a role catalogs web page according to an embodiment of the present invention.
Figure 24:
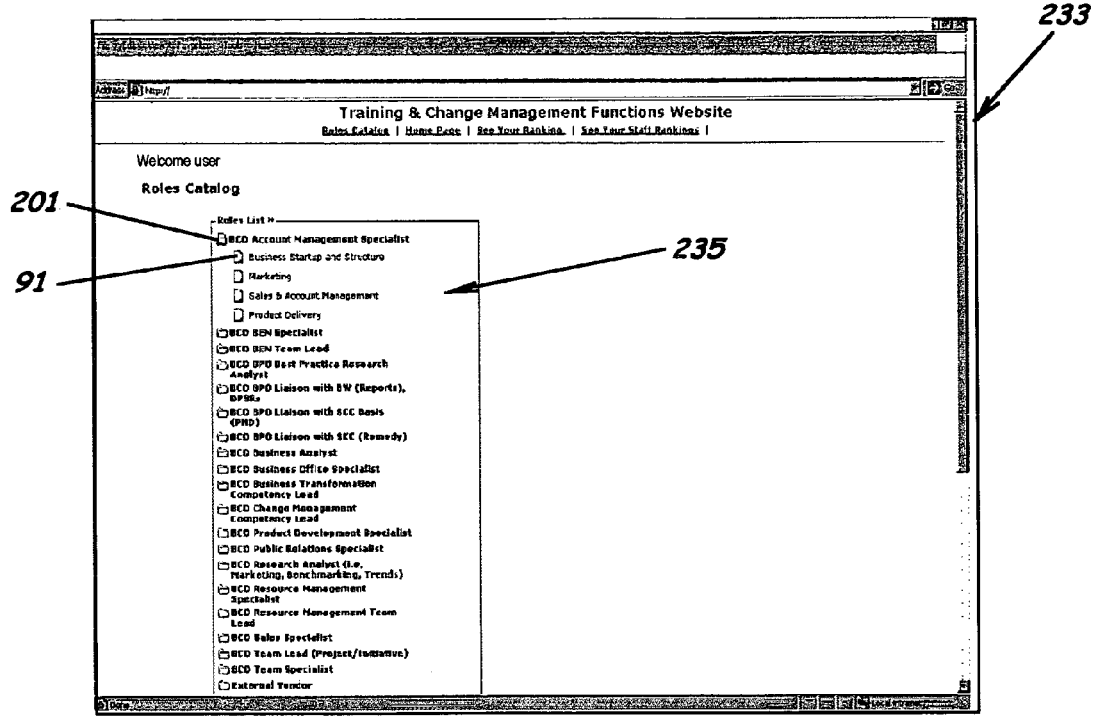
FIG. 24 is a screen view of a graphical user interface illustrating an exemplary a role catalogs web page according to an embodiment of the present invention.
Figure 25:
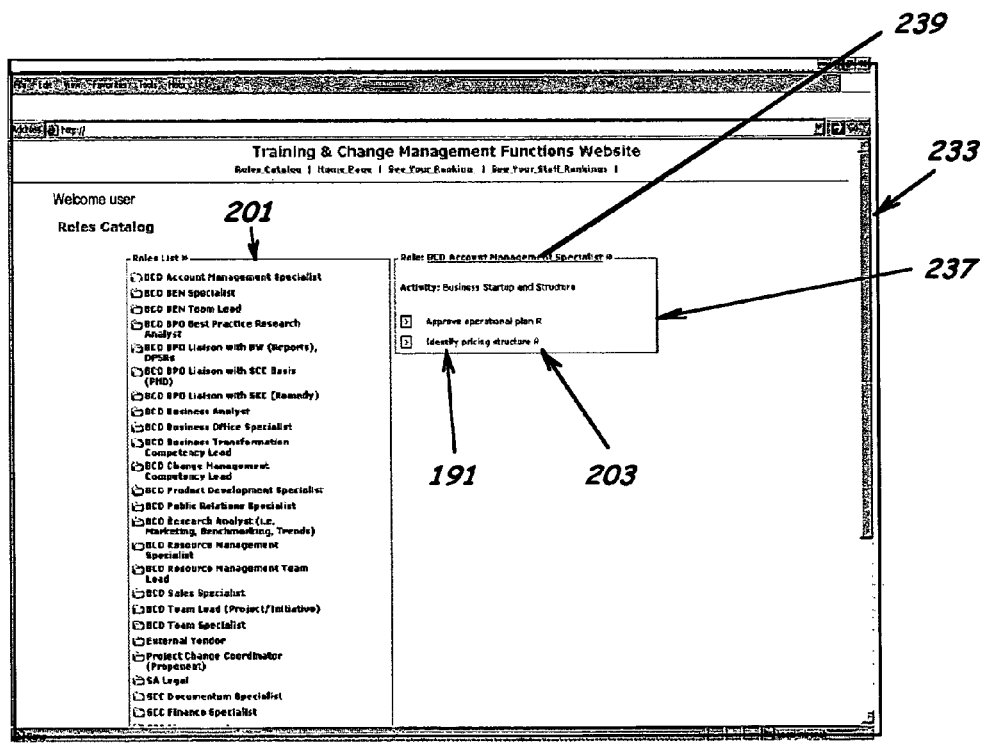
FIG. 25 is a screen view of a graphical user interface illustrating an exemplary a role catalogs web page according to an embodiment of the present invention.

According to an embodiment of the present invention, in response to selecting a role competency link 231 on the functions web page 92 (see, e.g., FIGS. 7, 8, or 15), depending upon the assigned role authorization of the respective user, a user can display a role catalogs web page 233 (FIG. 23) to thereby display each of the plurality of defined roles 201. Further, as shown in FIG. 24, by selecting one of the roles 201, the user can display a list or table 235 of associated activities 91 for the selected role 201. As shown in FIG. 25, by selecting one of the activities 91, the user can display a list or table 237 of tasks 191 assigned the selected activity 91. A symbol indicating an associated role rating 203 such as, for example, "R" for responsible, "A" for accountable, "C" for consulting, and/or "I" for informing, can be provided next to the task or tasks 191 to provide ready reference of the association of the selected role 201 to the task 191. This symbol can be provided in a different color such as, for example, red, to aid the user in visually identifying the role rating 203 from the text of the task 191.

Figure 26:
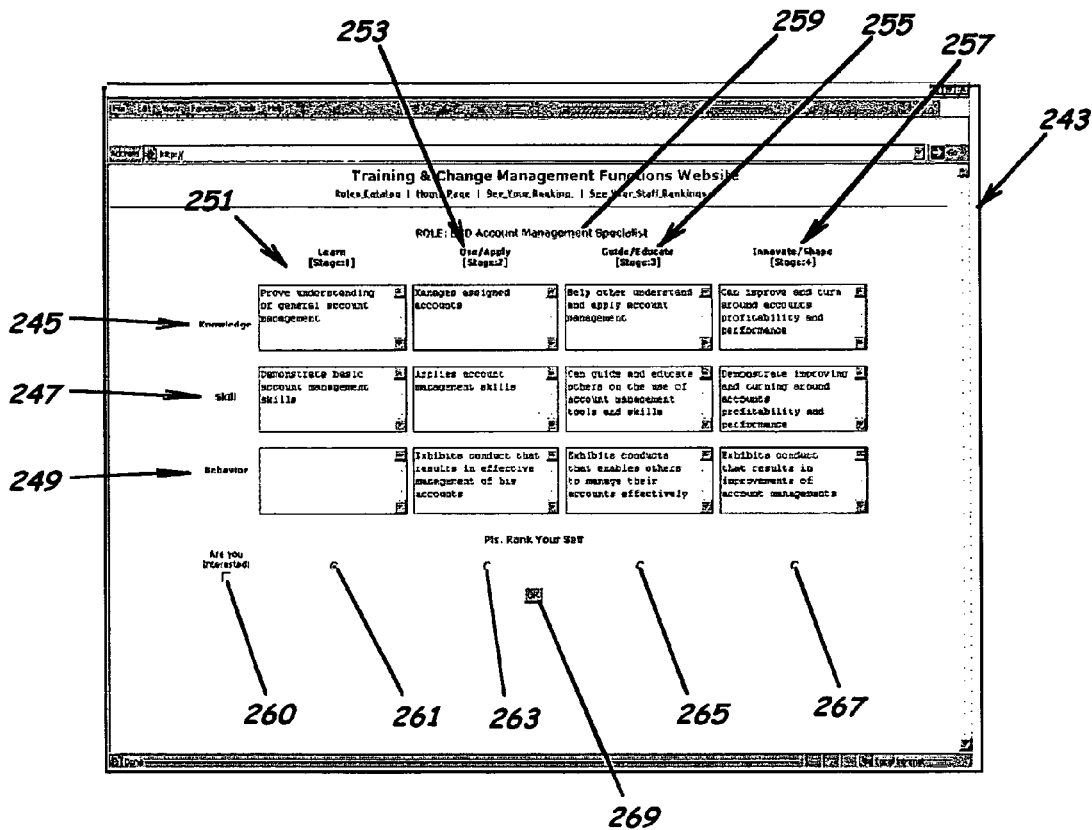
FIG. 26 is a screen view of a graphical user interface illustrating an exemplary role competency self-evaluation web page form according to an embodiment of the present invention.

The list or table 237 can also be provided which can include a role name hyperlink or other input field 239, selectable by the user to launch or otherwise initiate a role competency suggestion former 241 (FIG. 5). The role competency suggestion former 241 can cause the display of an online role competency suggestion template form defining a self-evaluation form 243 (FIG. 26) having role competency attribute input fields 297' and to receive user input data indicating role competency attributes, to thereby assemble role competency suggestion data separately for the selected role 201. The self-evaluation form 243 allows the user to define the competency level of each role in terms of, for example, provable knowledge, demonstratable skills, and exhibited behavior by achievement level, e.g.: learn (stage 1), use/apply (stage 2), guide/educate (stage 3), and innovate/shape (stage 4). Correspondingly, according to an embodiment of the present invention, the self-evaluation form 243 can include knowledge, skills, and behavior rows 245, 247, 249, in conjunction with learn (stage 1), use/apply (stage 2), guide/educate (stage 3), and innovate/shape (stage 4) columns 251, 253, 255, 257, forming a table or matrix. The self-evaluation form 243 can also include a role name output field 259 indicating the role to be self-evaluated, an "are you interested" input field 260 to allow a user performing a self-evaluation to indicate interest in the role 201, and multiple input fields 261, 263, 265, 267, corresponding with the achievement level columns 251, 253, 255, 257, to allow a user to indicate results of a self-evaluation.

Upon completion of entry of the self-evaluation form 243, the user, by selecting the "OK" button 269 or other suitable input field can, for example, store the self-evaluation data in the database 41 and can launch a competency analysis suggestion entry alert manager 271 (FIG. 5) which can provide an online alert, e.g., e-mail, notifying a competency lead representative, a process development team representative, or other assigned organization members of the self-evaluation data entry.

Figure 27:
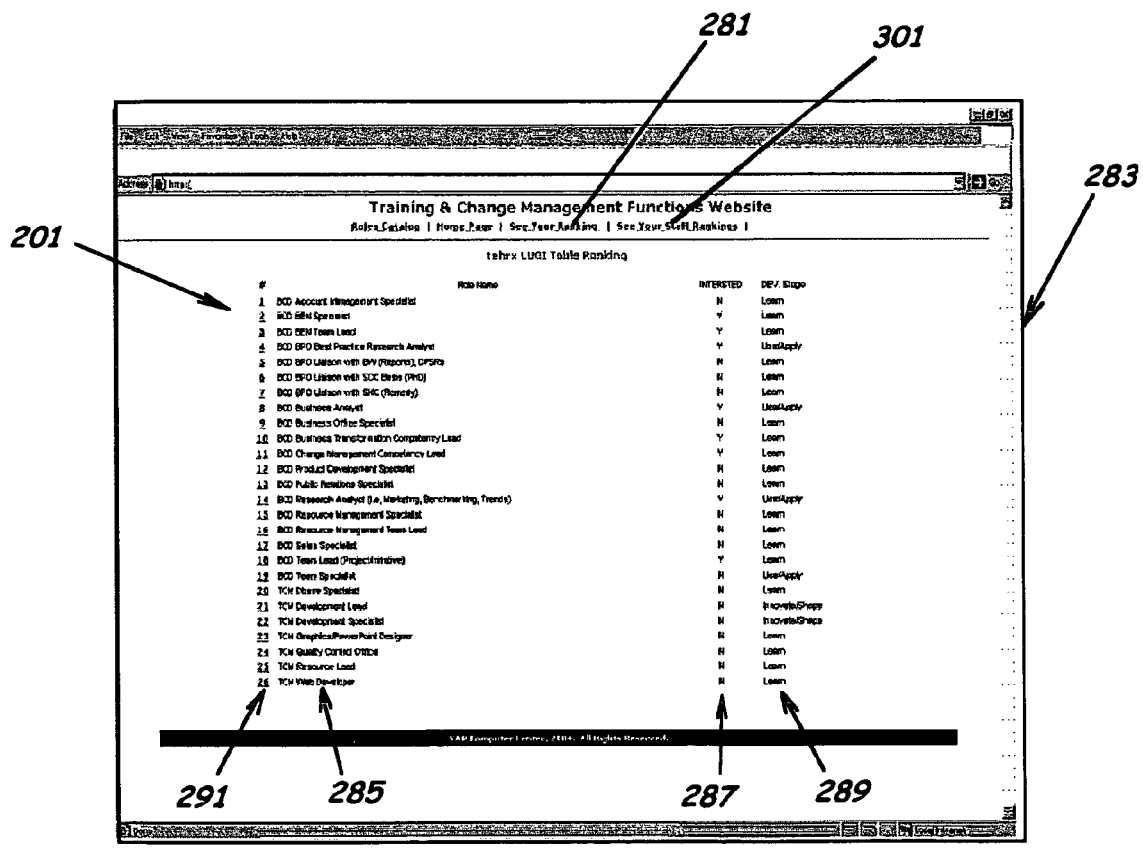
FIG. 27 is a screen view of a graphical user interface illustrating an exemplary role competency self-evaluation report web page according to an embodiment of the present invention.

According to an embodiment of the present invention, by selecting a "see your rankings" link 281 (FIG. 23) on, for example, the role catalogs web page 233, the user can initiate display of the user's rankings of the roles 201. That is, in response to selection of the link 281, a role self-evaluation report web page 283 (FIG. 27) can be displayed. The web page 283 can include a role names column 285 indicating each of the roles 201, an indication of interest column 287 indicating the interest of the user in the role 201, and development stage indication column 289 indicating the self-evaluation results for each of the roles 201. The web page 283 can also include an index number link column 291, which according to an embodiment of the present invention, when selected by the user, can initiate display of the self-evaluation form 243 (FIG. 26) for the selected role 201. Upon display of the web page form 243, the user can then modify the rankings or indication of interest, as desired.

Figure 28:
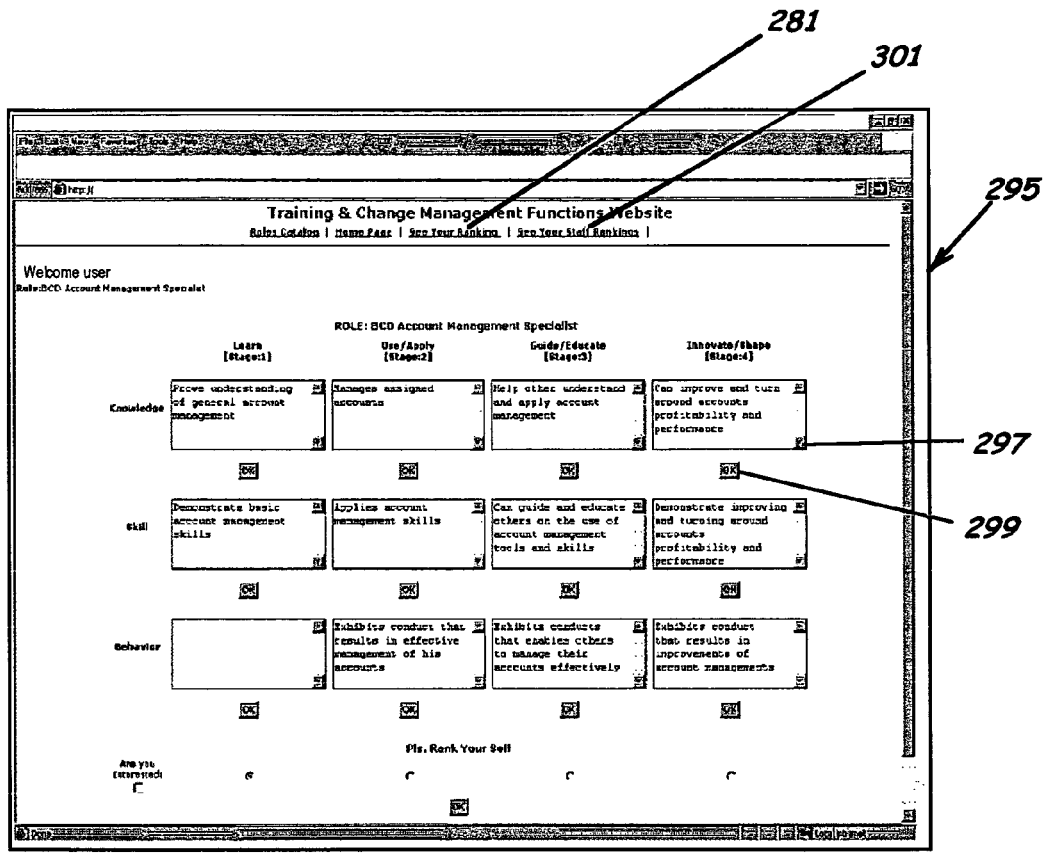
FIG. 28 is a screen view of a graphical user interface illustrating an exemplary role competency self-evaluation template web page according to an embodiment of the present invention.

According to an embodiment of the present invention, the authorization profiles, described previously, provide preselected organization members such as, for example, the competency lead representatives and/or process development representatives additional functionality including the ability to finalize the description of the evaluation criteria in the role self-evaluations. As with other organization members, the role competency link 231 on the functions web page 92 (see, e.g., FIG. 7, 8, or 15), for example, can provide a link to display the role catalogs web page 233 (FIG. 23) to thereby display each of the plurality of defined roles 201. Further, the user can select one of the roles 201 (FIG. 24), and then select one of the activities 91 to display a list or table 237 of tasks 191 (FIG. 25) assigned the selected activity 91, as described previously. The competency lead representative and/or process development representative, however, upon selecting the role name hyperlink 239, can, for example, instead launch a role competency former 293 (FIG. 5) to display an online role competency template form 295 (FIG. 28) having a matrix of self-evaluation input fields 297 and a matrix of input buttons, e.g., "OK" buttons 299 to receive user input data indicating role competency attributes to thereby assemble finalized role competency data to develop the online role competency self-evaluation template form 243 separately for each selected one of the roles 201.

By selecting a "see your staff ranking" link 301, transition team owners, other members of the management team, or other authorized members can display the self-evaluation results for a related group of organization members in accordance with their assigned authorization profile which is generally linked with their respective organization code. For example, an administrator can display the self-evaluation results of the organization members under the administrator's respective divisions. Also, for example, a manager can display the self-evaluation results of the organization members under the manager's organization code.

Selection of the link 301 can launch a role competency report former 303 (FIG. 5) to assemble role competency self-evaluation results data responsive to the selection and responsive to the existence of at least one role competency self-evaluation, and can initiate display of an online role competency report form 305 (FIG. 29) having role competency output fields 307, 309, indicating qualification for and interest in, respectively, each of the roles 201 by each associated organization member to thereby display a qualified potential resource supply 311 for each of the roles 201 to support the assignment of the named organization members to the roles 201.

According to an embodiment of the present invention, the organization realignment program product 81 can further include functionality to analyze the qualified potential resource supply against organization members' availability to determine a demand resulting from the organization realignment and to determine any gap in the skills required to effectively institute the realignment. For example, a resource commitment manager 321 (FIG. 5) can display a resource commitment template form 323 (FIG. 30) listing the resource commitments of each of the organization's members and/or a master resource allocation table to thereby summarize availability of each organization member based on current assignment planned completion dates and scheduled absences. A qualified resource supply determiner 331 (FIG. 5) can determine a qualified supply of resources responsive to the role competency self-evaluation of each of the organization members and can display a web page form such as, for example, template 333 (FIG. 31) indicating the qualified supply of resources manually or automatically entered into respective qualified supply fields 335. An assignable hours determiner 341 (FIG. 5) can display an online assignable man-hour determination form such as, for example, the major participants man-hours template form 343 shown in FIG. 32 which can be organized to form a table having roles 201 identified as participants related to activities 91 to thereby determine an average number of assignable hours per day for each of the listed participants and to provide cumulative totals thereof. Advantageously, to enhance understanding, the form 343 can be configured to be role/participant-based and not related to specific projects or initiatives.

A demand estimate determiner 351 (FIG. 5) can be provided to compile a demand estimate for each of the plurality of roles 201 and to display a demand estimate report template form 353 (FIG. 33) which can show the demand on each role 201 within each function 89. That is, the demand estimate report template form 353 can indicate a number of resources required per day for each of the plurality of roles 201 to perform assigned tasks within activities of each of the functions. The demand estimate determination/calculation can use an estimated number of hours required of each role 201 to perform assigned tasks 191 within activities 91 of each of the functions 89. The total number of hours is then divided by a determined average number of assignable hours per day, e.g., 5.4 hours, for each of the roles 201 to determine an estimated number of days 355 required for each role 201 to perform activities 91 separately under each one of the functions 89. The workload is then extended across a predetermined time period, e.g., 52 weeks, to determine the number of required resources 357 (demand estimate). Note, these calculations can be performed and entered either automatically or manually. The demand estimate determiner 351 can also compile an aggregate demand estimate for each of the roles 201 and display an aggregate demand estimate report form 361 (FIG. 34) indicating a total aggregate demand 363 in days for each role 201 and an aggregate number of required resources (total demand) 365 per day for each of the roles 201.

A skills gap analysis template former 371 (FIG. 5) can initiate display of skills gap analysis results data in response to role identification data, the demand estimate data, and the qualified supply data, to thereby enhance organization transition planning. The skills gap analysis provides or otherwise identifies a skills gap resulting from transition to the new organization. Stated more concisely, the basic formula is as follows:

Skills Gap=Aggregate Demand−Qualified Supply.

As described above, the aggregate demand represents the total demand on a role (required resources) based on all the tasks the role is responsible for performing across all functions and activities. The individual demand on a role is calculated by multiplying the time it takes (time duration) to perform a task the role is "responsible" for with the number of times (frequency) that the task takes place over a preselected time period, e.g., 52 weeks. According to this embodiment of the present invention, if the time duration of the tasks is calculated on an hourly unit of measure, the calculation is converted into days using a matrix of factors in the type of role. The number of available hours to perform the role is factored in as it can vary due to the type of role. For example, the role of "group lead" may have less time to dedicate to projects due to additional administrative responsibilities compared to that of other organization members such as, for example, a business analyst. An exemplary template or form 343 for determining the average number of assignable hours per day for different types of roles was described with respect to FIG. 32. An exemplary template or form 353 for determining the estimated demand for each role per function was described with respect to FIG. 33. An exemplary template or form 361 for determining aggregate demand for each role across all functions was described with respect to FIG. 34. The qualified supply represents the number of qualified people available to fulfill the role. An exemplary qualified supply template or form 333 for presenting the qualified supply estimates was described with respect to FIG. 31. An exemplary competency template or form 305 for determining the qualified resource supply for each role was described with respect to FIG. 29. An exemplary template or form 373 for calculating or otherwise determining the skills gap analysis for an organization is shown in FIG. 35.

As shown in FIG. 5, according to an embodiment of the present invention, the organization realignment program product 81 can also include a training materials manager 381 to display a plurality of organization transition workshop briefing templates for one or more, e.g., five, organization transition workshops. The organization transition workshops allow the organization to communicate information to selected organization members defining process development team members and involve the process development team members in performing tasks which can function to avert anxiety associated with organization change resulting from the realignment, to encourage learning, to promote a sense of ownership, and to encourage full involvement in realigning the organization structure. The organization transition workshops can also include training materials that allow organization members to define the various organization elements such as, for example, functions, activities, tasks, roles, and role competencies in the organization.

The organization realignment program product 81 can also include a transition plan manager 383 and a project manager 385. The transition plan manager 383 can display data indicating individual transition plans for each selected organization member which are developed in response to the analysis of the organization resource requirements and resource availability data from the resource availability evaluation and in response to organization member and supervisory input, with each individual transition plan mapping one of the organization members to a selected role or roles. The competency self-evaluations can inform or be input into individual (personal) development plans developed in concert with, e.g., competency leads and/or other management, to provide a baseline for the personal development plans to thereby support the assignment of members to roles. Also, the competency self-evaluations can be used to guide the individual development plans to ensure that the assigned roles are directed toward their interests and strengths. The individual development plans provide a track record of the roles which an individual has fulfilled and future roles in which they would like to move. For each role that is specified, the knowledge, skills, and behavior required can form the basis to develop an individual. This development plan can form a personal record and remain with the individuals throughout their career. Further, identified as qualified to assume a role, an individual transition plan can also be developed based upon availability beyond current assignments to support personal development plans aimed at closing the skills gap. The individual transition plan can provide details on actual movements of the individuals between roles. That is, information such as actual dates, locations, authorizations, etc., required to transition an individual to a new role can be contained in the individual transition plan.

The project manager 385 can display a project initiation request form to facilitate assignment of accountabilities and a project change request to request modification of a standard activity such as, tasks, roles, workload, which can function to track revisions to project plans and timelines, and which can require explanation thereof. The project manager 385 can include or be linked with a master projects inventory manager 387 to can initiate display of a master projects inventory to thereby indicate planned deliverables and identify accountable organization members for each task. According to an embodiment of the present invention, the master project inventory is updatable during ongoing operations in response to project initiation and change requests only to minimize version confusion and to provide centralized control of changes.

As shown in FIGS. 1-56, embodiments of the present invention include methods of realigning an organization structure. For example, according to an embodiment of a method of realigning an organization structure, one or more, e.g. five, organization realignment workshops are employed which can provide an effective means of communicating information to the affected organization members as well as getting them involved in performing tasks. This can advantageously avert the anxiety of the uninformed, encourage learning, promote a sense of ownership, and present a possibly unique cultural experience of full involvement. Each workshop can generally include an agenda, a presentation, experiential (learning-in-action) exercise, and post-workshop individual and team assignments to quickly apply the newly acquired knowledge and skills to use in forming the roadmap for the organization realignment. To promote ownership, each affected organization member is preferably involved in all five workshops and in the development of the activities, tasks, roles, and competencies that will exist within the new organization structure. The optimal range of organization members, however, is approximately 10-15. Additionally, the active participation and visible sponsorship of management at each workshop can be a crucial element in focusing organization members on an intense and demanding set of activities provided in each of the workshops, described below.

Figure 36:
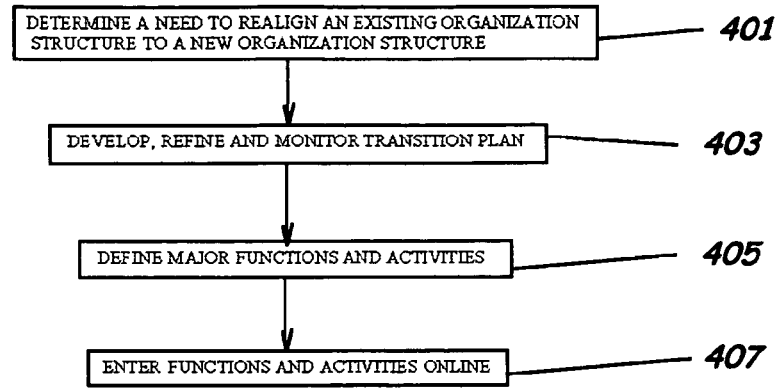
FIG. 36 is a schematic block flow diagram of a method of realigning an organization structure according to an embodiment of the present invention.

According to an embodiment of the present invention, FIGS. 36, 37, 42, 45, 48, 54, and 56, illustrate the high-level steps involved in the workshops along with prerequisite and post-workshop activities/tasks. As shown in FIG. 36, prior to presentation of the first workshop and as a trigger to the process, an organization management team determines a need to realign an existing organization structure to a new organization structure (block 401). In response, the management team develops and later refines and monitors formation and implementation of a transition plan (block 403). The management team further defines major functions 89 and activities 91 (block 405) and enters the functions 89 and activities 91 online (block 407) to be used in developing tasks 191, defining and assigning roles 201, defining skills and competencies which can be used to evaluate organization members and to determine a gap in skills which must be filled to transit for current organization structure to the new organization structure. The defined functions 89 and identified activities 91 can be stored in a database, e.g., database 41, accessible to an online communication network 33 to allow access by preselected organization members include process development team members.

Figure 37:
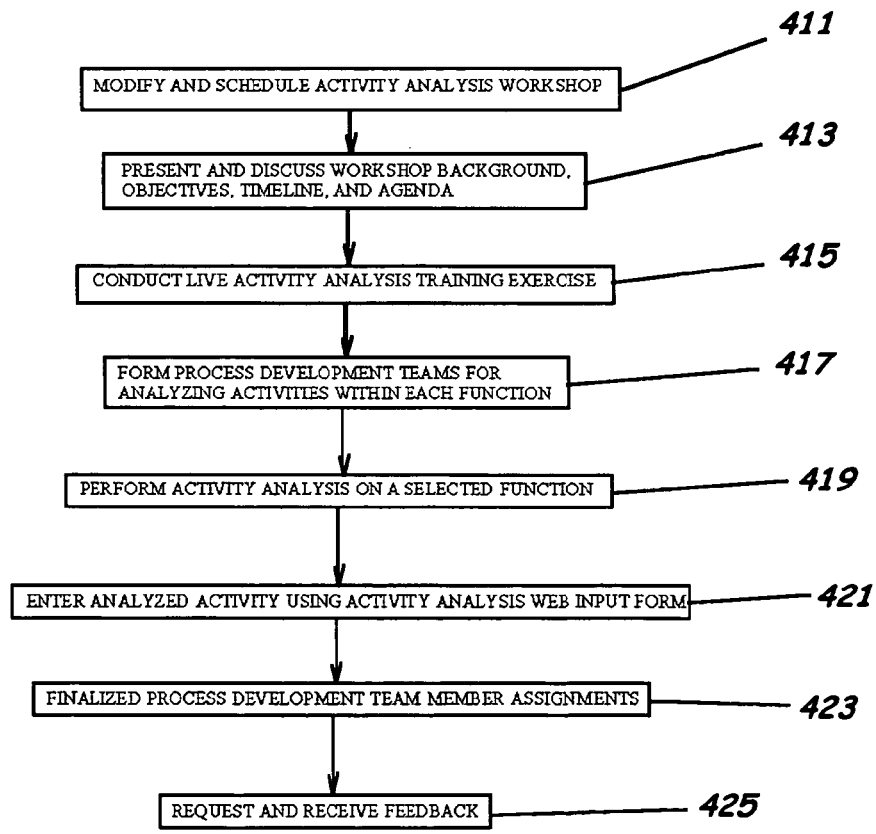
FIG. 37 is a schematic block flow diagram of a method of realigning an organization structure according to an embodiment of the present invention.

As shown in FIGS. 37 and 38, according to an embodiment of the present invention, the first workshop is an activities analysis workshop which can function to inform the process development team members of key elements and timelines for execution of reorganization of the organization structure to define a transition plan and to provide to the process development team members background information for the major functions 89 defined for the new organization structure to thereby formulate the activities 91 supporting the functions 89. The workshop can also function as a tool to train each of the process development team members to analyze each activity 91 and, in response to the respective activity analysis, to formulate tasks 191 to thereby support each activity 91. Specially trained facilitators defining transition team members can access online presentation templates, modify the templates, schedule the activity analysis workshop (block 411), and then conduct the activity analysis workshop.

Through presentation and discussion, the transition team can launch the transition process by informing the process development team members of key elements and timelines for execution of the transition plan, thereby providing a background on the major functions defined by the management team and communicating involvement of process development team members in completing tasks and deadlines (block 413). The presentation slides can include agenda items such as, for example, a description of the purpose of the workshops, major objectives, the current organization structure, the future organization structure, the effect on any other organization charts, the transition project plan, and a discussion of processes, functions, activities, and tasks, and exercises to be conducted during the workshop with an emphasis on teamwork. Through a live activity analysis exercise (block 415), the transition team can further educate the process development team members in how to analyze activities 91 to yield tasks 191 to thereby teach activity analysis to be implemented on each activity 91 of the each assigned or selected function 89.

FIG. 39 illustrates an exemplary live exercise template for the activity analysis workshop according to an embodiment of the present invention. The process development team members are first provided an activity analysis form to perform a trial activity analysis of a preselected activity. The process development team members separately perform the activity analysis. The process development team members are then formed into working groups each having, for example, three or four members. The process development team members then compare each activity analysis within each separate working group to form a final group activity analysis version for each of the working groups. Each group presents each final group activity analysis version to the other process development team members of each other working group. One of the final group activity analysis versions is then selected to use to determine a list of tasks for the preselected activity. The process development team members in their respective groups or in a different group arrangement then form a list of tasks, compare the tasks within the groups to form a final group task list version, and present each respective final group task list version to the other process development team members of each other working group.

The process development team members are then grouped or otherwise formed into multiple process development teams responsible for analyzing activities 91 within each function 89 (block 417), with each team member assigned to one or more of the process development teams. This step can be accomplished by requesting each process team member to self-nominate to contribute to two or more of the functions 89 based on interest and experience or skill in the respective functions 89. Specifically, as shown in FIG. 40 illustrating a process development team exercise template, according to an embodiment of the present invention, this can be accomplished by providing to each of the process development team members a list of the functions 89 and activities 91 (FIG. 6), requesting each of the process development team members self-select at least two of the functions 89, and in response to an uneven selection of functions 89, reassigning the process development team members to one or more other of the functions 89 to balance group numbers. These groups, assigned to the functions 89, form process development teams to analyze the functions 89. Each process development team can cover one or more functions 89 depending upon the major/scope of the functions 89. A main objective, however, is to provide an even distribution of functions 89 across all process development teams to ensure the workloads manageable.

Figure 16:
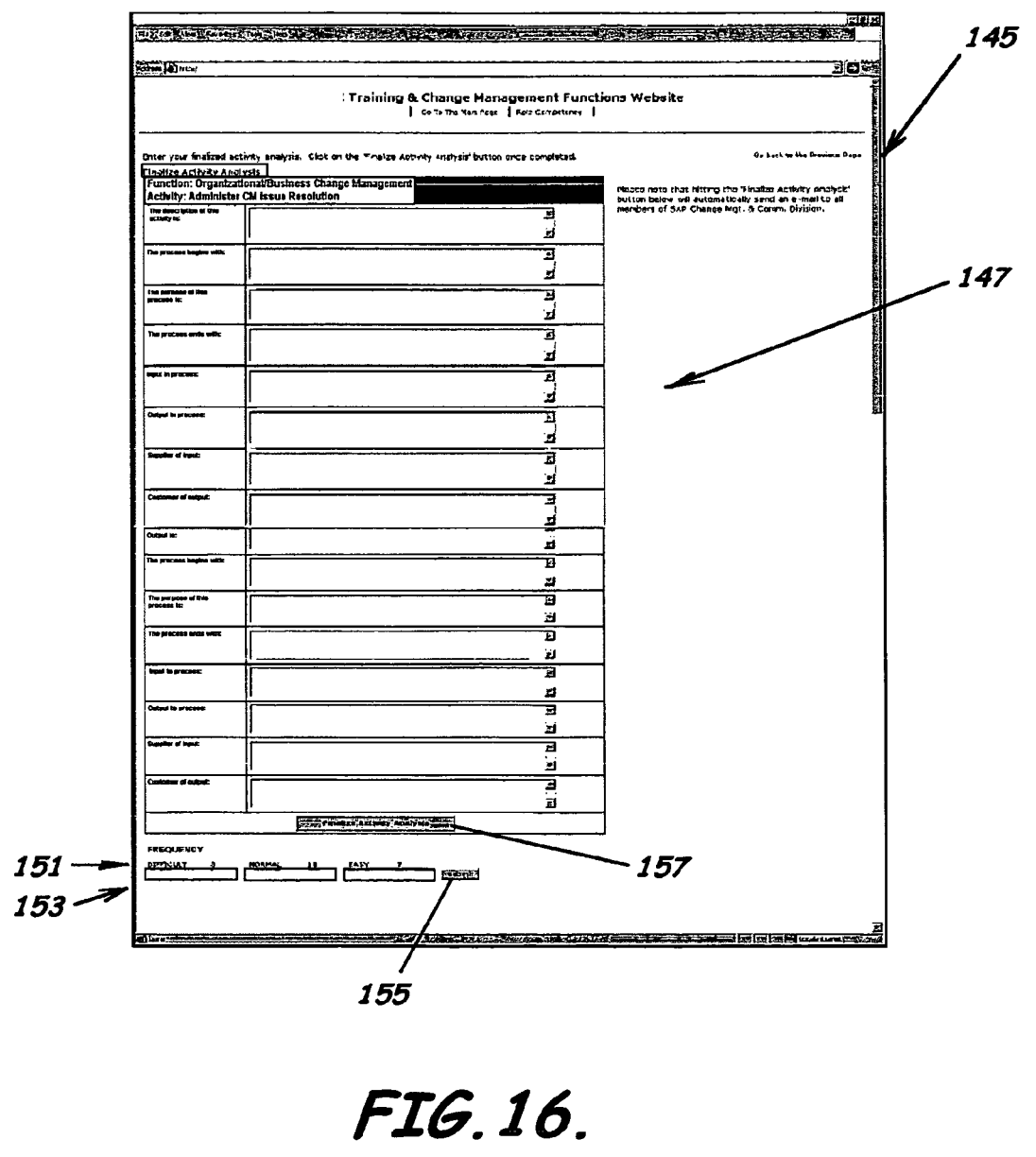

The teams are then requested to gather together and name or otherwise identify a single point of contact to arrange meetings, facilitate discussion, and post final decisions to a finalized activity analysis web page or template form 145 (FIG. 16). A competency lead representative (described later) can also be identified. Once determined, the names or identity of the process development team members and representatives are stored. Additionally, the process development teams are requested to perform an activity analysis of at least one activity (block 419) under their respective functions 89 and to present the results. The analysis can be performed and documented (block 421) utilizing, for example, an online suggested activity analysis web page template form 99 (FIG. 9), which can include fields for entering a description of the activity, an activity trigger, an activity terminator, a purpose of the activity, inputs, outputs, and affected suppliers and customers. The assignments are then finalized (block 423), post workshop agenda items are reviewed (FIG. 41), and the transition team members request and receive feedback, ideas, concerns, or suggestions on the various aspects of the transition plan (block 425).

According to an embodiment of the method, each process development team member analyzes activities assigned to them from the functions assigned to their respective process development team or teams. To ensure no bias in defining each activity, however, each team member is recommended to provide their analysis for all of the activities in the functions assigned to their process development team or teams. Additionally, each team member can provide an analysis on the other activities outside of the functions assigned to their team. This would typically be the case where a team member is knowledgeable about other activities.

As shown in the exemplary post-activity analysis workshop action item template illustrated in FIG. 41, each process development team member can perform an activity analysis on both individual and final team versions, e.g., refine, simplify, consolidate, streamline, to add and/or eliminate each activity 91 in their assigned function or functions 89 (block 431). As described above, the analysis can then be entered and stored online utilizing the activity analysis suggestion template form 99 (FIG. 9) configured to answer the following questions: What is a brief but complete description of the Activity? What triggers it? What is the first step (Task) that begins the Activity? What is the last step (Task) that ends the Activity? What inputs (documents, other sources of data) does the Activity require? Who supplies this input? What output (usually in the form of deliverables) does the Activity yield? Who is/are the customer(s) of the output(s)? Advantageously, the results of performing the activity analysis can be two fold. Firstly, the list of activities 91 under each function 89 can be revised. Secondly, for each activity 91, there can be a detailed analysis following the questions. FIG. 10 illustrates an exemplary online report output from the system 30.

An online alert, e.g., e-mail, can be provided to notify the process development representatives of each posting of a suggested activity analysis for each activity 91 under the assigned function or functions 89. Additionally, such e-mails can be sent to everyone in the organization in response to the process development representatives entering their finalized activity analysis. The process development representatives can schedule and conduct meetings with their process development team members (block 433) to compare the suggested analysis to produce a final analysis result (block 435). The step can be advantageous as it not only enhances knowledge transfer but results in the avoidance of "group-think" whereby one member's idea dominates the team's thinking, stifling its creativity and destroying "ownership."

Each process development team member also drafts a list of tasks 191 under each activity 91 (block 437) through, for example, the forms illustrated in FIGS. 15 and 17. The process development representatives can also schedule and conduct meetings with their process development team members (block 439) to compare the tasks to produce a final list of tasks for each activity 91 (block 441). As described above, the final analysis can then be entered and stored online (block 443) utilizing, for example, the online finalized activity analysis template form 145 (FIG. 16), described previously. An online alert, e.g., e-mail, is then automatically provided in response to the posting to notify organization members, e.g., everyone in the organization, of the posting, to thereby provide such members the opportunity to comment on the agreed-upon final versions of the activity descriptions as well as view each process development team member's original contribution. The various organization members can be provided a limited time such as, for example, 24 to 48 hours, to provide comment (block 445) under a protocol such that no comment is considered an agreement. Providing such a limited time period to respond can advantageously promote a sense of urgency and enhance response rates.

In response to the comments by the other organization members, the process development representatives can call the entire process development team together to consider such received comments. The process development representatives then finalize the activity descriptions, reviewing and either incorporating or rejecting comments (block 447). The process development team members then fill-in and submit a resource allocation form (block 449) including, for example, the following data: the name of the process development representative, the name of the process development team member, and the name of the assigned activity. Other resource allocation forms can include, for example, the resource commitment template form 323 (FIG. 30) and/or a master resource allocation table, or other suitable form adapted to receive input to individually or collectively list the resource commitments of the organization's members, to thereby summarize availability of each organization member based on, e.g., current assignment planned completion dates and scheduled absences. The process development team members then draft project plans for each function 89 (block 451). Business analysts who are generally process development team members or transition team members can additionally perform a quality check on the activity analysis for each of, or for a sample of, the activities 91.

Figure 42:
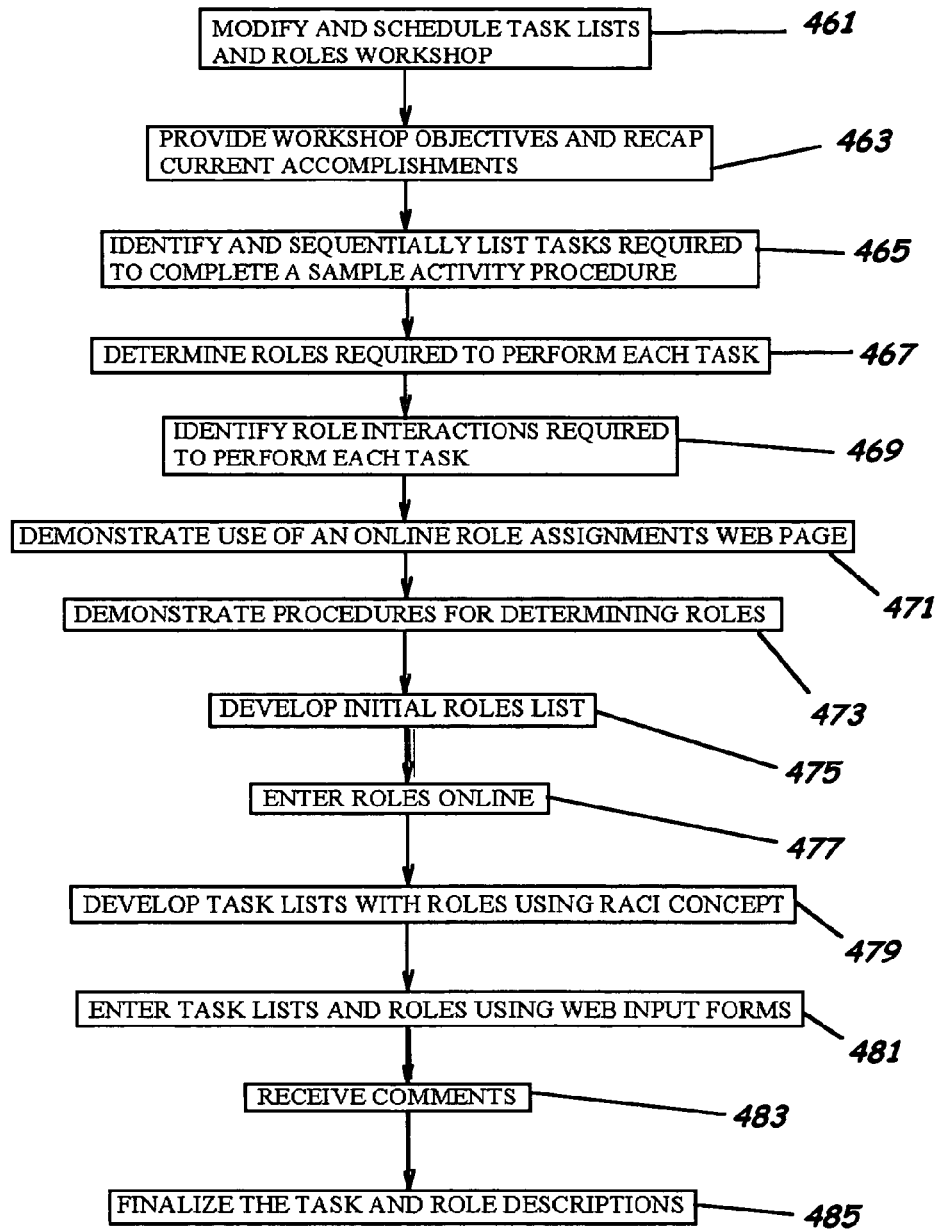
FIG. 42 is a schematic block flow diagram of a method of realigning an organization structure according to an embodiment of the present invention.

As shown in FIGS. 42 and 43, according to an embodiment of the present invention, the second workshop is a task and roles workshop which can function to train each of the process development team members to formulate tasks 191 and roles 201 for each of the activities 91 supporting the functions 89 of the new organization structure to enable identification of competencies and skill sets required to complete each of the activities 91. The transition team members access online presentation templates, modify the templates, schedule the task and roles workshop (block 461), and then conduct the workshop. Through presentation and discussion the transition team members can first provide the process development team members workshop objectives (FIG. 43) and recap current accomplishments, providing context and conceptually preparing the process development team members for the next required steps (block 463). The transition team members then demonstrate "drilling down" a sample activity to the task level. That is, the transition team members identify and sequentially list tasks 191 required to complete a sample activity procedure (block 465) based, for example, on the first and last tasks defined in the activity analysis normally performed after the activity analysis workshop. The transition team members also determine roles 201 required to perform each task 191 (block 467), and identify role interactions required to perform each task 191 (block 469), expressing the sample activity as a process map using, e.g., the exemplary live exercise template form (FIG. 44). Advantageously, this provides a step-by-step roadmap for an end-to-end business process for the sample activity, to thereby train each of the process development team members to develop tasks 191 for each of the activities 91.

A role 201 is generally defined as a set of skills defining a position such as, for example, change management specialist, graphic designer, database administrator, rather than a "job" or "specific person" that would fill the role. Note, although some tasks 191 may have more than one role 201 responsible and more than one role 201 may be consulted and/or informed of the progress and results of the task 191, generally to ensure accountability, only one role (assigned organization member) should be accountable for the completion of the task 191. The tasks 201 can be stated to enable identification of competencies and skill sets required to successfully complete the activity 91. These competencies and skill sets can be divided into technical and interpersonal. For example, technical examples include knowledge and skills in the use of MS PowerPoint, MS Word, MS project, and Documentum. Interpersonal examples include meeting facilitation and presentation skills. Such competencies and skills can be attributable to either an assigned activity lead or other assigned organization members. In addition, the activity lead typically requires project management, leadership, analytical, and negotiation skills. The transition team members can also demonstrate use of an online task and role assignments web page (block 471) such as web page 163 (FIG. 17) having a role task assignment table 164 which can include an add task link 165 to add new tasks 191, a new role link 167 to associate roles 201 to tasks 191, and an edit complx link 169 to assign a time duration for each corresponding complexity category, e.g., high, medium, and low. The transition team can also demonstrate procedures for determining roles 201 involved in each of the activities 91 and how the roles 201 relate to each other (block 473).

The process development team members are then requested to develop a listing of roles 201 for each of the activities 91 (block 475) and to enter the roles online (block 477). The process development team members then develop the tasks 191 with associated roles 201 (block 479), entering the roles 201 online in association with related tasks 191 (block 481) using, for example, the web pages and/or templates 163, 183, 195, 205 (FIGS. 17-20). The roles 201 and tasks 191 can be stored in a database 41 to allow online access. Role ratings or responsibility levels 203 (FIG. 19) such as, for example, responsible, accountable, consulting, and/or informing, can be assigned to the roles 201 (see, e.g., FIG. 44). According to the illustrated embodiment of the present invention, an accountable role 201 is defined as that filled by a person who "owns" the action, i.e., one who must see to it that it is done. To ensure accountability, only one person should be assigned such role 201 for a given task 191. A responsible role is defined as that filled by a member or by members who actually "do the work." Several members can do the work. A consult or consulting role is defined as that filled by a member or by members who must be involved in an action or decision before the action is taken or the decision made. An inform or informing role is defined as that filled by a member or by members who need to be notified generally after the action or decision is made.

According to an embodiment of the present invention, as with the suggested activity analysis, the process development representatives can be provided an online alert indicating posting of the task-role combinations for each activity 91 under the assigned function or functions 89. The process development representatives can schedule and conduct meetings with their process development team members to produce a final task-role combination for each task-role combination. The final task-role combination analysis can be entered and stored online utilizing, for example, the web pages and/or templates 163, 183, 195, 205 (FIGS. 17-20).

An online alert, e.g., e-mail, etc., can also be automatically provided in response to the posting, for example, to notify everyone in the organization of the posting to thereby provide such members the opportunity to comment on the final versions of the tasks 191 and roles 201, or in an alternative embodiment, also after the entry of each individual task. According to an embodiment of the present invention, the organization members can also view each process development team member's original contribution. Regardless, the various organization members again can be provided a limited time such as, for example, 24 to 48 hours, to provide comment to thereby enhance response rate, response quantity, and response quality.

In response to receiving the comments from the other organization members (block 483), the process development representatives can call the process development team together to consider such received comments. The process development representatives then finalize the task 191 and role 201 descriptions, reviewing and incorporating or rejecting comments (block 485), and enter the revisions online. Business analysts who are generally process development team members or transition team members can then perform a quality check on the tasks and roles.

Figure 45:
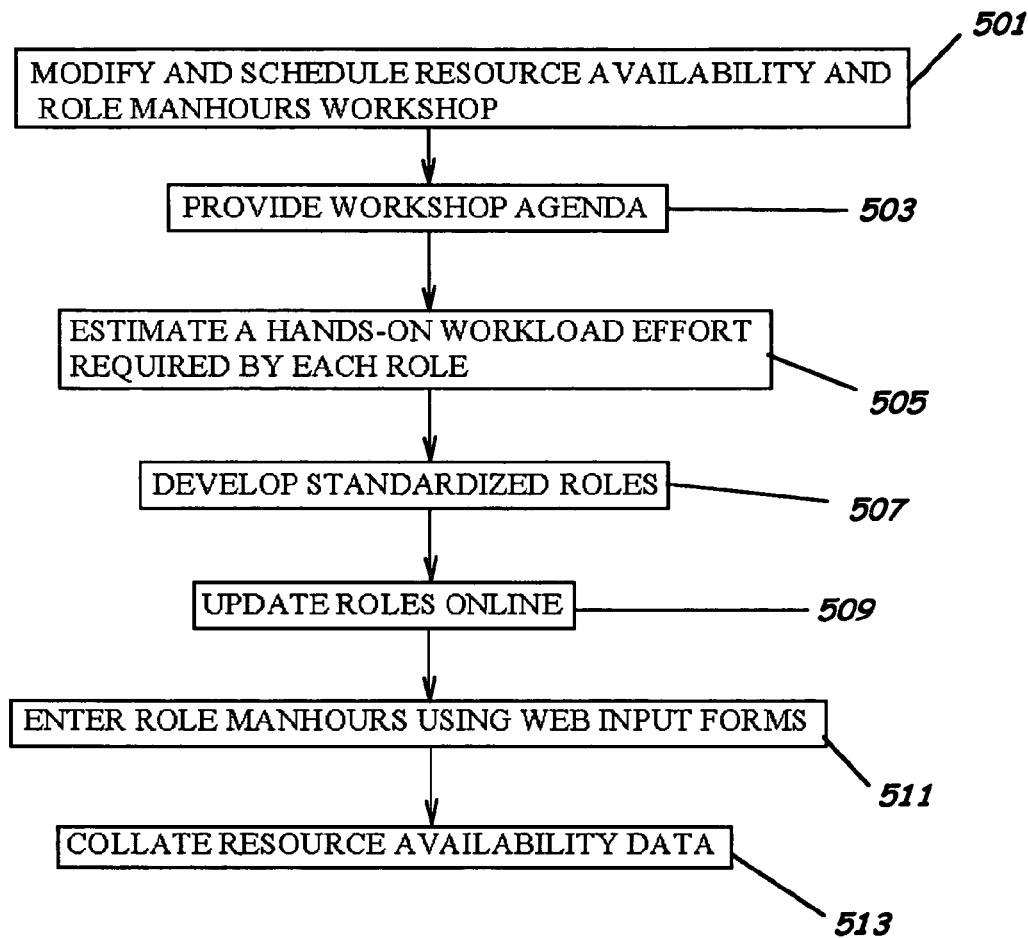
FIG. 45 is a schematic block flow diagram of a method of realigning an organization structure according to an embodiment of the present invention.

As shown in FIGS. 45 and 46, according to an embodiment of the present invention, the third workshop is a resource availability and role man-hours workshop which can function to train each of the process development team members to use the listing of tasks 191 and roles 201 to estimate a hands-on workload effort for each of the roles 201, rather than how long it may take on a calendar to complete, and to aid in estimating the total workload requirement for the new organization structure. The transition team members can access online presentation templates, modify the templates, schedule the resource availability and role man-hours workshop (block 501), and then conduct the workshop. Through presentation and discussion the transition team members can provide the process development team members workshop objectives (FIG. 46), recap current accomplishments, provide a context, and conceptually prepare the process development team members to analyze the tasks 191 and roles 201 for competency, e.g., knowledge, skills, and behavior or attitude according to preselected achievement levels, e.g., learn, use, guide, and innovate. The presentation and discussion can also educate the process development team members on how to use the information from the tasks 191 and roles 201 to determine resource availability, to preview how the information being contributed will be used in the next phase, and to compile, review and analyze the tasks 191 and roles 201, to thereby determine required man-hours and required competencies, to corresponding estimate workload and the workload required by the organization as a result of the analysis.

The transition team members, through the presentation and discussion, can provide an agenda (block 503) including the organization, guiding principles, review of present accomplishments, and description of next required steps, to thereby continue to promote learning, practice high involvement, increase transparency, and encourage ownership, to add value and to keep the members informed, reduce stress, and provide a lasting value to the organization by making the process repeatable and scalable. The presentation should also include a showing of active management sponsorship in view of balanced priorities.

As perhaps best shown in the exemplary live exercise template form (FIG. 47), a live exercise can be provided to educate the process development team members to estimate a hands-on workload effort required by each role 201 identified as having an "R" code or "responsible" responsibility level with consideration to low, medium, and high complexities (block 505). The process development team members can be educated, based on their individual and collective experience, on how to estimate the quantity of hands-on time a reasonably competent practitioner of the each role 201 would required to complete his/her involvement in an associated task 191. Advantageously, this can further aid in standardizing the roles 201 (block 507).

The process development team members complete the role responsibility analysis on each role 201. Such analysis can be performed by using, for example, a role responsibility web page form, such as web page form 195 (FIG. 19), to identify the role 201 as having a role responsibility level or code, e.g., responsible, accountable, consult, or inform (block 509), and by using an online role complexity and time durations web page form, such as web page form 205 (FIG. 20), to enter time durations for each complexity category, e.g., high, medium, and low (block 511). According to an embodiment of the present invention, a one-week hiatus may be required for data cleanup, i.e., standardizing the tasks 191 in each of the activities 91, for example, assuring there is only one "A" role code or "accountable" responsibility level for each task 191, reviewing the workloads suggested, and standardizing roles 201 across all functions 89. FIG. 21 illustrates an example list of tasks, roles, assigned responsibility codes, and determined time durations in high, medium, and low complexities where the role is "responsible," which advantageously can be used for such transition planning.

The process development team members are also requested to determine current obligations and projected absences to thereby determine or otherwise self-evaluate their respective availability (block 513). This can be accomplished using, for example, an online resource commitment (current projects and obligations) web page, e.g., web page template 323 (FIG. 30) or functionally similar web page form, to identify current projects and obligations for each of the plurality of process development team members. An online master resource allocation table (not shown) including current assignment planned completion dates and projected absences can additionally or alternatively be provided to summarize process development team member availability. Upon completion, and preferably before beginning the next workshop, the transition team members should perform a quality check on the role man-hours and resource availability data. Note, as a result of analyzing complexity, described below, a template or form for entering an activity complexity frequencies such as, for example, activity frequency input fields table or template 153 shown in the online finalized activity analysis template form 145 (FIG. 16), can additionally be provided for the process development team members or process development representatives to enter activity complexity frequencies for predefined activity frequency categories including, for example, difficult, normal, and easy complexity categories.

Figure 48:
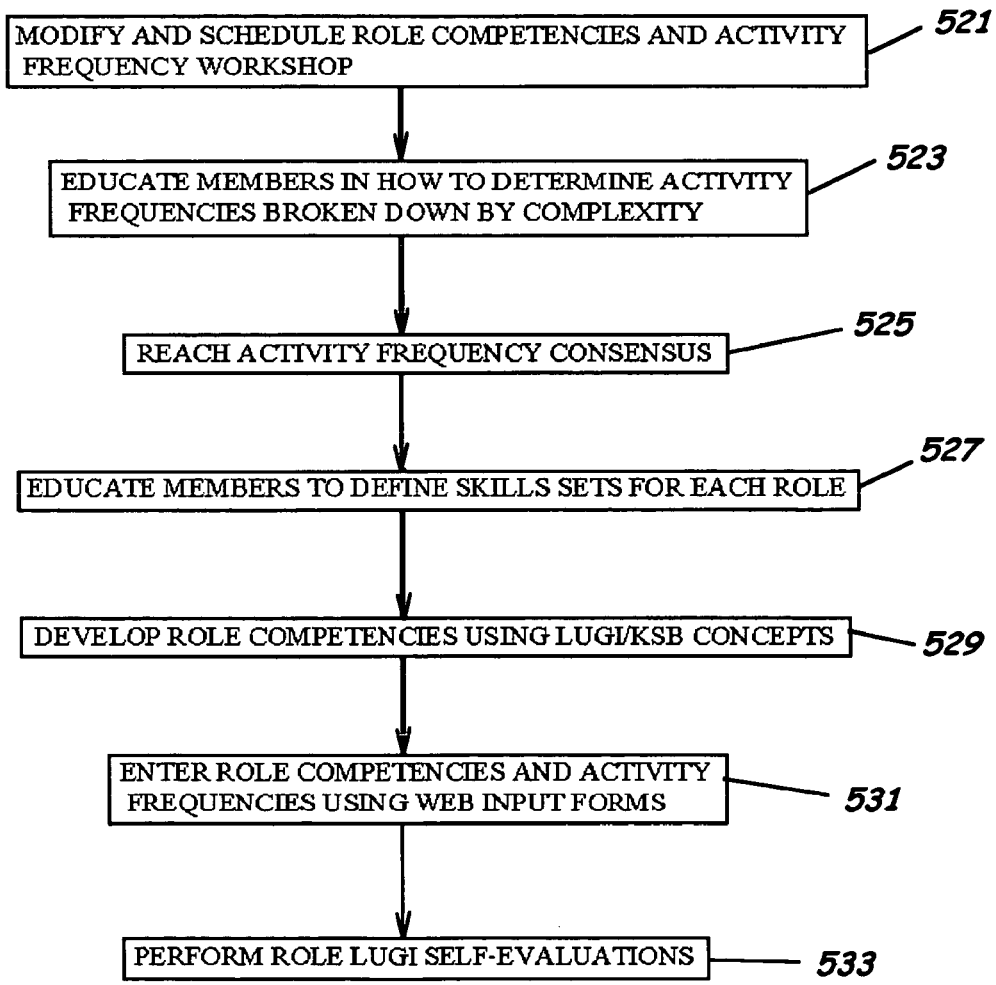
FIG. 48 is a schematic block flow diagram of a method of realigning an organization structure according to an embodiment of the present invention.

As shown in FIGS. 48 and 49, according to an embodiment of the present invention, the fourth workshop is a role competencies and activity frequency workshop which can function to train each of the process development team members to identify activity frequencies and complexities and to define a competency for each role 201 using learn, use, guide, and innovate (LUGI) concepts in conjunction with knowledge, skills, and behavior (KSB) concepts, to thereby develop role competencies. The transition team members can access online presentation templates, modify the templates, and schedule the role competencies and activity frequency workshop (block 521), and then conduct the workshop. Through presentation and discussion the transition team members provide the process development team members workshop objectives (FIG. 49), recap current accomplishments, provide context, and conceptually prepare the process development team members to determine role competencies. The transition team members can use the presentation and/or discussion to stress the importance of developing role competencies, educating them on the fact that doing so provides them the opportunity to provide the role descriptions in their specialized area and the opportunity to define levels of competency in a given role 201 to measure against.

As shown in block 523, according to an embodiment of the present invention, using, for example, an activity frequency/complexity template such as that shown in FIG. 50, the process development team members can be educated in how to determine the frequency of an activity broken down into, e.g., difficult, normal, and easy complexities. The frequency column, the sum of the difficult, normal, and easy categories, can provide the number of times in a selected time period, e.g., one year, an activity will be performed. The difficult column can provide the portion of the cases that will be considered difficult or high complexity. The normal column can provide the portion of the cases that will be considered a medium complexity. The easy column can provide the portion of the cases that will be considered easy or low complexity. In most cases, the frequency will be higher for a normal complexity compared to difficult and easy complexities. Through discussion and dialogue, the process development team members can reach a consensus on the likeliest frequency each activity 91 will occur in a predetermined time period, e.g., 52 weeks (block 525), as shown in the exemplary single-function activity frequency analysis table illustrated in FIG. 51.

Using, for example, an example LUGI/KSB table illustrated in FIG. 52 and an exemplary live exercise LUGI/KSB template form 393 illustrated in FIG. 53, a live exercise can be provided (block 527) to educate the process development team members to define skills sets for each role 201 using the concepts previewed in the resource availability and man-hours workshop. The process development team members can then, using the LUGI/KSB template form 393, define learn, use or apply, guide or educate, and innovate or shape achievement levels to define each roles competency in terms of provable knowledge, demonstrable skills, and exhibited behavior by achievement level.

After the final versions of the competency levels tables are achieved preferably using the workshop process of individual contribution and collective agreement (block 529), described previously, the process development representatives can access an online self-evaluation form such as, for example, the role competency template form 295 (FIG. 28), to enter the learn, use, guide, and innovate information for each of the roles 201 (block 531). The process development team members are then asked to perform a self-evaluation against the learn, use, guide, innovate, knowledge, skill, behavior information (block 533), for example, using a competency level table/template (self-evaluation) form 243 such as that illustrated in FIG. 26. Advantageously, the competency level self-evaluation form 243 can allow for ready selection, for example, of one of four stages to allow for quick standardized evaluations and provide organization members an opportunity to indicate interest in the role 201. If interest is indicated, the organization member can be added to the potential resource supply pool for the particular role 201. Correspondingly, the self-evaluations can advantageously be used to provide a baseline for personal development plans and support assignment of members to the roles 201. That is, identified as qualified to assume a role 201, individual transition plans can be developed based on organization member availability beyond current assignments to support personal development plans which can be implemented to close skills gaps. Advantageously, results of the self-evaluations indicating competency level and interest can be viewed using, for example, an online role competency report form 305 (FIG. 29).

Upon completion, and preferably before beginning the next workshop, the transition team members should then perform a quality check on the role competencies and activity frequencies. Note, according to an embodiment of the present invention, to relieve the workload on the process development representatives, a process development competency lead (or mentor) can be selected for each process development team to perform the function of producing and entering online the final versions of the competency table information. The competency leads are highly knowledgeable in their competency and can provide guidance to the team specialists who are required to demonstrate their particular competency in their respective roles. Note also, as organization members develop or improve their skills, their respective "stage" competency rating can progress from the first stage to the fourth stage.

Figure 54:
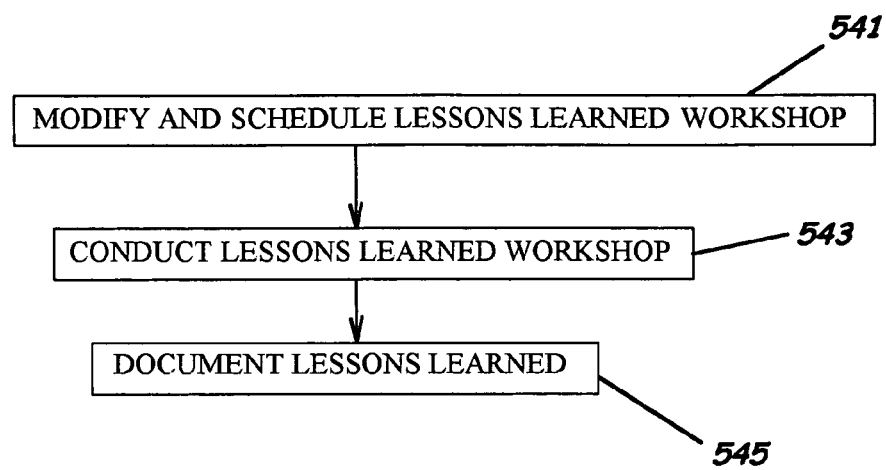
FIG. 54 is a schematic block flow diagram of a method of realigning an organization structure according to an embodiment of the present invention.

As shown in FIGS. 54 and 55, according to an embodiment of the present invention, the fifth workshop is a lessons learned workshop which can function to train each of the process development team members to acquire and understand insights of the process development team members to thereby improve the organization realignment process based upon shared observations of the participants.

As with the previously described workshops, the transition team members can access online presentation templates (not shown), modify the templates, and schedule the lessons learned workshop (block 541), and then conduct the workshop (block 543). Through presentation and discussion the transition team members can provide the process development team members workshop objectives (FIG. 55), recap current accomplishments, and prepare selected organization members to finalize the transition process, to thereby develop individual transition plans to transition organization members out of current obligations and into a respective new role or roles needed to perform a newly identified task. The transition team members can use the presentation and/or discussion to stress the importance of providing feedback to be used to improve reorganization of other sections, divisions, or related companies, and where practical, to modify the process, tools, and system 30. The lessons learned are then documented (block 545) for compilation by the transition team members and for review by management. Further, continuously through use of the online website, the transition team members can remotely monitor data input to thereby prioritize and direct follow-up activities.

According to an implementation of an embodiment of the present invention, lessons learned obtained after the activity analysis workshop included: the need to ensure greater focus is given to explaining the expectations of the work required when assigned to a process development member team, the need to emphasize the importance of facilitation when meeting in groups, the need to state that it is "ok" to not have information on all activities when meeting in groups otherwise a lot of time may be wasted on creative writing, and the need to perform individual analysis before meetings. Lessons learned obtained after the task and roles analysis workshop included the need to present the big picture of how tasks and roles feed into LUGI/KSB tables and workload planning. The lessons learned obtained after the resource availability and role man-hours workshop included the need to specify whether elapsed time is used in determining time durations. The lessons learned obtained after the role competencies and activity frequency workshop included an acknowledgment of the benefit of rotating team members when having meetings to define the LUGI/KSB information. Other general lessons learned included the need to have a facilitator in group meetings who does not belong to the process development team, the need to use simple words rather than acronyms, the need to begin workshops by providing feedback from the previous workshop, and an acknowledgment of the benefit of meeting in teams for brainstorming.

As shown in FIG. 56, according to an embodiment of the present invention, the results of the online web page forms provide data for calculating a skills gap in transitioning to the new organization structure with the skills gap being defined as the difference between the aggregate demand and qualified supply, described previously. That is, a method of realigning an organization structure can include determining a total demand on each role 201 based on associated tasks 191 each role 201 is responsible for performing across all associated functions 89 and activities 91, to thereby define an aggregate demand (block 561). The individual demand on a role 201 can be calculated by multiplying the time it takes (time duration) to perform a task 191 it is "responsible" for with the number times (frequency) that the task 191 takes place over a preselected time period, e.g., 52 weeks. The sum of each such time duration-frequency product for each associated task 191 provides the aggregate demand for the role 201.

Figure 33:
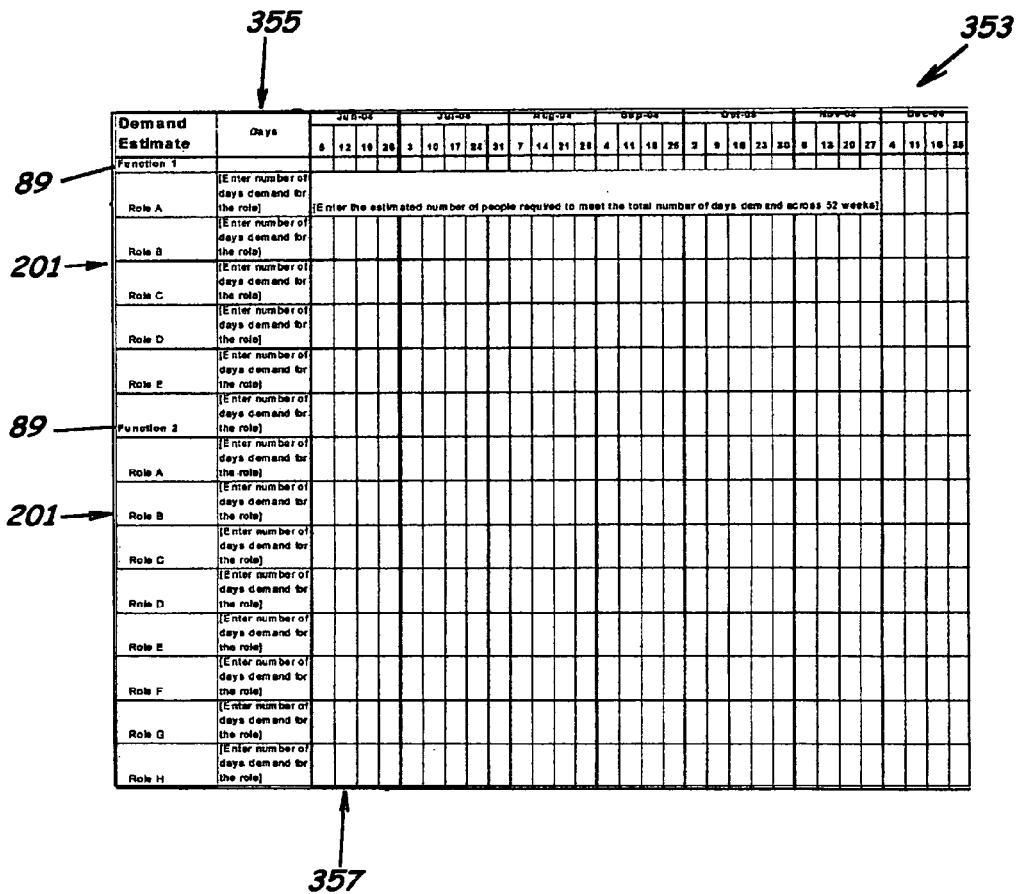
FIG. 33 is a schematic diagram illustrating an exemplary demand estimate report template form according to an embodiment of the present invention.
Figures 34, 35:
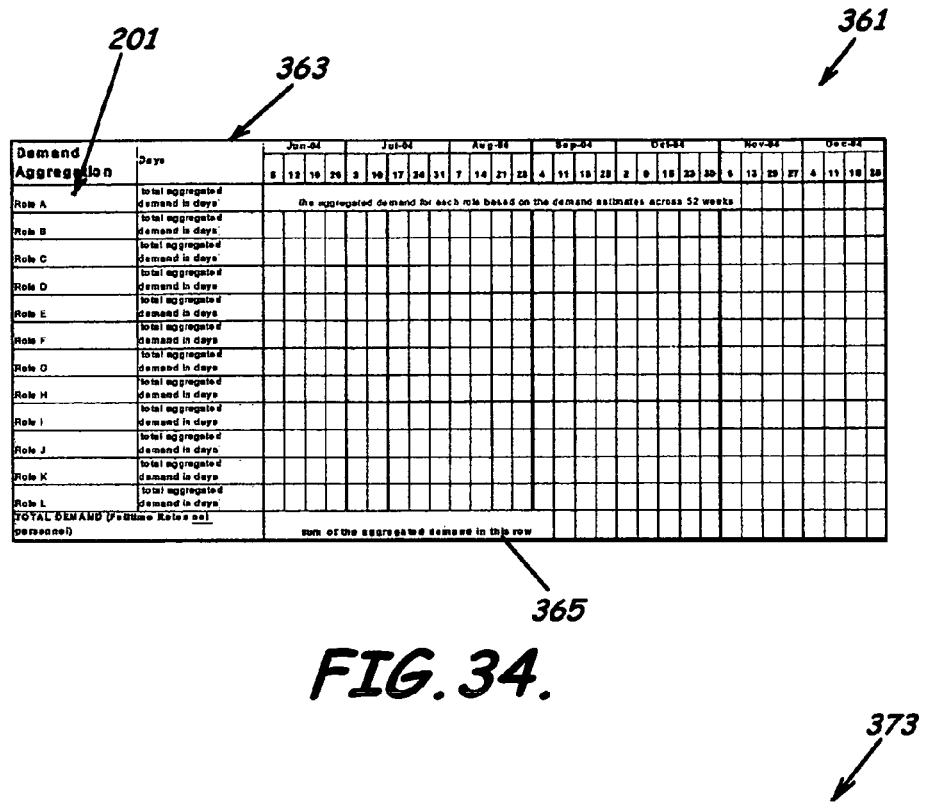
FIG. 34 is a schematic diagram illustrating an exemplary aggregate demand estimate report form according to an embodiment of the present invention.
FIG. 35 is a schematic diagram illustrating an exemplary skills gap analysis template form according to an embodiment of the present invention.

The demand estimate report template form 353 shown in FIG. 33 illustrates an the exemplary template for estimating demand on each role 201 within each function 89. The demand calculation uses the number of hours required of each role 201 to perform assigned tasks 191 within the activities 91 of each function 89. The total number of hours is then divided by the assignable hours in a day for the role 201, e.g., 5.4 hours, to be converted into the number of days demand 355 for the role 201. In response to the calculation of the number of days demand 355, the workload is then distributed across the example 52-week time period to determine the number of resources required. The aggregate demand estimate report form 361 shown in FIG. 34 illustrates a template for presenting the demand aggregation for each role 201. The aggregation is made for each role 201 based on the workload demand in each function 89 illustrated in FIG. 33. Note, according to the illustrated embodiment, the time duration of the tasks 191 are based on an hourly unit of measure. Correspondingly, according to the preferred embodiment of the present invention, the value can be converted to days using, e.g., a table or matrix that factors in the type of role 201 such as, for example, the major participants man-hours template form 343 illustrated in FIG. 32. The following calculation can be executed or otherwise employed to determine demand on each of the roles 201 to thereby determine a number of human resources required:

$$R=(H/T)/D;$$

R is the total number of human resources required, H is the total number of hours required by each role 201 to perform each assigned task 191, T is the total average assignable hours per unit of time, e.g., 5.4 hours per day, and D is a preselected unit of time to perform the tasks 191, e.g., 52 weeks.

The method also includes determining a number of qualified personnel having a required competency available to fulfill each one of the roles 201 to thereby determine a qualified resource supply (block 563). An estimate for the qualified supply can be calculated using, for example, the qualified supply template 333 illustrated in FIG. 31. A role competency report form 305 illustrated in FIG. 29 can also be provided. The role competency report form 305 can advantageously include indicia of both interest and competency of evaluated organization members in performing the roles 201. The method further includes determining a skills gap in transitioning to the new organization (block 565). An exemplary template for performing a skills gap analysis for an organization, i.e., calculating the difference between the aggregate resource demand and qualified resource supply, is illustrated in FIG. 35.

Figure 30:
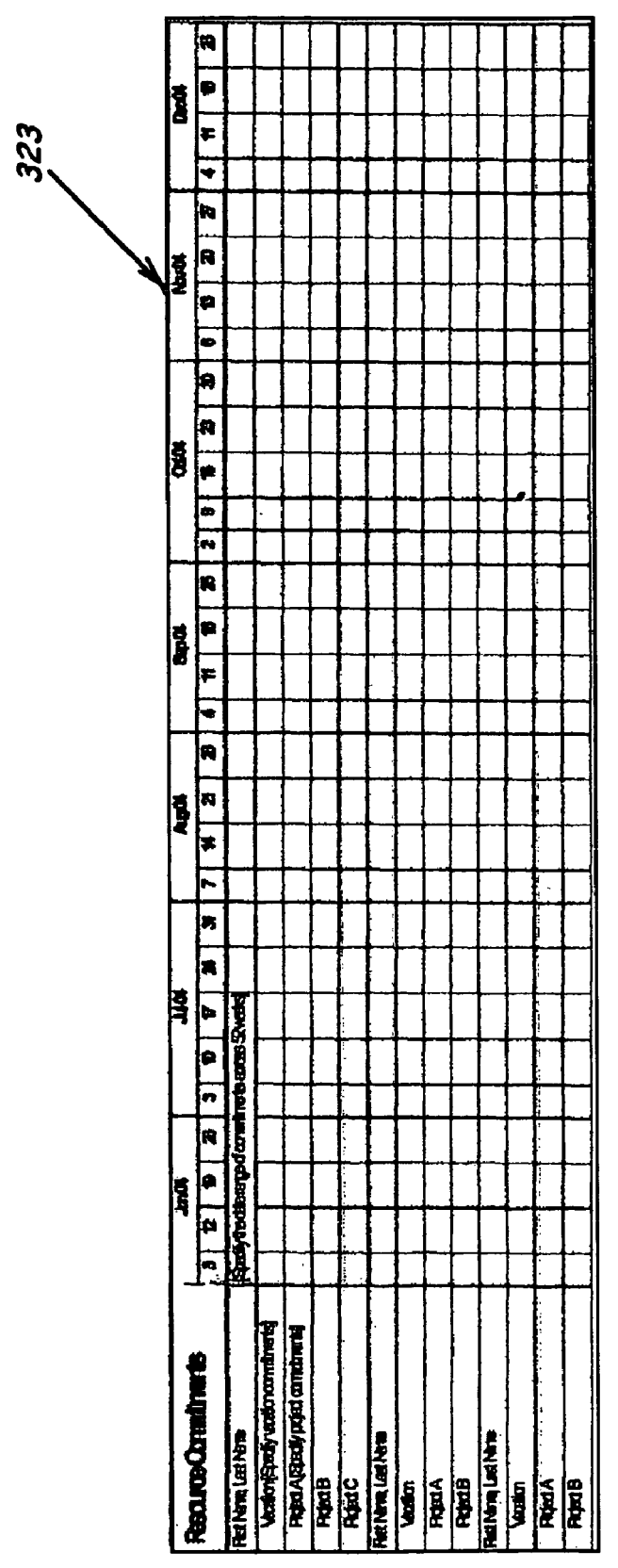

This data, along with resource commitment data, such as, for example, that illustrated in FIG. 30, can be used to determine resource requirements (block 567) defining a resource requirements gap. The resource requirement gap can be filled via internal training, external recruitment, or both. Where skills do not exist or are not available internally, external recruitment may be necessary. Resource requirements identified for an organization are founded based on the skills gap analysis. In mapping roles 201 to qualified supply, a management decision can be made to transition appropriate personnel to fulfill the roles 201. This can provide an impetus for developing individual transition plans to ensure a smooth transition out of the current obligations and into the new role. Individual transition plans can be developed (block 569) as part of the implementation process of the transition plan. Supporting data for determining internal resource requirements can be based on resource commitment data such as, for example, that illustrated in FIG. 30 and role competency data such as, for example, that illustrated in FIG. 29 which is derived from the competency self-evaluations. As an extension to the individual transition plans, personal development plans can also be formed or otherwise incorporated (block 571), which can be based on the different stages of competencies of the organization members in respective roles 201.

According to an embodiment of the present invention, having analyzed the new organization structure, having determined a skills gap between that required for the new organization structure as a function of aggregate demand and qualified supply and the determined resource requirements for the new organization structure as a function of qualified resource supply developed from the self-evaluation results and resource availability, management can initiate a recruitment process which includes implementation of the individual transition plans. Further, organization members implement the transition plan to the new organization structure using the developed activity level process maps.

It is important to note that while embodiments of the present invention have been described in the context of a fully functional system, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links.

As shown in FIGS. 1-56, embodiments of the present invention also include a computer readable medium that is readable by a computer to realign an organization structure. For example, according to an embodiment of the present invention, a computer readable medium includes a set of instructions that, when executed by a computer, such as, for example, server 35, cause the computer to perform the operation of providing a plurality of organization analysis web pages or other electronic forms associated with an organization realignment web site to capture data used to analyze and define functions 89, activities 91, tasks 191, and roles 201, forming a new organization structure developed by a plurality of organization members defining process development team members to thereby provide a repository of such data, and to provide access to the data by organization member participants during transition development between the old organization structure to the new organization structure to encourage learning, promote a sense of ownership, and encourage full involvement in realigning to the new organization structure. The instructions also include those to perform the operations of providing a plurality of resource determination web pages or other electronic forms associated with an organization realignment web site to determine a qualified supply of resources available to the new organization structure. The resource determination web pages or forms include at least one role competency self-evaluation web page form used to evaluate organization members competency in performing roles 201 identified to perform associated tasks 191 supporting activities 91 under each respective one of a plurality of functions 89. The instructions also include those to perform the operation of and providing at least one requirements web page or other electronic form associated with the organization realignment web site to determine a skills gap and a resource gap between resources demanded by the new organization structure and the qualified supply of resources.

More particularly, according to an embodiment of the present invention, a computer readable medium includes a set of instructions that, when executed by a computer, cause the computer to perform the operations of providing an online functions and activities template form such as form 87 (FIG. 6) having multiple input fields to receive user input data indicating a name of each function 89 according to a new organization structure and a name of each of one or more activities 91 under each function 89, and storing the functions 89 and activities 91 in a database, e.g., database 41, accessible to an online communication network 33 to allow access by a plurality organization members defining of process development team members. The instructions can also include those to perform the operation of providing a suggested activity analysis input web page form 99 accessible to the process development team members to separately enter a suggested activity analysis for each selected activity 91 associated with a selected function or functions 89, allowing for the assembly of activity analysis suggestion data for each of the activities 91 under the selected function or functions 89. The suggested activity analysis input web page form 99 has activity analysis attribute input fields adapted to receive user input data indicating a description of the activity attributes for a selected activity 91. The instructions can also include those to perform the operation of alerting online a process development representative associated with the selected function 89 of a posting of a respective activity analysis suggestion for the selected activity in response to activity analysis suggestion form submission.

According to an embodiment of the present invention, the instructions can include those to perform the operations of providing a finalize activity analysis input web page form 145 (FIG. 16) accessible to the process development representatives to separately enter a finalized activity analysis for each selected activity 91 of a selected function 89 to post a finalized activity analysis for each activity 91. Similar to the suggested activity analysis input web page form 99, the finalize activity analysis input web page form 145 has input fields adapted to receive user input data indicating a description of activity attributes for a selected activity 91. The input fields can include a description of the activity, a trigger initiating the activity, a first activity process task that begins the activity, a last activity process task that ends the activity, at least one activity process input, at least one activity process output, supplier of activity process input, and customer of activity process output. The finalize activity analysis input web page form 145 can also include input fields to enter activity frequencies for preselected complexity categories representing, for example, the categories of difficult, normal, and easy. Both the finalize activity analysis input web page form 145 and the suggested activity analysis input web page form 99 can be in the form of a template as known to those skilled in the art, which when related to a specific selected activity 91 provides received data to a data record associated with that selected activity 91.

Advantageously, the process development representative can review suggested activity analysis using a web page form such as, for example, the view all suggestions web page 123 (FIG. 13) to help formulate the finalized activity analysis. The instructions can also include the operations of storing each finalized activity analysis in database 41 in response to posting each finalized activity analysis to thereby allow multi-party access to each finalized activity analysis, and alerting online each preselected organization member of the posting of each respective finalized activity analysis to solicit comment and thus, enhance development of the finalized activity analysis. The instructions can further include those to perform the operation of providing a finalized activity analysis web page 113 (FIG. 11) including a final analysis provided by the associated process development representative, and a write comments web page (not shown) or write comments text entry field 129 (FIG. 14). In response to the notification, a user such as, for example, the process development team members or other interested organization members, can initiate display of a finalized activity analysis web page 113 to view the finalized or otherwise agreed upon attributes of the selected activity 91, can initiate display of the view all suggestions web page 123 to review suggested activity analysis entered by other process development team members, and can initiate display of the write comments text entry field 129. The associated process development representative can again be provided access the finalize activity analysis input web page form 145 to revise the finalized analysis for that activity 91 in response to the comments directed to a particular activity 91.

According to an embodiment of the present invention, the instructions can include those to perform the operations of providing to each process development team members a suggested task analysis input web page form similar to the task and role assignments web page 163 (FIG. 17) to enter one or more tasks 191 separately for each associated activity 91 and to assign roles 201 thereto. The suggested task analysis input web page form can have an input field or fields providing for separate entry of multiple tasks associated with a selected activity 91 to form a suggested task list required to perform the selected activity 91 and an input field or fields to associate at least one role 201 thereto. The instructions can also include those to perform the operations of storing each suggested task list in a database 41 accessible to the online communication network 33 in response to the posting of each respective suggested task list to thereby allow access to each suggested task entered by each one of the process development team members by the other of the plurality of process development team members, and alerting online the process development representative associated with the selected activity 91 of a posting of a suggested task list to thereby notify the process development representative that a new (updated) suggested task list analysis for the selected activity 91 has been posted.

Figure 12:
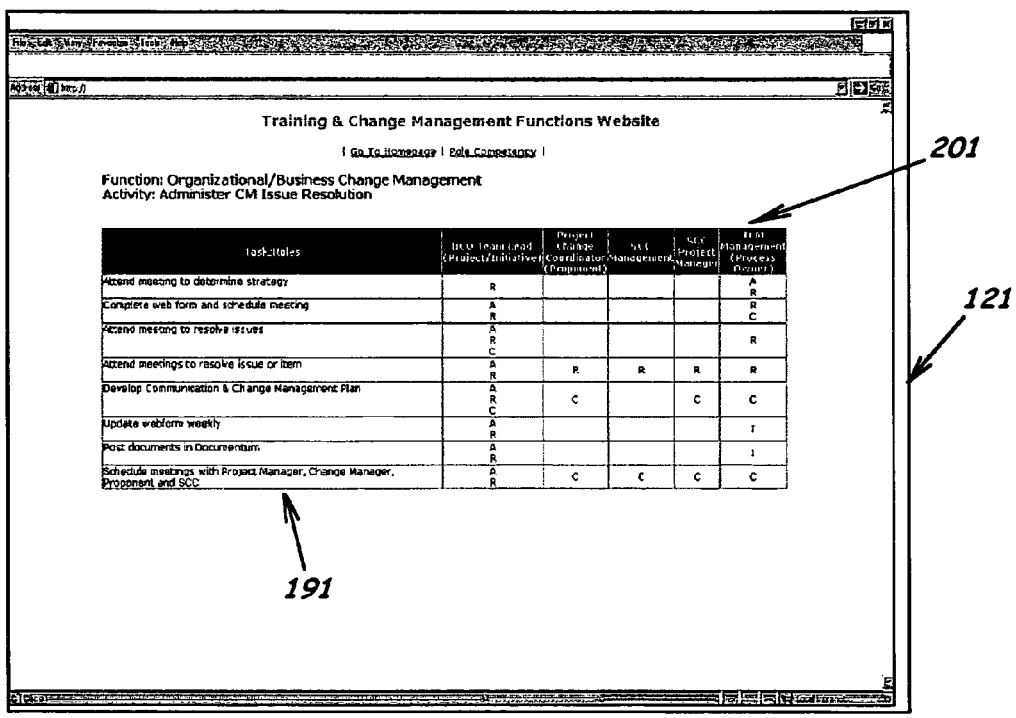
FIG. 12 is a screen view of a graphical user interface illustrating an exemplary task-role web page according to an embodiment of the present invention.

According to an embodiment of the present invention, the instructions can include those to perform the operation of providing to each process development representative a finalized task analysis input web page form similar to the task and role assignments web page 163 (FIG. 17) to separately enter one or more tasks 191 and to assign roles 201 to the tasks 191 for each selected activity 91 to thereby receive a finalized task list for the activity 91 such is that shown in FIGS. 12, 17, or 21. The instructions can also include those to perform the operation of storing each finalized list of tasks 191 and each role 201 for each associated task 191 for the selected activity 91 in the database 41 in response to posting each respective finalized list of tasks to thereby allow multi-party access to each finalized task list and to each role 201. Similar to the suggested task analysis input web page form, the finalized task analysis input web page form can have an input field or fields providing for entry of each task 191 associated with a selected activity 91 and an input field or fields to associate at least one role 201 thereto. Both the suggested task analysis input web page form and the finalized task analysis input web page form can be in the form of a template, as known to those skilled in the art, which when related to a specific selected activity 91 provides received data to a data record associated with that selected activity 91. Further, the instructions can also include those to perform the operations of providing an online task entry template form, e.g., web page form 183 (FIG. 18) in response to selection of an associated field or link to enter a task 191, and providing a similar web page form (not shown) in response to selection of an associated field or link to associate one or more roles 201 with each of the tasks 191.

According to an embodiment of the present invention, the instructions can include those to perform the operation of providing a role responsibility level input web page form, e.g., template form 195 (FIG. 19), having an input field or fields 197, e.g., accountable, responsible, consult, and inform, providing for entry of a required responsibility level associated with each task and role combination and indicating a role interaction required to complete each task, and can include those to perform the operation of assigning each task and role combination a required responsibility level. The instructions can also include those to perform the operation of providing an online role complexity and time durations web page form, e.g., template form 205 (FIG. 20) having complexity input fields 207 to receive and to assign a time duration for each corresponding complexity category, e.g., high, medium, and low, to a preselected responsibility level. According to an embodiment of the present invention, the instructions can further include those to perform the operation of alerting online each preselected affected or otherwise interested organization member of the posting of each finalized task list in response to the posting of each respective finalized task list to thereby solicit comment from the preselected organization members, the operation of providing an online comment form (not shown) including an input field to receive user input data indicating a comment directed to at least one version of a task list and assigned roles, the operation of providing data to display each suggested task list posted by the process development team members to thereby enhance comment formulation, and the operation of providing to the process development representative associated with the selected activity 91 online notification of each comment directed to an associated task list and assigned roles in response to comment posting by each respective organization member.

According to an embodiment of the present invention, the instructions can include those to perform the operation of providing an online role competency suggestion template form similar to self-evaluation web page form 243 (FIG. 26) having role competency attribute input fields adapted to receive user input data indicating role competency attributes to thereby separately assemble role competency suggestion data for each selected role 201, and those to perform the operation of providing an online role competency template form 295 (FIG. 28) having role competency input fields adapted to receive user input data indicating role competency attributes to thereby assemble finalized role competency data to develop a separate online role competency self-evaluation form for each selected role 201. The plurality of input fields 297 of the online role competency template form 295 can provide elements editable to describe an array of competency levels representing provable knowledge, demonstratable skills, and exhibited behavior or attitude according to achievement levels representing the following: learn, use or apply, guide or educate, and innovate or shape, defining competency level self-evaluations table elements for each respective role 201. Correspondingly, the required competency level can be determined by analyzing each of the roles 201 to determine required knowledge, skill, and behavior or attitude according to the following achievement levels: learn, use or apply, guide or teach, and innovate or shape. Such data is used to form a final version of the self-evaluation web page form 243 for each role 201 to be used to perform a separate self-evaluation by each process development team member and/or other organization members.

The instructions can also include those to perform the operation of providing the online role competency self-evaluation web page form 243 including achievement evaluation selection input fields 261, 263, 265, 267, to indicate a self-evaluated competency level and a role interest input field 260 to enter an indication of interest in the role under evaluation. The instructions can further include those to perform the operations of compiling the role competency self-evaluation results data in response to at least one role competency self-evaluation, and providing an online role competency self-evaluation results report, e.g., role self-evaluation report web page 283 (FIG. 27), indicating results of the self-evaluation. The online role competency report can have a plurality of role competency output fields indicating qualification for and interest in each of the roles 201 by each of the process development team members and/or other organization members to thereby display a qualified resource supply for each of the roles 201 to support assignment of organization members to the roles 201.

According to an embodiment of the present invention, a computer readable medium can include instructions that when executed by a computer, perform the operations of receiving a plurality of activities 91 to support major functions 89 of a new organization structure in response to user input, and receiving a listing of a plurality of tasks 191 and associated roles 201 to accomplish for each of the activities 91 also in response to user input. The instructions also include those to perform the operation of calculating a sum of products of a time duration to perform each associated task 191 and an aggregate frequency of the respective task 191 to determine a total demand on each role 201 based on associated tasks 191 each role 201 is responsible for performing across associated functions 89 defining an aggregate resource demand, the operation of determining a number of qualified personnel having a required competency level and availability to fulfill each one of the plurality of roles to thereby determine a qualified resource supply, and determining a skills gap in transitioning to the new organization structure in response to role identification, aggregate resource demand, and qualified resource supply, to thereby enhance organization transition planning.

The instructions to perform the operation of determining the qualified resource supply can include those to perform the operation of providing a resource allocation input web page form, e.g., resource commitment template form 323 (FIG. 30), having a plurality of resource commitment input fields to identify current projects and obligations for each of the plurality of organization members to thereby receive a description of availability of each of the organization members and/or perform the operation of providing a master resource allocation table (not shown) including current assignment planned completion dates and projected absences to thereby summarize availability of each organization member based on current assignment planned completion dates and scheduled absences to determine and allocate required resources. The instructions can include those to perform the operation of providing a qualified resource supply template, e.g., the role competency report form 305 (FIG. 29) and/or qualified supply template 333 (FIG. 31), to thereby display an available qualified supply of personnel for each respective one of the roles 201. The instructions can also include those to perform the operation of providing online assignable man-hour determination form, e.g., form 343 (FIG. 32), including a table having roles 201 identified as organization realignment participants related to activities 91 to thereby determine an average number of assignable hours per day for each of the organization realignment participants and/or other organization members.

According to an embodiment of the present invention, the instructions to perform the operation of determining an aggregate resource demand can further cause the computer to perform the operations of providing a demand estimate template web page, e.g., demand estimate report template form 353 (FIG. 33), to display demand for each one of the roles 201 within the each one of the functions 89, determining aggregate demand for each of the roles 201, and providing a demand aggregation web page form, e.g., aggregate demand estimate report form 361 (FIG. 34), to display aggregate demand for each one of the roles 201, to thereby enhance resource development management. The instructions to perform the operation of determining an aggregate resource demand further cause the computer to perform the operations of determining demand on each one of the roles 201 within each one of the functions 89 including calculating the number of human resources required as a factor of the total number of hours required by each role 201 to perform each assigned task 191 divided by the total average assignable hours per unit of time and a preselected unit of time to perform the tasks 191, and determining the time duration of the tasks 191 using a table or matrix having quantities separately identified for each type of role 201, such as those shown in table 209 (FIG. 21). The instructions can also or alternatively include those to perform the operation of compiling the demand estimate for each of the roles 201 to provide the demand estimate report form 353 indicating a number of resources required per day for each of the roles 201 to perform assigned tasks 191 within activities 91 of each of the functions 89 in response to the estimated number of hours required of each role 201 to perform assigned tasks 191 within activities 91 of each of the functions 89 and the determined average number of assignable hours per day for each of the roles 201. The operations can also include determining an estimated number of days required for each role 201 to perform assigned tasks 191 within each activity 91 to thereby determine the demand estimate defining a number of resources required for each role 201 to perform activities 91 of each one of the functions 89.

According to an embodiment of the present invention, the instructions can also include those to perform the operations of determining a resource requirement gap for the new organization defined as a difference between resource requirements and qualified resource supply. The qualified resource supply determination, for example, can include the operation of determining a number of organization members for each role 201 having predetermined competency level data extracted from a self-evaluation table, e.g., self-evaluation form 243 (FIG. 26) indicating competency level categories of learn, use or apply, guide or educate, innovate or shape and determining a number of organization members for each role 201 having a predetermined competency level and indicating an interest in the respective role 201. The operations can also include forming individual transition plans for each organization member which can map each one of the organization members to a selected role or roles 201 in response to determined organization resource requirements determined from qualified resource supply data from the competency self-evaluation and resource availability data from a resource availability evaluation.

According to an embodiment of the present invention, the instructions can also include those to perform the operations of providing a project initiation request form (not shown) to facilitate assignment of accountabilities, providing a project change request form (not shown) including entry fields to request modification of a standard activity to provide for tracking and requiring explanation of revisions to project plans and timelines, and providing a master projects inventory web page (not shown) to display indicate planned deliverables and identify accountable personnel for each task 191.

Embodiments of the present invention also include a computer memory element containing, stored in signal bearing media, a database containing data in computer readable format. For example, according to an embodiment of the present invention, a database, e.g., database 41, can include data indicating a plurality of functions 89 for a new organization structure, data indicating a separate plurality of activities 91 associated with and supporting each one of the plurality of functions 89 of the new organization structure, data indicating a separate listing of a plurality of tasks 191 and associated roles 201 for each one of the plurality of activities 91, data indicating a total demand on each role 201 based on associated tasks 191 each role 201 is responsible for performing across associated functions 89 defining an aggregate resource demand, data indicating a number of qualified personnel having a required competency level and available to fulfill each one of the plurality of roles 201 indicating a qualified resource supply, and data indicating a skills gap in transitioning to the new organization structure. Note, according to an embodiment of present invention, the data indicating a plurality of activities 91 can indicate a finalized activity analysis for each of the plurality of activities 91, and/or the data indicating a plurality of tasks 191 and associated roles 201 can indicate a finalized list of tasks 191 for each of the plurality of activities 91 along with at least one role 201 for each associated task 191.

According to various embodiments of the present invention, the database 41 can include various combinations of data such as, for example, data indicating a separate plurality of role competency attributes for each of the roles 201, and data indicating user interest in each of the roles 201 by each of a plurality of organization members. The database 41 can include data indicating a plurality of role competency attributes including data to describe an array of competency levels representing, e.g., provable knowledge, demonstratable skills, and exhibited behavior or attitude, according to achievement levels representing, e.g., learn, use or apply, guide or educate, and innovate or shape, defining competency level self-evaluations table elements for each respective role 201. The database 41 can also include data indicating a required responsibility level for each task and role combination, data indicating a time duration for each of a plurality of categories of complexities for each task and role combination, data indicating a separate plurality of comments directed to each of the plurality of finalized activity analysis, and data indicating a separate plurality of comments directed to at least one version of each of the plurality of tasks 191 and associated roles 201.

The database 41 can include data indicating a plurality of activities analysis suggestions indicating a corresponding plurality of suggested activity analysis for each of the plurality of activities 91, and data indicating a plurality of task list suggestions indicating a corresponding plurality of suggested tasks 191 and associated roles 201 to accomplish each of the activities 91. The database 41 can include data indicating a description of availability of each of a plurality of organization members including data indicating current projects and obligations for each respective organization member used to determine the qualified resource supply, and data indicating individual transition plans for each of a plurality of organization members associated with qualified resource supply data through a plurality of competency self-evaluations and resource availability data from a plurality of resource availability evaluations. Advantageously, each individual transition plan can map each one of the plurality of organization members to a selected role or roles 201.

Note, the computer memory element can include but is not limited to the various volatile and non-volatile forms of memory used in conjunction with a computer or processor such as, for example, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types.

According to an embodiment of the present intention, an online website can capture and report out the necessary information and, equally important, provide transparent access to all participants to all contributions throughout the transition. The online web technology can provide a central repository for data developed by process development team members and encourage interested organization members who may not be members of the process development team to review and comment on contributions using a familiar technical environment. Web page forms can be provided to ensure data is presented uniformly for all functions, activities, tasks, roles and competencies. Advantageously, the website design can, for example, provide flexibility with features like a pull-down list to which new roles can be added, RACI codes can be assigned, and in which LUGI-type self-assessments can be performed. According to an embodiment of the present invention, akin to SAP Workflow, an additional feature, automated online notification capability, e.g., via e-mail or pop-up windows, is designed into the website, which, advantageously, can accelerate on-line review of newly posted data to thereby ensure appropriate parties are automatically notified when certain updates are made to the data presented by the website. Further, according to an embodiment of the present invention, authorization profiles have been designed into the website to ensure only preselected organization members, e.g., process development representatives, can enter final versions, while still allowing other authorized organization members to provide comments. Advantageously, the ability of transition team members to remotely monitor data input via the website prioritizes and steers follow-up activities.

In the drawings and specification, there have been disclosed a typical preferred embodiment of the invention, and although specific terms are employed, the terms are used in a descriptive sense only and not for purposes of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification.

That claimed is:

1. A system to realign an organization structure, the system comprising:
   a computer network;
   at least one computer accessible to the computer network to define an organization realignment program server, the organization realignment program server having a processor and memory coupled to the processor to store operating instructions therein;
   a database accessible to the processor of the organization realignment program server and having a plurality of data records relating to organization functions, activities supporting the functions, tasks required to complete the activities, and roles to perform the tasks;
   a plurality of process development team member computers each positioned remote from the organization realignment program server and accessible to the computer network and having a processor, memory coupled to the processor to store operating instructions therein and to receive data records, a display in communication with the processor to display data records using an associated process development team member web browser, and a user interface in communication with the processor to provide an associated process development team member with online access to the data records over the computer network to facilitate reorganization program development;
   a plurality of process development representative computers positioned remote from the organization realignment program server and accessible to the computer network and having a processor and memory coupled to the processor to store operating instructions therein and to receive data records, a display in communication with the processor to display data records using an associated process development representative web browser stored in the memory, and a user interface in communication with the processor to provide an associated process development representative with online access to the plurality of data records over the computer network to thereby view and edit activity and role data;
   organization realignment program product stored in the memory of the organization realignment program server to facilitate reorganization program development through the provision of a plurality of organization analysis webpage forms and online access to the plurality of data records, the organization realignment program product including:
     a functions former positioned to provide data to display an online functions and activities template form having a plurality of input fields and to receive user input data indicating for each of a plurality of organization functions a name of the respective organization function and a name of each of a plurality of corresponding activities under each respective one of the plurality of organization functions for a new organizational structure for an organization entity undergoing an organizational realignment,
     an activity analysis suggestion former positioned to provide data to display an online activity analysis suggestion template form having a plurality of activity analysis attribute input fields and to receive user input data indicating activity analysis attributes to thereby assemble activity analysis suggestion data separately for each of the plurality of activities under each respective one of the plurality of organization functions,
     a finalized activity analysis former positioned to provide data to display an online finalized activity analysis template form having a plurality of activity attributes input fields and to receive user input data indicating finalized activity attributes to thereby assemble finalized activity analysis data separately for each selected one of the plurality of activities under each respective one of the plurality of organization functions,
     a task former positioned to provide data to display an online task template form having a task input field and to receive user input data indicating a task description to thereby assemble a task list separately for each selected one of the plurality of activities under each respective one of the plurality of organization functions,
     a role task former positioned to provide data to display an online role responsibility level template form having a role responsibility level input field and to receive user input data indicating a role interaction required to complete each task defining a role responsibility level to thereby separately assign at least one role to each task on the task list for each selected one of the plurality of activities under each respective one of the plurality of organization functions and to thereby assign a role responsibility level to each role task combination needed to complete the respective task,
     a role competency suggestion former positioned to provide data to display an online role competency suggestion template form having a plurality of role competency attribute input fields and to receive user input data indicating role competency attributes to thereby assemble role competency suggestion data to develop an online role competency self-evaluation form separately for each selected one of a plurality of roles associated with the plurality of activities under each respective one of the plurality of organization functions,
     a role competency former positioned to provide data to display an online role competency template form having a plurality of role competency input fields and to receive user input data indicating role competency attributes received through the online role competency suggestion template form to thereby assemble finalized role competency data to form the online role competency self-evaluation form separately for each selected one of the plurality of roles associated with the plurality of activities under each respective one of the plurality of organization functions,
     a role competency report former positioned to compile role competency self-evaluation results data responsive to at least one role competency self-evaluation and to provide data to display an online role competency report form having a plurality of role competency output fields indicating qualification for and interest in each of the plurality of roles by each of a plurality of organization members to thereby display a qualified resource supply for each of the plurality of roles to support assignment of organization members to the plurality of roles,
     a qualified resource supply determiner positioned to determine a qualified supply of resources to satisfy the new organizational structure for the organization entity undergoing the organizational realignment responsive to the role competency self-evaluation of each of the plurality of organization members and to provide data to display a web page form indicating the qualified supply of resources, a demand estimate determiner positioned to compile a demand estimate for each of the plurality of roles and to provide data to display a demand estimate report form indicating a number of resources required per unit of time for each of the plurality of roles to perform assigned tasks within activities of each of the plurality of organization functions to satisfy the new organizational structure for the organization entity undergoing the organizational realignment, the demand estimate determination responsive to an estimated number of hours required of each role to perform assigned tasks within activities of each of the plurality of organization functions and responsive to the determined average number of assignable hours per unit of time for each of the plurality of roles to determine an estimated number of units of time required for each role to perform assigned tasks within each activity under each one of the plurality of organization functions to thereby determine the demand estimate defining the number of resources required for each role to perform the activities of each one of the plurality of organization functions, and a skills gap analysis template former positioned to cause display of skills gap analysis results data responsive to role identification data, demand estimate data, and qualified supply data to thereby enhance organization transition planning.

2. A system as defined in claim 1,
wherein the finalized activity analysis former is positioned to provide data to display an online finalized activity analysis web page to thereby display the finalized activity analysis; and
wherein the organization realignment program product further includes a comment manager positioned to provide data to display an online comment form and to receive user input data indicating at least one comment directed to the finalized activity analysis and to provide online notification of the comment to a preselected one of a plurality of organization members associated with the selected one of the plurality of activities defining a process development representative.

3. A system as defined in claim 1,
wherein the finalized activity analysis former is further positioned to provide data to display an online finalized activity analysis web page to thereby display the finalized activity analysis; and
wherein the organization realignment program product further includes an activity analysis suggestion viewer positioned to provide data to display each suggested one of a plurality of activity analysis suggestions for each selected one of the plurality of activities posted by a corresponding plurality of process development team members to thereby enhance comment formulation.

4. A system as defined in claim 1, wherein the role task former is further positioned to provide data to display a role complexity template form having a plurality of complexity input fields to assign a time duration for each of a plurality of corresponding complexity categories to a selected one of the plurality of responsibility levels.

5. A system as defined in claim 1,
wherein the role task former is positioned to provide data to display an online finalized task-role web page to thereby display the finalized role task combination; and wherein the organization realignment program product further includes:
a comment manager positioned to provide data to display an online comment form and to receive user input data indicating at least one comment directed to at least one version of the task list and assigned roles and to provide online notification of the comment to a preselected one of a plurality of organization members associated with the selected one of the plurality of activities defining a process development representative, and
a role task viewer positioned to provide data to display each of a plurality of task list and role assignment suggestions posted by a corresponding plurality of process development team members to thereby enhance comment formulation.

6. A system as defined in claim 1, wherein the organization realignment program product further includes:
an assignable hours determiner positioned to provide data to display an online assignable man-hour determination form including a table having a plurality of roles identified as organization realignment participants related to a plurality of activities to thereby determine an average number of assignable hours per day for each of the plurality of participants; and
a resource commitment manager positioned to provide data to display a resource commitment for each of the plurality of organization members, and positioned to provide data to display a master resource allocation table to thereby summarize availability of each of the plurality of organization members based on current assignment planned completion dates and scheduled absences.

7. A system as defined in claim 1,
wherein the online role competency self-evaluation form includes a plurality of achievement evaluation selection input fields to indicate a self-evaluated achievement level and a role interest input field to enter an indication of interest in the role under self-evaluation; and
wherein the demand estimate determiner is further positioned to compile an aggregate demand estimate for each of the plurality of roles and to provide data to display an aggregate demand estimate report form indicating an aggregate number of resources required per day for each of the plurality of roles.

8. A system as defined in claim 1, wherein the organization realignment program product further includes:
an activity analysis suggestion entry alert manager positioned to alert one of a first plurality of preselected organization members associated with a selected one of the plurality of organization functions defining a process development representative of the respective activity analysis suggestion responsive to activity analysis suggestion form submission;
a finalized activity analysis entry alert manager positioned to alert via an automated process each of a plurality of process development team members of the respective finalized activity responsive to finalized activity analysis form submission; and
a task and role entry alert manager positioned to alert each of a second plurality of preselected organization members via an automated process to review the respective finalized task list and assigned roles responsive to task and role form completion.

9. A system as defined in claim 1, wherein the organization realignment program product further includes:

a training materials manager positioned to provide data to display a plurality of organization transition workshop briefing templates for each of a plurality of organization transition workshops;

a transition plan manager positioned to display data indicating individual transition plans for each of the plurality of organization members responsive to determined organization resource requirements determined from qualified resource supply data from the competency self-evaluation and resource availability data from a resource availability evaluation, each individual transition plan mapping each one of the plurality of organization members to a selected role or roles; and a project manager positioned to provide data to display a project initiation request form to facilitate assignment of accountabilities and a project change request form to request modification of a standard activity that tracks and requires explanation of revisions to project plans and timelines, the project manager including a master projects inventory manager positioned to provide data to display a master projects inventory to thereby indicate planned deliverables and identify accountable personnel for each task.

10. A system as defined in claim 1, wherein the online finalized activity analysis template form includes input fields to enter activity frequencies for a plurality of preselected categories indicating the categories of difficult, normal, and easy;

wherein the online role competency self-evaluation form includes a plurality of achievement evaluation selection input fields to indicate a self-evaluated achievement level and a role interest input field to enter an indication of interest in the role under self-evaluation; and wherein the organization realignment program product further includes an authorization profile manager positioned to limit access to each of a plurality of web page forms responsive to a user assigned authorization to prevent unauthorized access to sensitive organization data.

11. A system to realign an organization structure comprising:

a computer network;

at least one computer accessible to the computer network to define an organization realignment program server, the organization realignment program server having a processor and memory coupled to the processor to store operating instructions therein;

a plurality of process development team member computers each positioned remote from the organization realignment program server and accessible to the computer network and having a processor, memory coupled to the processor to store operating instructions therein and to receive data records, a display in communication with the processor to display data records using an associated process development team member web browser, and a user interface in communication with the processor to provide an associated process development team member with online access to data records over the computer network to facilitate reorganization program development; and organization realignment program product stored in the memory of the organization realignment program server to facilitate reorganization program development over the computer network, the organization realignment program product including:

an activity analysis suggestion former positioned to provide data to display an online activity analysis suggestion template form having a plurality of activity analysis attribute input fields and to receive user input data indicating activity analysis attributes to thereby assemble activity analysis suggestion data separately for each of a plurality of activities under each respective one of a plurality of organization functions for a new organizational structure for an organization entity undergoing an organizational realignment, a task former positioned to provide data to display an online task template form having a task input field and to receive user input data indicating a task description to thereby assemble a task list separately for each selected one of the plurality of activities under each respective one of the plurality of organization functions, a role task former positioned to provide data to display an online role responsibility level template form having a role responsibility level input field and to receive user input data indicating a role interaction required to complete each task defining a role responsibility level to thereby separately assign at least one role to each task on the task list for each selected one of the plurality of activities under each respective one of the plurality of organization functions and to thereby assign a role responsibility level to each role task combination needed to complete the respective task, a role competency suggestion former positioned to provide data to display an online role competency suggestion template form having a plurality of role competency attribute input fields and to receive user input data indicating role competency attributes to thereby assemble role competency suggestion data to develop an online role competency self-evaluation form separately for each selected one of a plurality of roles associated with the plurality of activities under each respective one of the plurality of organization functions, a role competency former positioned to provide data to display an online role competency template form having a plurality of role competency input fields and to receive the user input data indicating role competency attributes received through the online role competency suggestion template form to thereby assemble finalized role competency data to form the online role competency self-evaluation form separately for each selected one of the plurality of roles associated with the plurality of activities under each respective one of the plurality of organization functions, a qualified resource supply determiner positioned to determine a qualified supply of resources responsive to a role competency self-evaluation of each of the plurality of organization members and to provide data to display a qualified resources web page form indicating the qualified supply of resources to satisfy the new organizational structure for the organization entity undergoing the organizational realignment, a demand estimate determiner positioned to compile a demand estimate for each of the plurality of roles and to provide data to display a demand estimate report form indicating a number of resources required per day for each of the plurality of roles to perform assigned tasks within activities of each of the plurality of organization functions to satisfy the new organizational structure for the organization entity undergoing the organizational realignment, the demand estimate determination responsive to an estimated number of hours required of each role to perform assigned tasks within activities of each of the plurality of organization functions and responsive to the determined average number of assignable hours per unit of time for each of the plurality of roles to determine an estimated number of units of time required for each role to perform assigned tasks within each activity under each one of the plurality of organization functions to thereby determine the demand estimate defining the number of resources required for each role to perform the activities of each one of the plurality of organization functions, and a skills gap analysis template former positioned to calculate and cause display of skills gap analysis results data responsive to role identification data, demand estimate data, and qualified supply data to thereby enhance organization transition planning.

12. A system as defined in claim 11, wherein the organization realignment program product further includes:

a functions former positioned to provide data to display an online functions and activities template form having a plurality of input fields and to receive user input data indicating for each of the plurality of organization functions a name of the respective function and a name of each of a plurality of corresponding activities under each respective one of the plurality of organization functions; and a finalized activity analysis former positioned to provide data to display an online finalized activity analysis template form having a plurality of activity attributes input fields and to receive user input data indicating finalized activity attributes to thereby assemble finalized activity analysis data separately for each selected one of the plurality of activities under each respective one of the plurality of organization functions.

13. A system as defined in claim 12, wherein the organization realignment program product further includes:

a role competency report former positioned to compile role competency self-evaluation results data responsive to at least one role competency self-evaluation and to provide data to display an online role competency report form having a plurality of role competency output fields indicating qualification for and interest in each of the plurality of roles by each of a plurality of organization members to thereby display a qualified resource supply for each of the plurality of roles to support assignment of organization members to the plurality of roles.

14. A system as defined in claim 12, wherein the finalized activity analysis former is positioned to provide data to display an online finalized activity analysis web page to thereby display the finalized activity analysis; and wherein the organization realignment program product further includes an activity analysis suggestion viewer positioned to provide data to separately display each selected one of a plurality of activity analysis suggestions posted by a corresponding plurality of process development team members to thereby enhance comment formulation.

15. A system as defined in claim 11, wherein the role task former is further positioned to provide data to display a role complexity template form having a plurality of complexity input fields to assign a time duration for each of a plurality of corresponding complexity categories to a selected one of the plurality of responsibility levels, and to provide data to display an online finalized task-role web page to thereby display the finalized role task combination; and wherein the organization realignment program product further includes a role task viewer positioned to provide data to display each of a plurality of task list and role assignment suggestions posted by a corresponding plurality process development team members to thereby enhance comment formulation.

16. A system as defined in claim 11, wherein the organization realignment program product further includes:

an assignable hours determiner positioned to provide data to display an online assignable man-hour determination form including a table having a plurality of roles identified as organization realignment participants related to a plurality of activities to thereby determine an average number of assignable hours per unit of time for each of the plurality of participants; and a resource commitment manager positioned to provide data to display a resource commitment for each of the plurality of organization members, and positioned to provide data to display a master resource allocation table to thereby summarize availability of each of the plurality of organization members based on current assignment planned completion dates and scheduled absences.

17. A system as defined in claim 11, wherein the demand estimate determiner is further positioned to compile an aggregate demand estimate for each of the plurality of roles and to provide data to display an aggregate demand estimate report form indicating an aggregate number of resources required per unit of time for each of the plurality of roles.

18. A system as defined in claim 12, wherein the organization realignment program product further includes:

an activity analysis suggestion entry alert manager positioned to alert one of a first plurality of preselected organization members associated with a selected one of the plurality of organization functions defining a process development representative of the respective activity analysis suggestion responsive to activity analysis suggestion form submission;

a finalized activity analysis entry alert manager positioned to alert via an automated process each of a plurality of process development team members of the respective finalized activity responsive to the finalized activity analysis form submission; and a task and role entry alert manager positioned to alert each of a second plurality of preselected organization members via an automated process to review a respective finalized list of task and role combinations responsive to task and role form entry completion.

19. A system as defined in claim 11, wherein the organization realignment program product further includes:

a training materials manager positioned to provide data to display a plurality of organization transition workshop briefing templates for each of a plurality of organization transition workshops; and a transition plan manager positioned to display data indicating individual transition plans for each of the plurality of organization members responsive to determined organization resource requirements determined from qualified resource supply data from the competency self-evaluation and resource availability data from a resource availability evaluation, each individual transition plan mapping each one of the plurality of organization members to a selected role or roles.

20. A system as defined in claim 11, wherein the organization realignment program product further includes a set of instructions that when executed by the organization realignment program server cause the server to perform the operation of:

providing a plurality of organization analysis web pages associated with an organization realignment web site configured to capture data developed by a plurality of process development team members and used to analyze and define organization functions, activities, tasks, and roles to form a new organization structure to thereby provide a repository of the data and to provide access to the data by organization member participants during transition development between an old organization structure to the new organization structure to encourage learning, promote a sense of ownership, and encourage full involvement in realigning to the new organization structure.

21. A system as defined in claim 11, wherein the organization realignment program product further includes a set of instructions that when executed by the organization realignment program server cause the server to perform the operations of:

providing a finalized activity analysis input web page form to an organization member defining a process development representative to separately enter a finalized activity analysis for each selected one of the plurality of activities of a selected one of the plurality of organization functions to thereby post a finalized activity analysis for each of the plurality of activities under the selected one of the plurality of organization functions, the finalize activity analysis input web page form having a plurality of input fields adapted to receive user input data indicating a description of a corresponding plurality of activity attributes for the selected one of the plurality of activities responsive to process development representative input and responsive to process development representative evaluation of suggested activity analysis data from each of a corresponding plurality of the process development team members;

storing each finalized activity analysis in a database accessible to the computer network responsive to posting each respective finalized activity analysis to thereby allow multi-party access to each finalized activity analysis; and alerting online via an automated process each of a preselected plurality of organization members of the posting of each respective finalized activity analysis responsive to the posting of each respective finalized activity analysis to thereby solicit comment from each of the preselected plurality of organization members.

22. A system as defined in claim 11, wherein the organization realignment program product further includes a set of instructions that when executed by the organization realignment program server cause the server to perform the operations of:

providing a suggested task analysis input web page form to each one of a plurality of the process development team members to enter one or more tasks separately for each selected one of the plurality of activities of a selected one of the plurality of organization functions and to assign roles thereto, the suggested task analysis input web page form having an input field providing for iterative entry of a plurality of the tasks associated with a selected one of the plurality of activities defining a suggested task list required to perform the selected activity and an input field to associate at least one role thereto responsive to process development team member input to thereby receive one or more tasks and associated roles;

storing each suggested task list in a database accessible to the computer network responsive to posting each respective suggested task list to thereby allow access to each suggested task entered by one of the plurality of process development team members by the other of the plurality of process development team members; and alerting online via an automated process a process development representative of a posting of a suggested task list for the selected one of the plurality of activities responsive to the posting of the suggested task list to thereby notify the process development representative that a new suggested task list analysis for the selected one of the plurality of activities has been posted.

23. A system as defined in claim 11, wherein the organization realignment program product further includes a set of instructions that when executed by the organization realignment program server cause the server to perform the operations of:

providing a finalized task analysis input web page form to an organization member defining a process development representative to separately enter a plurality of tasks and to assign roles for each selected one of a plurality of activities of a selected one of the plurality of organization functions to thereby receive the finalized task list for each selected one of the plurality of activities under the selected one of the plurality of organization functions, the finalized task analysis input web page form having an input field providing for entry of each task associated with a selected one of the plurality of activities and an input field to associate at least one role thereto responsive to process development representative input;

storing each finalized list of tasks in a database accessible to the computer network responsive to posting each respective finalized list of tasks to thereby allow multi-party access to each finalized task list;

storing each role for each associated task for the selected activity in the database to thereby allow multi-party access to each role; and alerting online via an automated process each of a preselected plurality of organization members of the posting of each finalized task list responsive to the posting of each respective finalized task list to thereby solicit comment from each of the preselected plurality of organization members.

24. A system as defined in claim 11, wherein the organization realignment program product further includes a set of instructions that when executed by the organization realignment program server cause the server to perform the operations of:

receiving the plurality of activities responsive to user input, the plurality of activities being those to support major organization functions of a new organization structure;

receiving a listing of a plurality of tasks and associated roles to accomplish for each of the plurality of activities responsive to user input;

calculating a sum of products of a time duration to perform each associated task and an aggregate frequency of the respective task to determine a total demand on each role based on associated tasks each role is responsible for performing across associated organization functions defining an aggregate resource demand;

determining a number of qualified personnel having a required competency level and availability to fulfill each one of the plurality of roles to thereby determine the qualified resource supply; and determining a skills gap in transitioning to the new organization structure responsive to role identification, aggregate resource demand, and qualified resource supply to thereby enhance organization transition planning.

25. A system as defined in claim 11, wherein the organization realignment program product further includes a set of instructions that when executed by the organization realignment program server cause the server to perform the operations of:

provide the online role competency suggestion template form to a user to separately assemble role competency suggestion data for each selected one of the plurality of roles associated with the plurality of activities under each respective one of the plurality of organization functions; and providing the online role competency template form to a user to assemble finalized role competency data to thereby separately develop the online role competency self-evaluation form for each selected one of the plurality of roles associated with the plurality of activities under each respective one of the plurality of organization functions.

* * * * *